United States Patent
Lafontaine et al.

(10) Patent No.: US 8,018,108 B2
(45) Date of Patent: Sep. 13, 2011

(54) COMPACT HIGH POWER ALTERNATOR

(75) Inventors: Charles Y. Lafontaine, Berthoud, CO (US); Harold C. Scott, Lafayette, CO (US)

(73) Assignee: Magnetic Applications, Inc., Lafayette, CO (US)

(*) Notice: Subject to any disclaimer, the term of this patent is extended or adjusted under 35 U.S.C. 154(b) by 61 days.

(21) Appl. No.: 12/368,212

(22) Filed: Feb. 9, 2009

(65) Prior Publication Data

US 2009/0200884 A1    Aug. 13, 2009

Related U.S. Application Data

(60) Provisional application No. 61/026,954, filed on Feb. 7, 2008.

(51) Int. Cl.
*H02K 7/20* (2006.01)

(52) U.S. Cl. .................................. 310/112; 310/59

(58) Field of Classification Search .......... 310/112–114, 310/52, 58, 59, 60 A
See application file for complete search history.

(56) References Cited

U.S. PATENT DOCUMENTS

| | | | |
|---|---|---|---|
| 765,078 A * | 7/1904 | Jigouzo | 310/112 |
| 2,305,125 A | 12/1942 | Wolferz | |
| 2,493,102 A | 1/1950 | Brainard | |
| 2,874,317 A | 2/1959 | Couse | |
| 3,391,291 A | 7/1968 | O'Neil et al. | |
| 3,564,388 A | 2/1971 | Nolf | |
| 3,757,230 A | 9/1973 | Keeney | |
| 4,146,806 A | 3/1979 | Katsumata | |
| 4,164,785 A | 8/1979 | Young et al. | |
| 4,306,167 A * | 12/1981 | Tomite et al. | 310/153 |
| 4,403,402 A | 9/1983 | Tomite et al. | |
| 4,455,598 A | 6/1984 | Andre et al. | |
| 4,467,229 A | 8/1984 | Ogita | |
| 4,625,160 A | 11/1986 | Hucker | |
| 4,695,776 A | 9/1987 | Dishner et al. | |
| 4,754,179 A | 6/1988 | Capuano et al. | |
| 4,827,393 A | 5/1989 | Clark | |
| 4,885,493 A | 12/1989 | Gokhale | |

(Continued)

FOREIGN PATENT DOCUMENTS

CN    1286821 A    3/2001

(Continued)

OTHER PUBLICATIONS

JPO Office Action Dated Sep. 3, 2010 2006-518985.

(Continued)

*Primary Examiner* — Dang D Le
(74) *Attorney, Agent, or Firm* — David E. Rogers

(57) ABSTRACT

An apparatus for converting between mechanical and electrical energy, particularly suited for use as a compact high power alternator for automotive use and "remove and replace" retrofitting of existing vehicles. Various aspects of the invention provide a means of significantly increasing the output of permanent magnet alternators while addressing the issues of radial loading applied to a permanent magnet alternator rotor. Another aspect of the invention allows for the production of power in two discrete voltages. An aspect of this invention allows for a marked increase in output capability without increasing axial length through the use of magnetic fringing. One aspect of the invention offers an effective means of mounting a skewed stack that eliminates or reduces cogging that is present in a permanent magnet machine without negatively impacting airflow. Another aspect of the invention reduces cogging by radially offsetting opposing magnets of a dual rotor permanent magnet machine.

41 Claims, 47 Drawing Sheets

U.S. PATENT DOCUMENTS

| | | | |
|---|---|---|---|
| 4,900,965 | A | 2/1990 | Fisher |
| 4,931,683 | A | 6/1990 | Gleixner et al. |
| 5,039,932 | A | 8/1991 | Belanger et al. |
| 5,061,889 | A | 10/1991 | Iwatani et al. |
| 5,233,286 | A | 8/1993 | Rozman et al. |
| 5,258,676 | A * | 11/1993 | Reinhardt et al. ............ 310/112 |
| 5,594,322 | A | 1/1997 | Rozman et al. |
| 5,606,244 | A | 2/1997 | Migdal |
| 5,625,276 | A | 4/1997 | Scott et al. |
| 5,705,917 | A | 1/1998 | Scott et al. |
| 5,828,147 | A | 10/1998 | Best et al. |
| 5,838,085 | A | 11/1998 | Roesel et al. |
| 5,886,504 | A | 3/1999 | Scott et al. |
| 5,900,722 | A | 5/1999 | Scott et al. |
| 5,920,162 | A | 7/1999 | Hanson et al. |
| 5,929,611 | A | 7/1999 | Scott et al. |
| 5,944,497 | A | 8/1999 | Kershaw et al. |
| 5,955,810 | A * | 9/1999 | Umeda et al. ................. 310/208 |
| 6,018,200 | A | 1/2000 | Anderson et al. |
| 6,034,511 | A | 3/2000 | Scott et al. |
| 6,111,390 | A | 8/2000 | Inaba et al. |
| 6,160,384 | A | 12/2000 | Inaba et al. |
| 6,188,588 | B1 | 2/2001 | Hemena et al. |
| 6,333,579 | B1 | 12/2001 | Hirano et al. |
| 6,369,473 | B1 | 4/2002 | Baumeister et al. |
| 6,376,947 | B1 | 4/2002 | Tateishi |
| 6,384,494 | B1 * | 5/2002 | Avidano et al. ................. 310/58 |
| 6,433,519 | B2 | 8/2002 | Taniguchi et al. |
| 6,441,522 | B1 | 8/2002 | Scott et al. |
| 6,674,195 | B2 | 1/2004 | Yagyu et al. |
| 6,737,762 | B2 | 5/2004 | Koenig |
| 6,744,157 | B2 | 6/2004 | Choi et al. |
| 6,750,582 | B1 | 6/2004 | Neet |
| 6,768,237 | B1 * | 7/2004 | Schroedl ....................... 310/114 |
| 6,768,656 | B2 | 7/2004 | Figueroa |
| 6,784,575 | B2 | 8/2004 | Okuda |
| 6,787,961 | B2 * | 9/2004 | Neet et al. ..................... 310/201 |
| 6,853,105 | B2 * | 2/2005 | Nakano et al. ........... 310/156.47 |
| 6,856,038 | B2 | 2/2005 | Rebsdorf et al. |
| 6,989,655 | B2 | 1/2006 | Eguchi et al. |
| 7,061,149 | B2 | 6/2006 | Crane |
| 7,122,923 | B2 | 10/2006 | Lafontaine et al. |
| 7,176,658 | B2 | 2/2007 | Quazi et al. |
| 7,219,417 | B2 | 5/2007 | Kobayashi et al. |
| 7,230,363 | B2 * | 6/2007 | Stout et al. .................... 310/266 |
| 7,560,839 | B2 | 7/2009 | Sumiya et al. |
| 7,615,903 | B2 * | 11/2009 | Holmes et al. .................. 310/90 |
| 7,768,165 | B2 | 8/2010 | Scott et al. |
| 2002/0044463 | A1 | 4/2002 | Bontempo et al. |
| 2002/0053838 | A1 | 5/2002 | Okuda |
| 2002/0176266 | A1 | 11/2002 | Perreault et al. |
| 2005/0035673 | A1 | 2/2005 | Lafontaine |
| 2007/0273221 | A1 | 11/2007 | Kinoshita et al. |

FOREIGN PATENT DOCUMENTS

| | | |
|---|---|---|
| CN | 1571249 | 1/2005 |
| DE | 2119525 | 2/1972 |
| DE | 3329720 | 2/1984 |
| DE | 19513134 | 10/1996 |
| DE | 10048491 | 4/2002 |
| EP | 1176696 | 1/2002 |
| EP | 1184960 | 6/2002 |
| EP | 1667318 | 6/2006 |
| FR | 1567344 | 5/1969 |
| FR | 2533375 | 3/1984 |
| FR | 2536222 | 5/1984 |
| JP | 58072358 | 4/1983 |
| JP | 60118036 | 6/1985 |
| JP | 61203888 | 9/1986 |
| JP | 62-140867 | 9/1987 |
| JP | 3-86762 | 9/1991 |
| JP | 3-270659 | 12/1991 |
| JP | 04-140873 | 4/1992 |
| JP | 06233483 | 8/1994 |
| JP | 08322199 | 12/1996 |
| JP | 10004650 | 1/1998 |
| JP | 10-503918 | 4/1998 |
| JP | 2000-183040 | 6/2000 |
| JP | P2002-10574 A | 1/2002 |
| JP | 2005253146 | 9/2005 |
| WO | 0120770 | 3/2001 |

OTHER PUBLICATIONS

EPO; Examination Letter Dated Jul. 4, 2010 Application # 04 778 233.

CNPO First Office Action dated Jul. 25, 2008 Application No. 200480020404.1.

CNPO First Office Action dated Aug. 1, 2008 Application No. 200480022823.9.

CNPO Second Office Action Dated Feb. 2, 2009 200480020404.1.

CNPO Third Office Action Dated Apr. 13, 2010 200680008421.2.

CNPO First Office Action Dated Dec. 5, 2008 200680008421.2.

CNPO Second Office Action Dated Jul. 31, 2009 200680008421.2.

CNPO Formal Response to 3rd Office Action Jun. 13, 2010 200680008421. 2.

JPO Reasons for Rejection Feb. 3, 2010 2006-518985.

USPTO; Office Action dated Apr. 28, 2011 in U.S. Appl. No. 12/848,972.

USPTO; Office Action dated Dec. 17, 2010 in U.S. Appl. No. 12/848,980.

USPTO Notice of Allowance dated Aug. 30, 2010 in U.S. Appl. No. 12/753,764.

USPTO; Notice of Allowance dated Sep. 11, 2006 in U.S. Appl. No. 10/860,393.

USPTO; Office Action dated Feb. 6, 2006 in U.S. Appl. No. 10/860,393.

USPTO; Office Action dated Jul. 12, 2005 in U.S. Appl. No. 10/889,980.

USPTO; Final Office Action dated Feb. 10, 2006 in U.S. Appl. No. 10/889,980.

USPTO; Notice of Allowance dated Jun. 6, 2006 in U.S. Appl. No. 10/889,980.

USPTO; Notice of Allowance dated Jun. 12, 2008 in U.S. Appl. No. 11/295,888.

USPTO; Notice of Allowance dated Mar. 23, 2010 in U.S. Appl. No. 11/295,888.

USPTO; Office Action dated Aug. 11, 2006 in U.S. Appl. No. 11/295,888.

USPTO; Office Action dated Sep. 22, 2009 in U.S. Appl. No. 11/295,888.

USPTO; Notice of Allowance dated Sep. 10, 2007 in U.S. Appl. No. 11/347,777.

USPTO; Final Office Action dated Nov. 19, 2008 in U.S. Appl. No. 11/710,239.

USPTO; Notice of Allowance dated Nov. 17, 2009 in U.S. Appl. No. 11/710,239.

USPTO; Office Action dated Apr. 24, 2008 in U.S. Appl. No. 11/710,239.

USPTO; Office Action dated May 4, 2009 in U.S. Appl. No. 11/710,239.

USPTO; Office Action dated Jun. 24, 2009 in U.S. Appl. No. 12/025,645.

USPTO; Notice of Allowance dated Mar. 19, 2010 in U.S. Appl. No. 12/025,645.

PCT; International Preliminary Report Dated Jul. 4, 2010 in Application # PCT/US2004017571.

EPO; Examination Letter Dated Mar. 12, 2009 Application # 04 778 233.

PCT; International Search Report Dated Feb. 25, 2005 in Application # PCT/US2004022628.

PCT; International Preliminary Report Dated Aug. 7, 2007 in Application # PCT/US2006003965.

PCT; International Search Report Dated May 29, 2006 in Application # PCT/US2006003965.

EPO; Examination Letter Dated May 20, 2010 Application #06720281.

EPO; Examination Letter Dated Apr. 2, 2009 Application #06720281.
PCT; International Search Report Dated Jul. 23, 2007 in Application # PCT/US2007004651.
PCT; International Preliminary Report Dated Aug. 26, 2008 in Application # PCT/US2007004651.
PCT; International Preliminary Report Dated Aug. 10, 2010 in Application # PCT/US2009033585.
PCT; International Search Report Dated May 14, 2009 in Application # PCT/US2009033585.

* cited by examiner

For Versions 2-2 and 2-3
70.0 mm Minimum Clearance Required
102.0 mm Typically Utilized

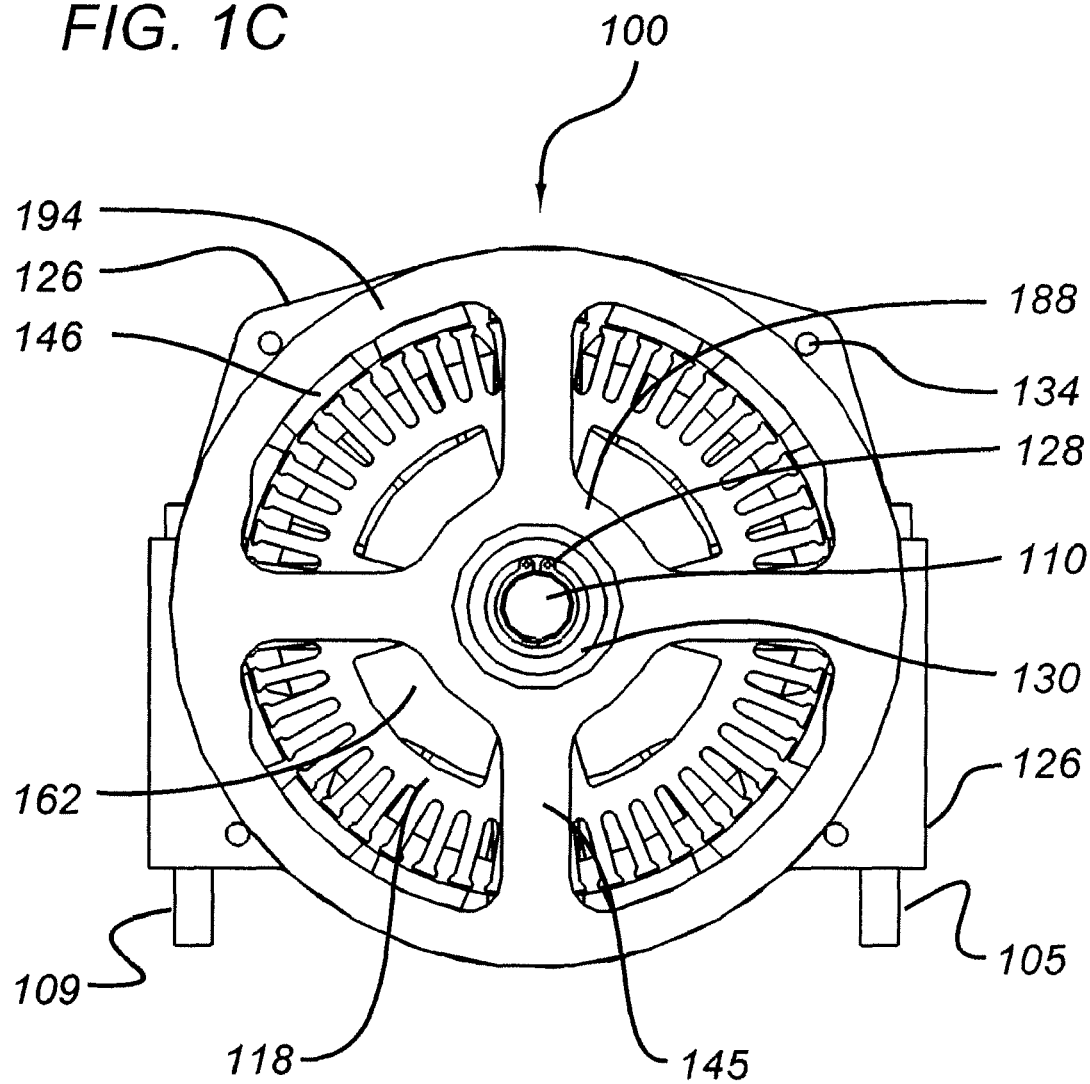

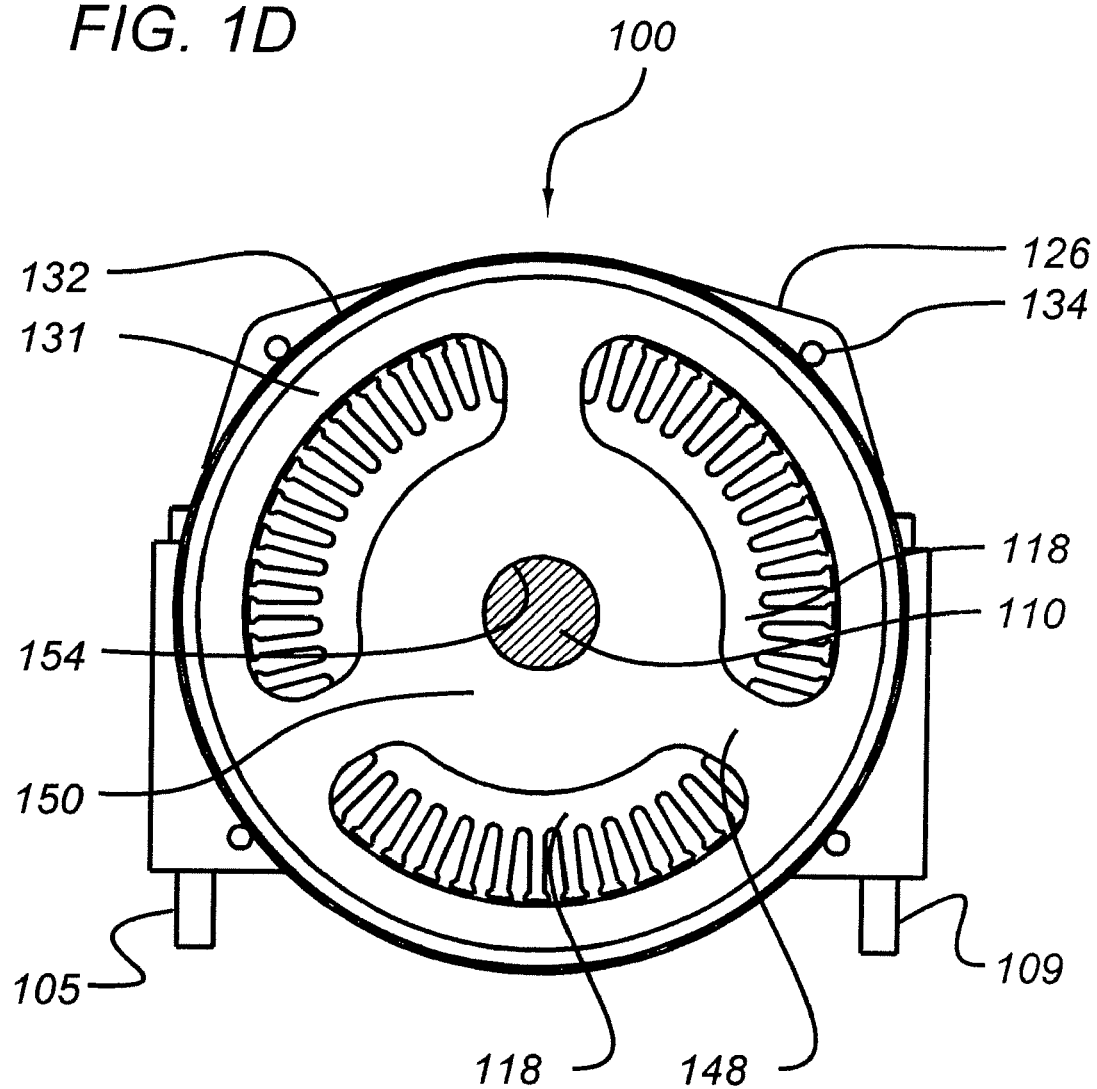

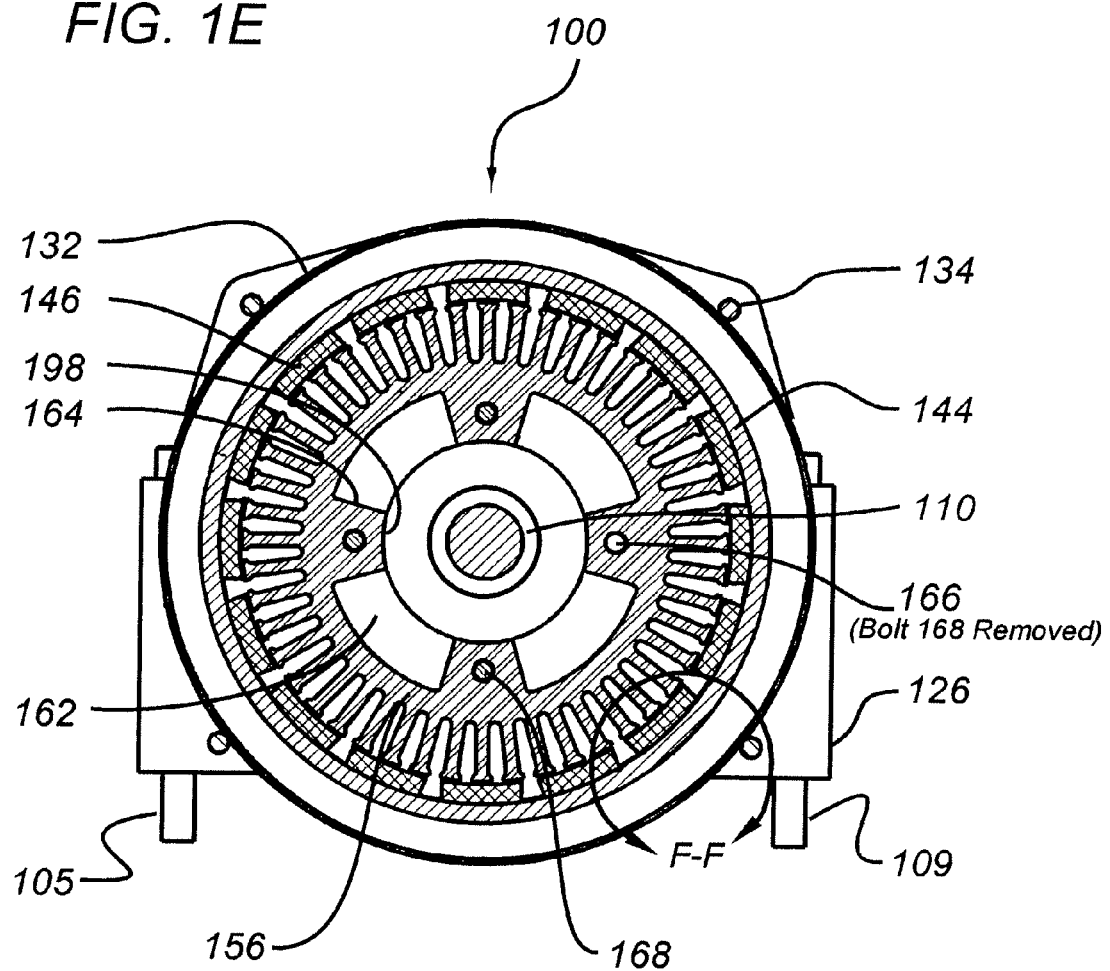

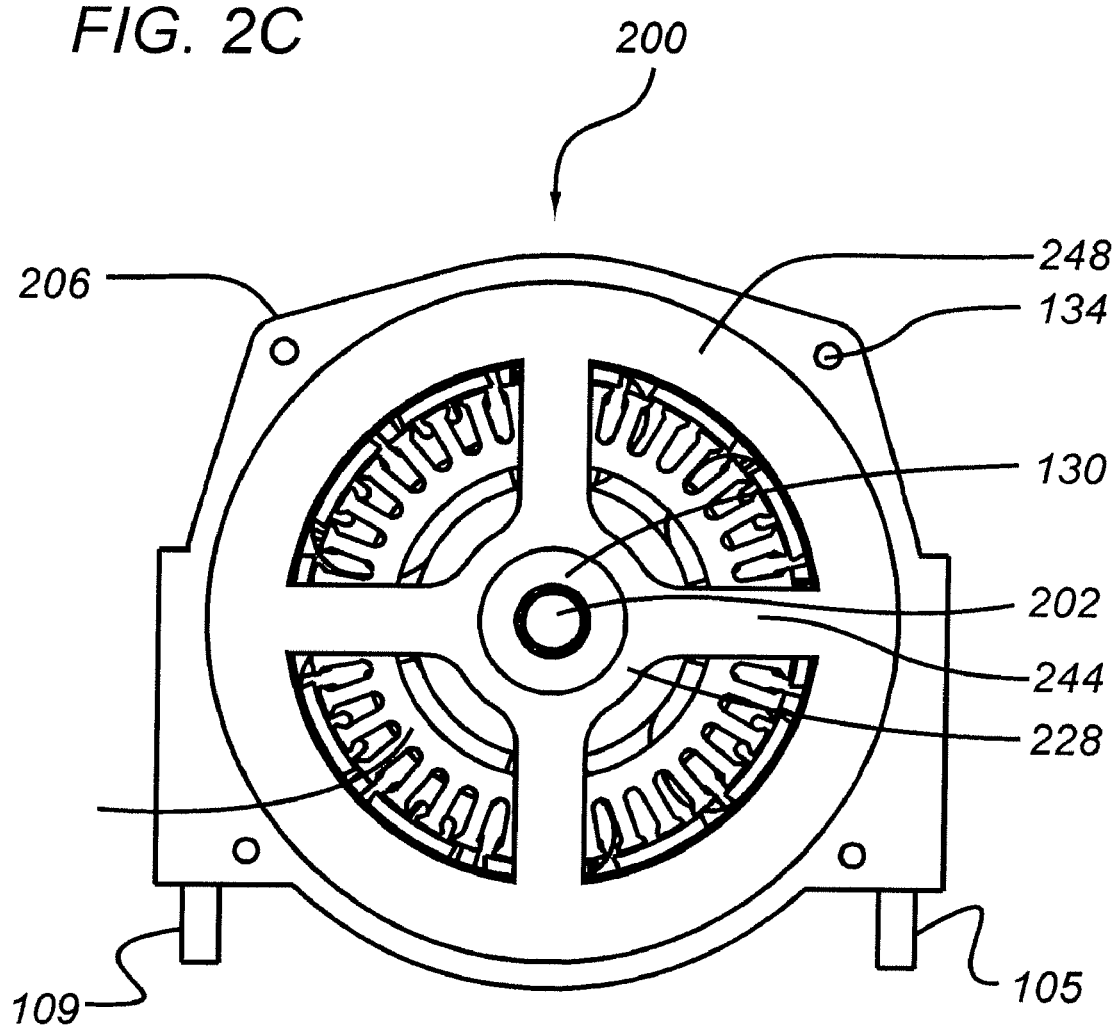

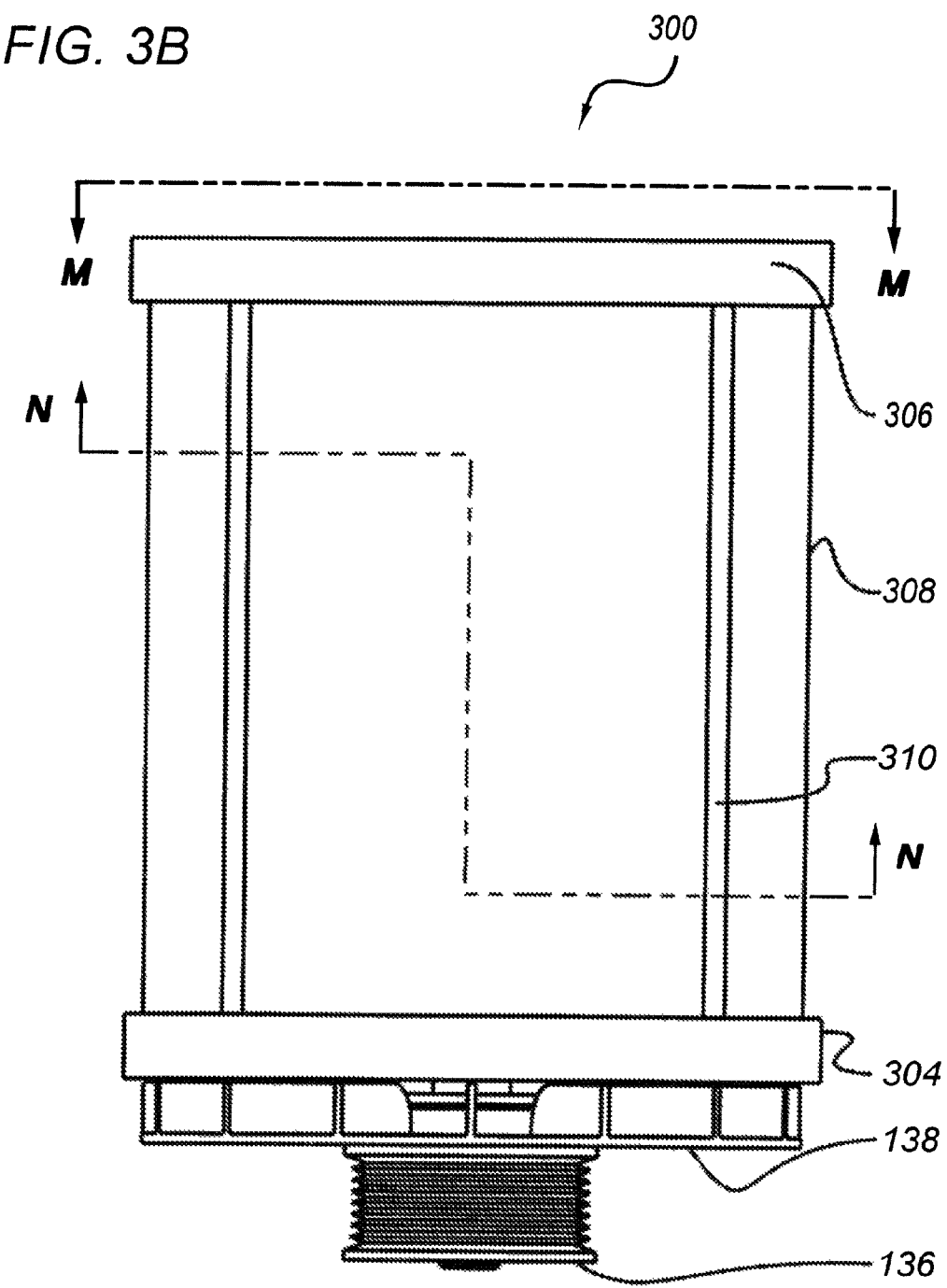

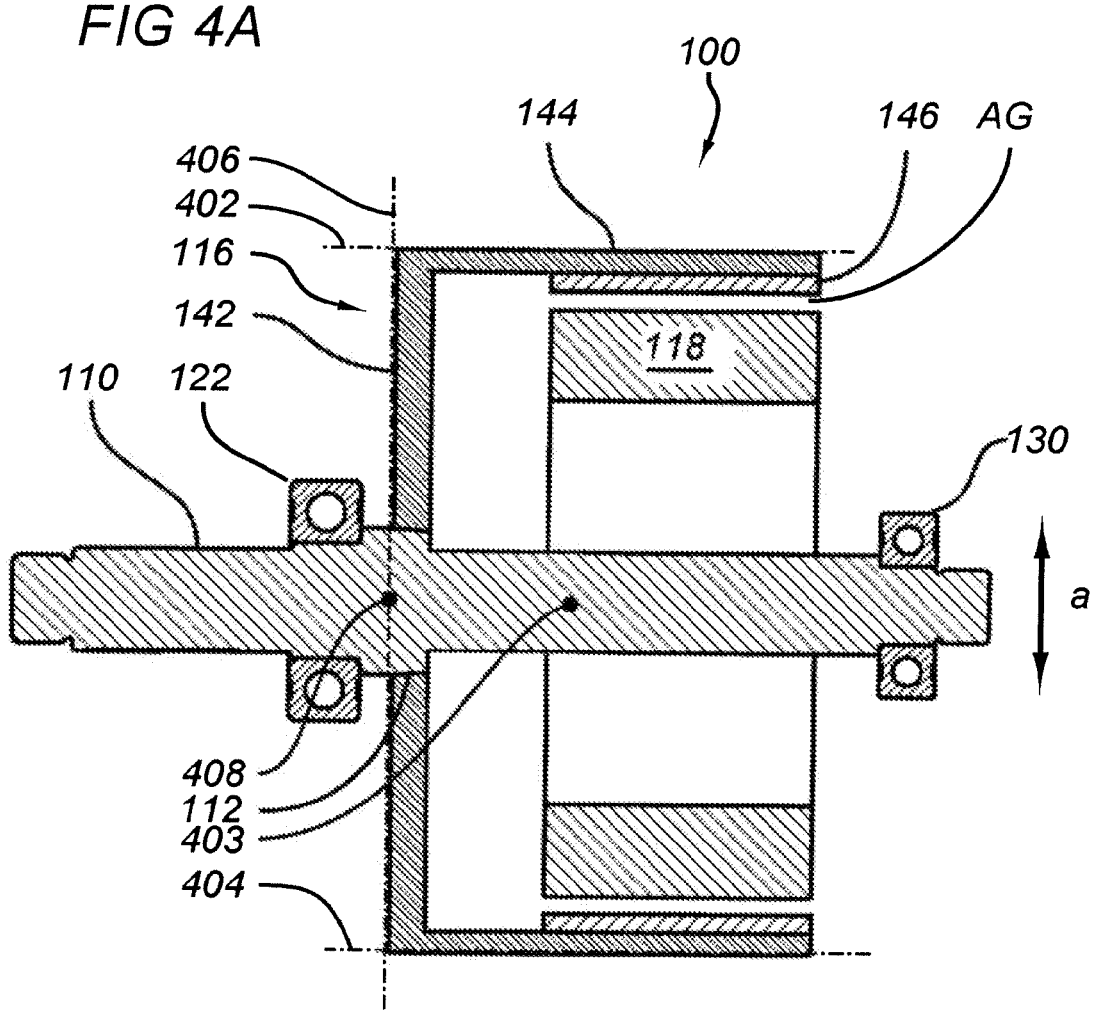

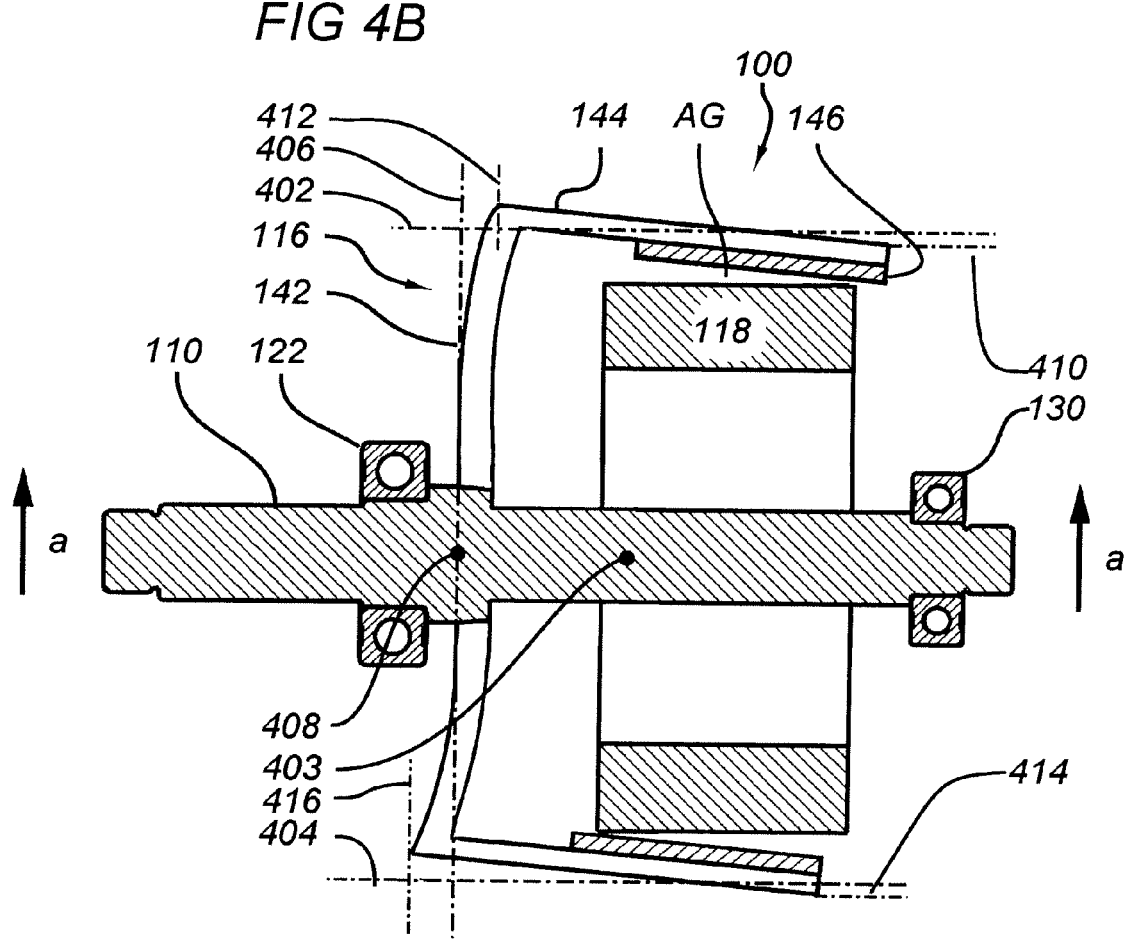

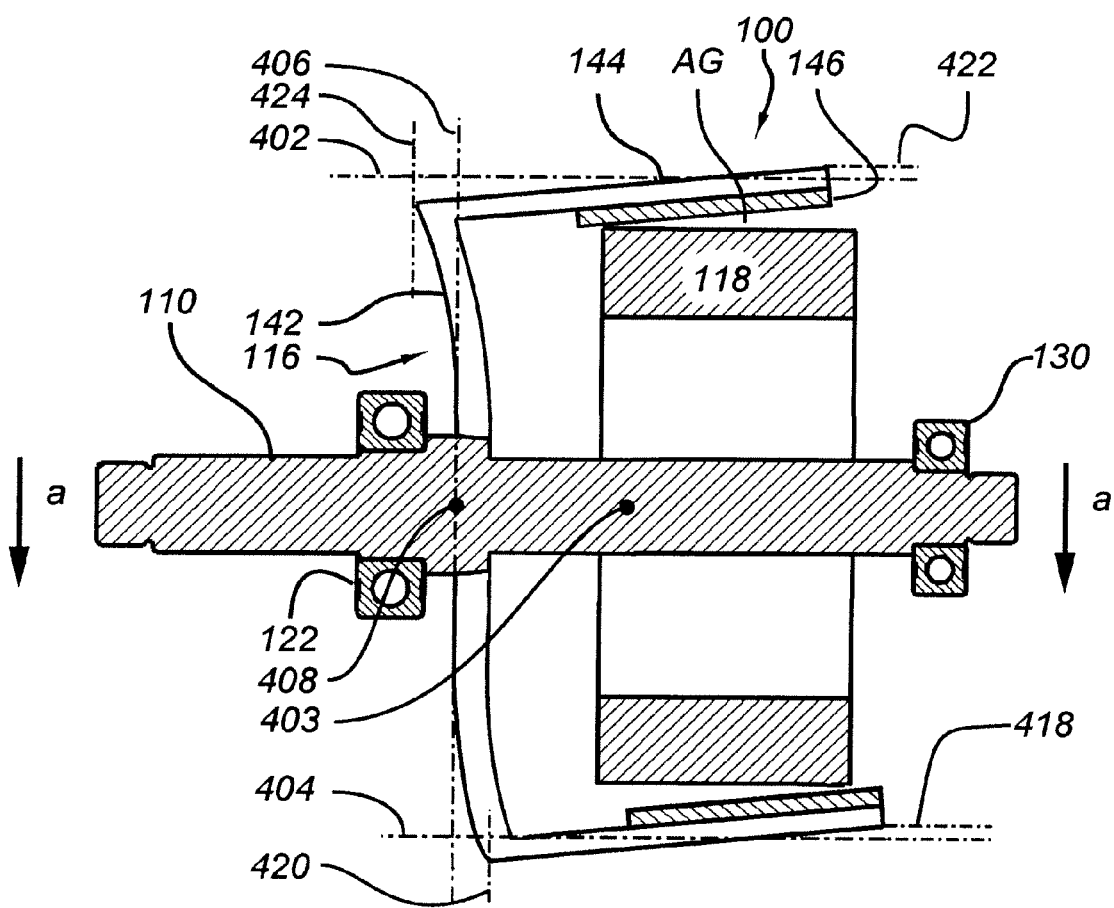

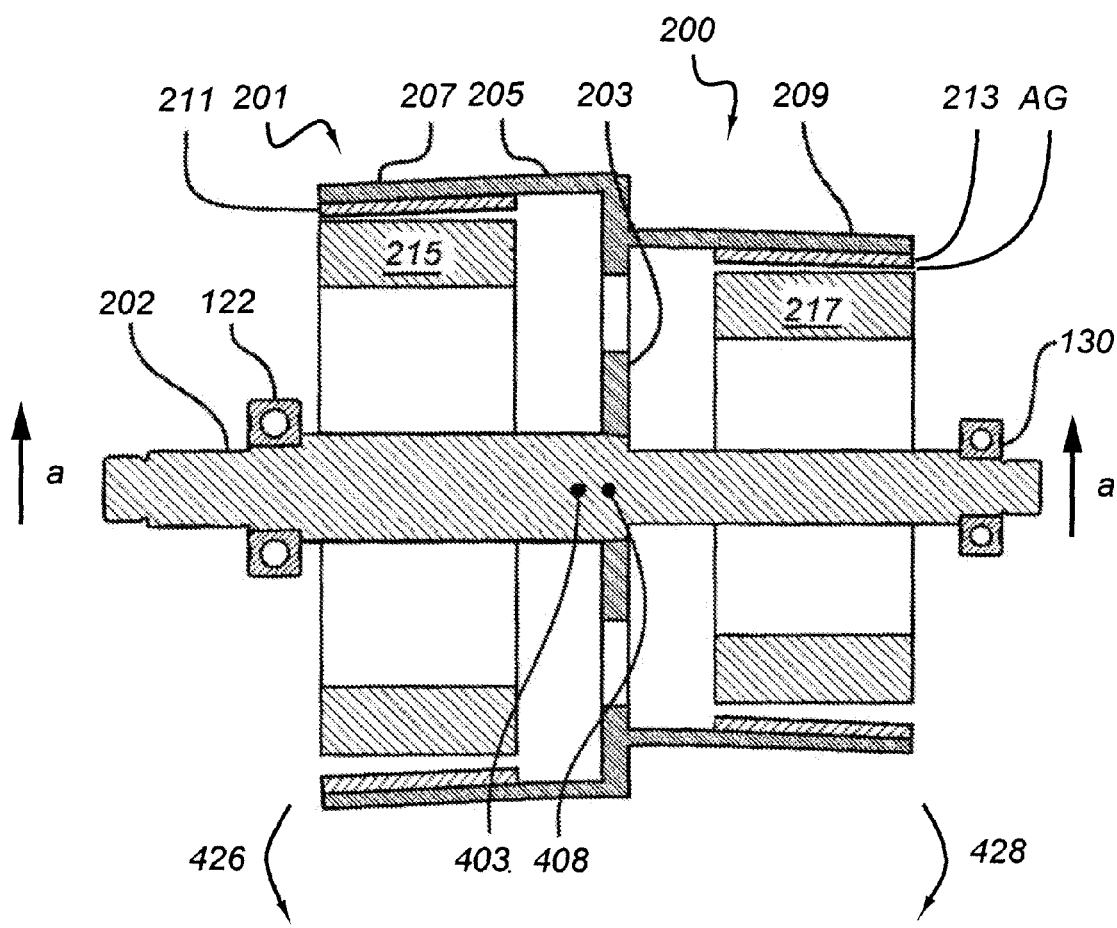

ONE TOOTH
TOTAL ANGULAR SKEW 7.50°
(1 TOOTH OFFSET
FOR 48 TOOTH
STATOR)

7.50°

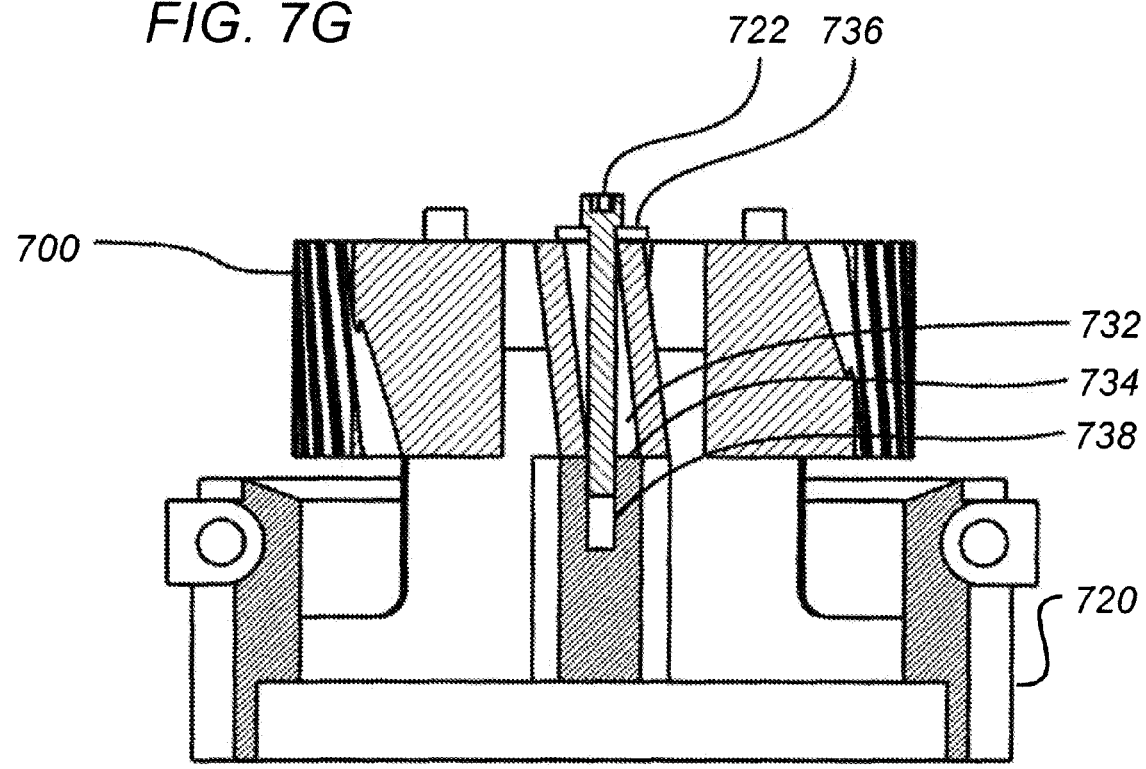

COMPACT HIGH POWER ALTERNATOR

CROSS REFERENCE TO RELATED APPLICATIONS

This application is related to, claims priority from and hereby fully incorporates by reference for all purposes U.S. Provisional Application No. 61/026,954, filed Feb. 7, 2008 entitled "Compact High Power Alternator".

DESCRIPTION OF THE INVENTION

1. Field of the Invention

The present invention relates to machines for converting between mechanical and electrical energy, and in particular to compact high power alternators using permanent magnets.

2. Background of the Invention

An alternator typically comprises a rotor mounted on a rotating shaft and disposed concentrically and interior relative to a stationary stator. Alternatively, a stator may be positioned concentrically within a rotor. An external energy source, such as a motor or turbine, commonly drives the rotating element, directly or through an intermediate system such as a pulley belt. Both the stator and the rotor have a series of poles. Either the rotor or the stator generates a magnetic field, which interacts with windings on the poles of the other structure. As the magnetic field intercepts the windings, an electrical current is generated, which is provided to a suitable load. The induced current is typically applied to a bridge rectifier, sometimes regulated, and provided as an output. In some instances, the regulated output signal is applied to an inverter to provide an AC output.

Conversely, the device can act as a motor if an appropriate electrical signal is applied to the windings.

In general, permanent magnet alternators are well-known. Such alternators use permanent magnets to generate the requisite magnetic field. Permanent magnet generators tend to be much lighter and smaller than traditional wound field generators. Examples of permanent magnet alternators are described in U.S. Pat. Nos. 5,625,276 issued to Scott et al. on Apr. 29, 1997; 5,705,917 issued to Scott et al. on Jan. 6, 1998; 5,886,504 issued to Scott et al. on Mar. 23, 1999; 5,929,611 issued to Scott et al. on Jul. 27, 1999; 6,034,511 issued to Scott et al. on Mar. 7, 2000; and 6,441,222 issued to Scott on Aug. 27, 2002, and U.S. application Ser. No. 10/889,980 entitled "Compact High Power Alternator" filed on Jul. 12, 2004 by Lafontaine, et al. (hereinafter referred to as the "Lafontaine et al. application"). To the extent not inconsistent with disclosures of embodiments of the present invention herein, the abovementioned references are fully incorporated by reference herein for all purposes.

The power supplied by a permanent magnet generator varies significantly according to the speed of the rotor. In many applications, changes in the rotor speed are common due to, for example, engine speed variations in an automobile, or changes in load characteristics. Accordingly, an electronic control system is typically employed. An example of a permanent magnet alternator and control systems therefore is described in the aforementioned U.S. Pat. No. 5,625,276 issued to Scott et al. on Apr. 29, 1997. Examples of other control systems are described in U.S. Pat. No. 6,018,200 issued to Anderson, et al. on Jan. 25, 2000. To the extent not inconsistent with disclosures of embodiments of the present invention herein, the abovementioned references are fully incorporated by reference herein for all purposes.

In such permanent magnet alternators, the efficiency is inversely proportional to the "air gap" separating the magnets from the stator. Such air gaps are often in the range of 20 to 40 thousands of an inch. The output produced by a stator is proportional to the square of the air gap diameter (additionally defined in relation to FIG. 1F, below), therefore it is particularly advantageous to maximize the air gap diameter as is allowed by the particular application.

Typically alternators in automotive applications are equipped with mounting appendages, more commonly known as mounting lugs that are used to both fasten the alternator to the engine block by means of an intermediate bracket and to allow the alternator to function properly without belt slippage by a means that will be described later. A common arrangement known as a J180 or hinge type mount, (also known as a three-point mount) includes three mounting lugs for that purpose. Two of the mounting lugs are located at the front and rear of the alternator and are in alignment axially. The two aligned lugs are fasten to a corresponding structure on the engine by use of a bolt passing through the two lugs and mounting bracket to in effect act as a hinge. A third mounting lug, commonly known as the upper adjusting lug, is typically positioned on the front portion of the alternator and is in opposition radially from the first two lugs. The upper adjusting lug is mounted to a device equipped with a jackscrew to both rotate the alternator about the hinge formed by the first two lugs and to lock the alternator in place once proper belt tension is achieved. Jackscrews may not always be present in all brackets of this type in which case the alternator is rotated about the hinge by use of a lever, typically a wooden stick, and is then fastened by means of a simple bracket and locking fastener designed for that function. In either case the alternator functions as both the power producing component of the electrical system and the tensioner for the automotive belt that passes over the alternator pulley to the corresponding drive pulley, typically the engine crankshaft pulley. In certain engines, typically large diesels, an internally coupled auxiliary drive shaft is equipped with a pulley that used to drive the alternator instead of the crankshaft pulley.

Although effective as a means of mounting the alternator and applying tension to the drive belt, the J180 standard, having only three mounting points, leaves a large portion of the alternator cantilevered. With only three mounting lugs, the alternator is subjected to 'whipping' about the cantilevered portion which in turn magnifies the effects of acceleration. Typically these destructive forces are found in both gasoline and diesel engine applications but are most severe during startup of a diesel engine. Violent accelerations are also encountered when the vehicle is subjected to sudden changes in direction, for example, when hitting a pothole or other similar road hazard. The effect of these forces is to greatly reduce the life expectancy of an alternator.

Recent advances in automotive belt engineering has led to the development of the automatic belt tensioner assemblies, that through the use of an integral torsion spring, apply the required tension to the belt thereby eliminating the need for the alternator to function as the belt tensioner. In this arrangement the alternator lugs are hard mounted to a fixed bracket eliminating the need for a hinge and jack screw. Utilizing automatic belt tensioners has been beneficial in that correct belt tension is always correctly applied but destructive g forces are still observed in alternators using the J-180 hinge mount and the variations utilizing three point mounting lugs since the portion of the alternator without a mounting lug is still subjected to whipping.

In an attempt to further reduce observed destructive forces, the Society of Automotive Engineers (SAE) issued the Pad Mount Alternator Specification Proposal as a method to fastened alternators to engines (SAE document 2002-01-1282).

The Pad Mount Alternator Specification Proposal includes four specification versions, 2-1 through 2-4. 2-1 and 2-4 have yet to gain wide acceptance and are intended for future use, whereas 2-2 and 2-3 have gained general acceptance by heavy-duty engine manufacturers with alternators now being built to the proposed standards. As will be described later, the Pad Mount alternator utilizes four mounting lugs that hard mount the alternator to the engine block. A variation of the J180 mount that includes a fourth mounting lug has also been developed in an attempt to reduce destructive forces. In either case the alternator is hard mounted to the engine at four points. The SAE Pad Mount standard as well as the J180 four point variant physically limits overall alternator diameter due to the fixed distances between mounting lugs used to fasten the alternator. Presently with overall diameter being limited, the only effective means of increasing alternator output in a Pad Mount alternator is to increase the overall axial length. This approach limits output to proportional increases with axial length. It is very desirable then to develop methods of increasing alternator output while conforming to the pre-defined geometry imposed by the SAE Pad Mount standard or for that matter, any four point mount alternator.

The rotating portion of a permanent magnet alternator comprises a rotor with permanent magnets affixed thereto. In a given application in which the overall diameter of the alternator is limited, one means to significantly increase output is to increase the overall length of the stator. As discussed in the Lafontaine et al. application, as the rotor in this type of alternator is open-ended, it is in effect cantilevered and subject to deflection when exposed to severe radial loads. Therefore the effective length for this type of alternator is limited by the amount of radial load the rotor can resist to prevent the permanent magnets from clashing with the stator. While a permanent magnet rotor can be designed to resist most loads, practical limits in terms of size and overall weight tend to make this approach impractical beyond certain lengths. It is desirable, therefore, to design a permanent magnet machine in which the output is substantially increased but not limited by rotor length.

There has been over time a steady increase in demand to power electrical tools remotely from the power grid. This need is acutely felt by field service personnel tasked with repairing equipment in areas where access to line-level voltages such as 110 VAC is impractical or completely unavailable. One method utilized to solve this problem is through the use of a generator set or, 'gen-set' to produce the AC power required by hand drill, radial saws and diagnostic equipment etc. A drawback to this method lies in the intense maintenance required by gen-sets as well as the inconvenience of carrying a large heavy piece of equipment not directly connected to the work done by field service personnel. On the other hand, if an under-hood alternator were capable of delivering both the vehicle system DC power and AC power for external uses, it would eliminate the cost and burden of having a generator set. When considering a single alternator to produce, for example, 12 VDC vehicle power and 110 VAC power, inefficiencies inherent in either boosting the voltage to 110 if the alternator is optimized to produce 12 VDC or conversely to step down to 12 V DC if the alternator is optimized to produce 110 VAC become problematic. Therefore it would be a particular advantage to produce an alternator capable of multiple electrical outputs for independent output voltages or current configurations optimized for a particular task. Specifically what output voltage range optimized for the 12 VDC and a second independent voltage range optimized for the 110 VAC.

The effects of magnetic fringing are well known and can be utilized to increase power of a permanent magnet machine. In a permanent magnet alternator, constraining the total available axial length for a given application imparts constraints to the alternator's axial stator length. This is because in addition to the stator fitting within the alternator, the front and rear end plates, the rotor, and necessary clearances for all turns must all also share the same limited axial length. In permanent magnet machines, an opportunity to extend the length of the magnet beyond both stator faces is possible without impacting the overall length of the alternator. The magnetic fringing fields created in this approach would extend beyond the stator and intercept the winding end turns that also extend beyond the stator. The result is flux interacting with the windings that extend beyond the stator face which in turn produces more power for a given length of stator. It would be desirable then to design an alternator that utilizes magnetic fringing as a means to increase power for a fixed length of stator.

Permanent magnet machines tend to demonstrate an undesirable cogging effect. The cogging effect is a direct result of a permanent magnet alternators' geometry in which magnets are radially disposed equally about the rotor, alternating both north and south poles and creating a gap between each magnet. The stator comprises teeth and slots are matched to the geometry of the magnets. At rest, the magnetic field produced by the permanent magnets results in a force that predisposes the magnets to align directly over corresponding teeth on the stator. As the rotor begins to spin, the magnetic field produced by the permanent magnets creates a resistance to rotation as the potential energy of the assembly is increased. As rotation continues potential energy reaches its maximum when the permanent magnets are aligned midway in the gap between adjacent stator teeth. From the midway point, further rotation produces an acceleration that ends when the magnets are again aligned directly over the adjacent teeth on the stator. This deceleration and subsequent acceleration produces the cogging effect observed in permanent magnet alternators. It is important to note that the net effect of that cycle is a zero net effect on energy used to rotate the alternator. The cogging of permanent magnet alternators produces several undesirable characteristics. Two of these effects are merely aesthetic: the first, a high-pitched sound not unlike a siren is produced; the second is the inability to freely spin the alternator due to resistance produced by the magnetic field of the permanent magnets. Since conventional Lundell alternators spin freely in the absence of an excitation field, it is perceived that the permanent magnet alternator is not functioning properly. The third and more deleterious effect is found in larger permanent magnet alternators in which the acceleration and deceleration of cogging produces vibrations that over time can prematurely wear down alternator components. That same acceleration and deceleration also produces undesirable forces on the drive belt spinning the alternator, shortening its useful life. The Lafontaine et al. application describes reducing cogging through the use of a skewed stator. As noted in the Lafontaine et al. application one possible means of fastening a skewed stator is through the use of a hold down ring.

Due to the nature of its geometry, a hold down ring and its fasteners protrude into the central core, possibly negatively impacting airflow. To maintain adequate cooling fluid flow, it would be beneficial to reduce obstructions that would impede that flow. It would therefore be beneficial to produce a means of fastening a skewed stator without negatively impacting airflow.

SUMMARY OF THE INVENTION

The present invention provides a particularly advantageous machine for converting between mechanical and electrical energy. Certain embodiments provide for improved alternators that operate within the limitations imposed by the SAE Pad Mount standard.

Various aspects of the invention provide a means of significantly increasing the output of permanent magnet alternators while addressing the issues of radial loading applied to a permanent magnet alternator rotor.

Another aspect of the invention allows for the production of power in two discrete voltages, and in an alternative embodiment, at least one output of the alternator is direct current and another output is alternating current.

In applications where diameter and overall axial length are limited, an aspect of this invention allows for a marked increase in output capability without increasing axial length through the use of magnetic fringing.

One aspect of the invention offers an effective means of mounting a skewed stack that eliminates or reduces cogging that is present in a permanent magnet machine without negatively impacting airflow.

One aspect of the invention reduces cogging by radially offsetting opposing magnets of a dual rotor permanent magnet machine.

One aspect of the invention includes a power conversion apparatus comprising: a shaft, a first stator, a second stator, a first rotor and a diametrically opposed second rotor. The shaft, stators, and rotor casings may be coaxially disposed with the rotor casings mounted on the shaft. The first and second stators respectively include at least one winding. The first rotor further comprises a first plurality of permanent magnets coupled to the first rotor and disposed proximate to the first stator, separated from the first stator by a first predetermined gap distance, such that relative motion of the first stator and first rotor causes magnetic flux from the magnets to magnetically interact with the first stator winding. Also, the second rotor further comprises a second plurality of permanent magnets coupled to the second rotor and disposed proximate to the second stator, separated from the second stator by a second predetermined gap distance, such that relative motion of the second stator and second rotor causes magnetic flux from the magnets to magnetically interact with the second stator winding. The respective first and second plurality of permanent magnets have a respective predetermined length beyond a respective predetermined first and second stator face lengths.

Another aspect of the present invention comprises a cooling system for directing coolant flow into thermal contact with at least one of the winding and magnets. The cooling system generates sufficient coolant flow through a predetermined flow path at and above a predetermined speed to dissipate heat generated and maintains a temperature of the magnets below a predetermined destructive level. The disposition of at least one of a first and second stator slots and respective permanent magnets is skewed by a predetermined amount relative to the axis of the first and second stator. Also, the radial position of the slots at the first core side face is offset from the radial position of the slots at the second core side face. In one embodiment, the shaft has a predetermined diameter and includes shaft tapered portions disposed between the ends of the shaft at predetermined positions relative to the first and second stators. The diameter of the shaft tapered portions vary in accordance with a predetermined taper from a minimum diameter to a predetermined maximum diameter greater than the shaft predetermined diameter. The first and second rotors include a hub and a central through-bore having the predetermined taper corresponding to a taper of at least one shaft tapered portion of the shaft. The diameter of the tapered through-bore varies in accordance with the predetermined taper from a minimum through-bore diameter greater than the shaft predetermined diameter to a predetermined maximum through-bore diameter. The first and second rotors hub are disposed with the shaft journaled and extending through the hub through-bore, with the shaft tapered portion received in the through-bore with interior surface of the through bore and exterior surface of the shaft tapered portion in mating contact, wherein cooperation of the tapered first and second rotor bore is in surface contact with the shaft tapered portion positions the first and second rotors both axially and radially with respect to the shaft and first and second stators, coupling the first and second rotors to the shaft for rotation therewith. In one embodiment, the first and second rotors and shaft may comprise an integral unit. The first rotor may be mounted on the first endplate; and the first stator is mounted for rotation relative to the first endplate.

In another embodiment, the shaft is rotatably coupled to the first endplate. The first and second rotors comprise endcaps coupling a cylindrical casing to the shaft; the casing and endcaps comprising an integral unit.

In one aspect of the present invention the cooling system further comprises at least a first passageway through the first end plate in fluid communication with the predetermined flow path. The cooling system coolant may be air, and the cooling system further includes a forced air supply disposed to move air through the first endplate passageway, and the predetermined flow path. The forced air supply comprises a fan asynchronous with respect to rotation of the first stator. In another embodiment, the cooling system further comprises at least a passageway through a first stator core and a first passageway through the first rotor in fluid communication with the first stator core passageway.

In one embodiment, the cooling system further comprises a fan mounted for rotation with the first rotor disposed to move coolant through the first stator core passageway. The stator winding includes end turns bent into the path of coolant flow through the first stator core passageway. Additionally, the cooling system further comprises a deflector surface disposed between the first stator and first rotor to direct coolant flow from the first stator passageway into thermal contact with winding end turns. Another embodiment includes a second end plate, wherein: the second rotor is mounted on the second endplate; and the second stator is mounted for rotation relative to the second endplate. The shaft may be rotatably coupled to the second endplate.

The cooling system may further comprise at least a second passageway through the second end plate in fluid communication with the predetermined flow path.

In another embodiment, the cooling system coolant is air, and the cooling system further includes a forced air supply disposed to move air through the second endplate passageway, and the predetermined flow path. The forced air supply may comprise a fan asynchronous with respect to rotation of the second stator. The cooling system may further comprise at least a passageway through a second stator core and a passageway through the second rotor in fluid communication with the second stator core passageway. Also, the cooling system may further comprise a fan mounted for rotation with the second rotor disposed to move coolant through the second stator core passageway. The second stator winding includes end turns bent into the path of coolant flow through the second stator core passageway. Additionally, the cooling system further comprises a deflector surface disposed between the second stator and second rotor to direct coolant flow from the second stator passageway into thermal contact with winding end turns. In an alternative embodiment, the cooling system further comprises a rotor deflector disposed between the first and second rotors. An additional embodiment may include a second endplate, and an outer casing, wherein: the first and second rotor casings, first and second stator cores, and outer casing are concentric with the shaft; the shaft is rotatably coupled to the first and second endplates; the second rotor is mounted on the second end plate; and the first and second stator is coupled to the shaft for rotation therewith between the first and second endplates and within the outer casing.

The cooling system may comprise a passageway through the first and second stator core and a passageway through the first and second rotor in fluid communication with the first and second stator core passageway. The first and second rotor passageway may be disposed such that coolant flow is directed through a first end plate passageway, into thermal contact with the first stator first winding end turns, through the first stator core passageway, into thermal contact with the first stator second winding end turns, into thermal contact with the second stator first winding end turns, through the second stator core passageway, into thermal contact with the second stator second winding end turns, through a second end plate passageway; and into thermal contact with the first and second magnets. Another embodiment includes respective tie rods cooperating with the first and second end plates, compressing the first and second end plates against the outer casing; the first and second endplates, outer casing, and tie rods cooperating to maintain alignment of the shaft, first and second rotors and first and second stators. The coolant is air and the cooling system may include at least one forced air supply disposed to move air through the first and second endplate passageway, and the first and second stator core passageways. The forced air supply may comprise at least one electric fan. The electric fans may be mounted on the first and second endplates. In an alternative embodiment, the forced air supply comprises at least one fan disposed to rotate with the shaft.

Additionally, the first rotor and first stator pairing and second rotor and second stator pairings may comprise independent electrical outputs. The independent outputs may be configured to respectively provide a direct current and an alternating current. For instance, the first rotor and stator pairing and second rotor and stator pairing are configured to provide an output voltage range optimized for 12 VDC and a second independent voltage range optimized for 110 VAC.

In an alternative embodiment, the face length of the magnets are configured to produce magnetic fringing stators. Also, the opposing magnets may be configured radially offset to reduce cogging. The laminations of the first and second stators may be configured to be skewed to reduce cogging.

In an alternative embodiment the first and second stators include a plurality of windings, the end turns of such windings extending outwardly beyond the core by varying distances to present a lattice-like structure in the coolant flow path. The end turns extend outwardly beyond the core peripheral portion side faces to provide spaces between the end turns and core peripheral portion side faces, whereby dissipation of heat generated in the winding is facilitated. In one embodiment the first and second rotors, first and second stators, cooperate as a compact high power alternator for a vehicle. Alternatively, the first and second rotors and first and second stators, cooperate as a compact high power alternator to retrofit existing vehicles.

Also, the design of the first rotor and diametrically opposed second rotor aids in resisting apparatus deformation due to acceleration. The design of the first rotor and diametrically opposed second rotor reduces the length of the moment arm of the apparatus wherein deformation of the plurality of rotors is decreased.

An alternative embodiment of the present invention includes a power conversion apparatus comprising: a shaft, a first stator, a second stator, a first rotor and a diametrically opposed second rotor. The shaft, stators, and rotor casings are coaxially disposed with the rotor casings mounted on the shaft. The first and second stators include at least one winding. The first rotor includes a first plurality of permanent magnets disposed proximate to the first stator, separated from the first stator by a predetermined gap distance, such that relative motion of the first stator and first rotor causes magnetic flux from the magnets to magnetically interact with the first stator winding. Also, the second rotor includes a second plurality of permanent magnets disposed proximate to the second stator, separated from the second stator by a predetermined gap distance, such that relative motion of the second rotor and second stator causes magnetic flux from the magnets to magnetically interact with the second stator winding. The respective permanent first and second plurality of magnets have a predetermined length beyond a predetermined first and second stators individual face lengths. Additionally, there may be four lugs that couple the apparatus to a surface. The disposition of at least one of the first and second stator slots and respective permanent magnets is skewed by a predetermined amount relative to the axis of the first and second stator; and wherein the first rotor and stator pairing and second rotor and stator pairing comprise independent output voltages. These independent output voltages may comprise a direct current and an alternating current. For instance, the first rotor and first stator pairing and second rotor and second stator pairings are configured to provide an output voltage range optimized for 12 VDC and a second independent voltage range optimized for 110 VAC.

It is to be understood that the descriptions of this invention herein are exemplary and explanatory only and are not restrictive of the invention as claimed.

BRIEF DESCRIPTION OF THE DRAWINGS

The present invention will hereinafter be described in conjunction with the figures of the appended drawings, wherein like designations denote like elements.

FIG. 1A includes a cut-away view along line B-B.

FIG. 1C is a rear view of the Pad Mount alternator of FIG. 1A. (View C-C in FIG. 1B).

FIG. 1D is a schematic sectional view (taken along line DD in FIG. 1B) of the Pad Mount alternator of FIGS. 1A and 1B.

FIG. 1E is a schematic sectional view (taken along line EE in FIG. 1B) of the Pad Mount alternator of FIGS. 1A and 1B.

(FIG. 2A includes a cut-away view along line G-G).

FIG. 2C is a rear view of the alternator of FIG. 2A (View I-I in FIG. 4B).

FIG. 3A includes a cut-away view taken along line K-K.

FIG. 3B is a top view of the alternator of FIG. 3A.

FIGS. 4A-4C is simplified schematics illustrating the effects of radial loading on alternator rotors (Alternators in FIG. 1A-1I).

FIGS. 4G-4H are simplified schematics illustrating the effects of radial loading on diametrically opposed but unified rotors of unequal diameters (Alternator in FIG. 2A-2E).

FIG. 7A-7G are detailed views detailing a method to fasten skewed permanent magnet alternator stators.

DESCRIPTION OF THE EMBODIMENTS

Figure 1A:
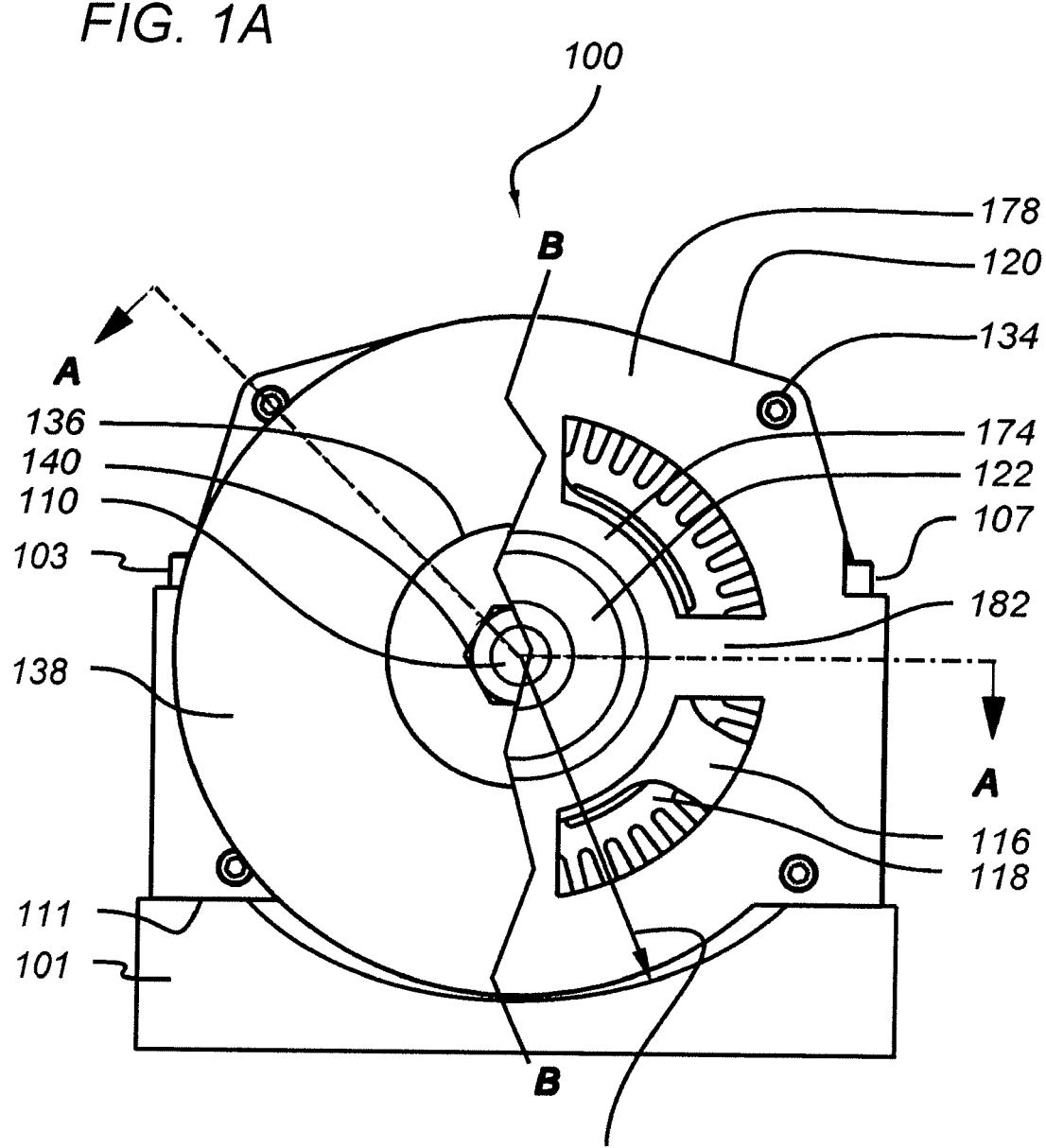
FIG. 1A is a front view of an existing embodiment of a Pad Mount alternator as reference for the present invention.
Figure 1B:
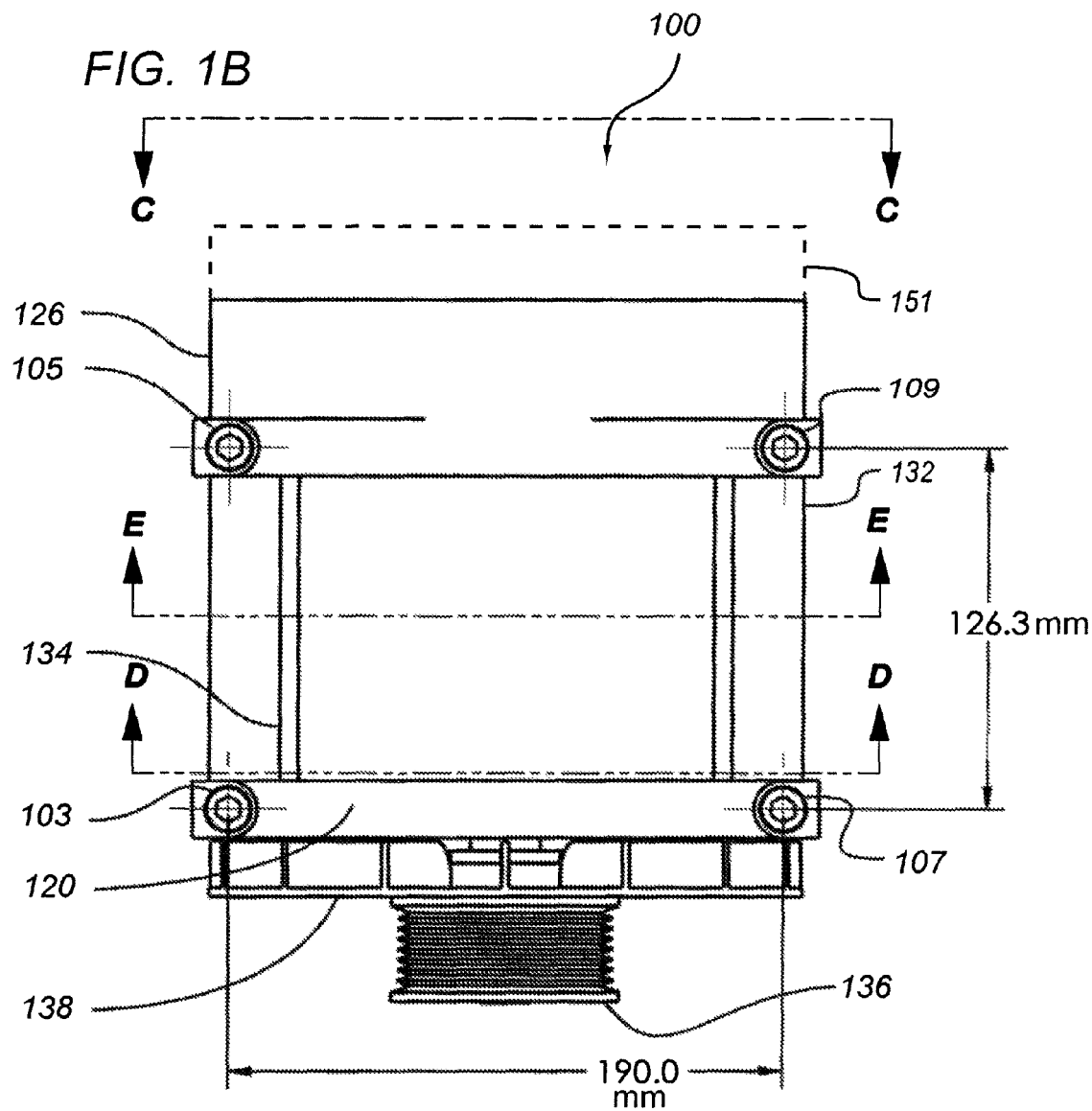
FIG. 1B is a top view of the Pad Mount alternator of FIG. 1A.

Referring now to FIGS. 1A-1G, as described by Lafontaine et al., to maximize power output in a permanent magnet machine, it is desirable to maximize certain dimensions such as the diameter of a stator and rotor. Put another way, it would be desirable to maximize the diameter of a circle described about the outer radius of the teeth 158 of the core 156 given size, housing, and mounting constraints. This diameter is referred to herein as the air gap diameter Dag (see FIG. 1F). As discussed above, the Society of Automotive Engineers, (SAE) has proposed four mounting standards, versions 2-1 through 2-4, suitable for vehicle applications. The mounting hole pattern shown in FIG. 1B with its radial spread between bolts 103 and 107 and between bolts 105 and 109, set at 190.0 mm, and axial spread between bolts 103 and 105 and between bolts 107 and 109, set at 126.3 mm conforms to SAE Pad Mount version 2-3 and is commonly found in truck applications. FIG. 1A shows mounting surface 111 of alternator 100 contacting mounting bracket 101 which maintains radial clearance required for the alternator, as proposed by SAE as a minimum of 70.0 mm but typically 102 mm is utilized. Unless otherwise indicated herein, all dimensions are provided in inches.

Figure 1F:
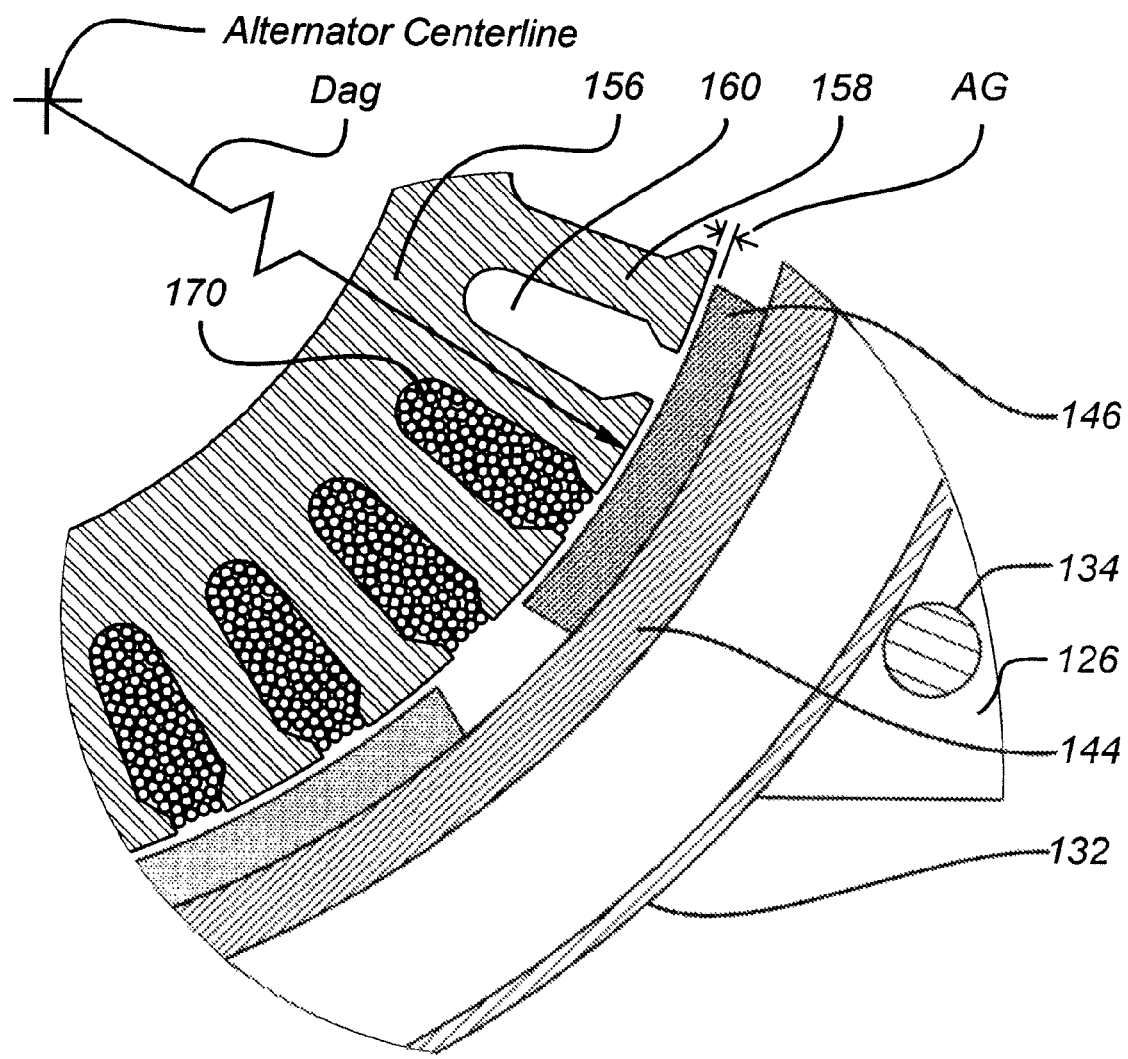
FIG. 1F is a detail view (taken along circle FF in FIG. 1E) of the Pad Mount alternator of FIGS. 1A and 1B.
Figure 1G:
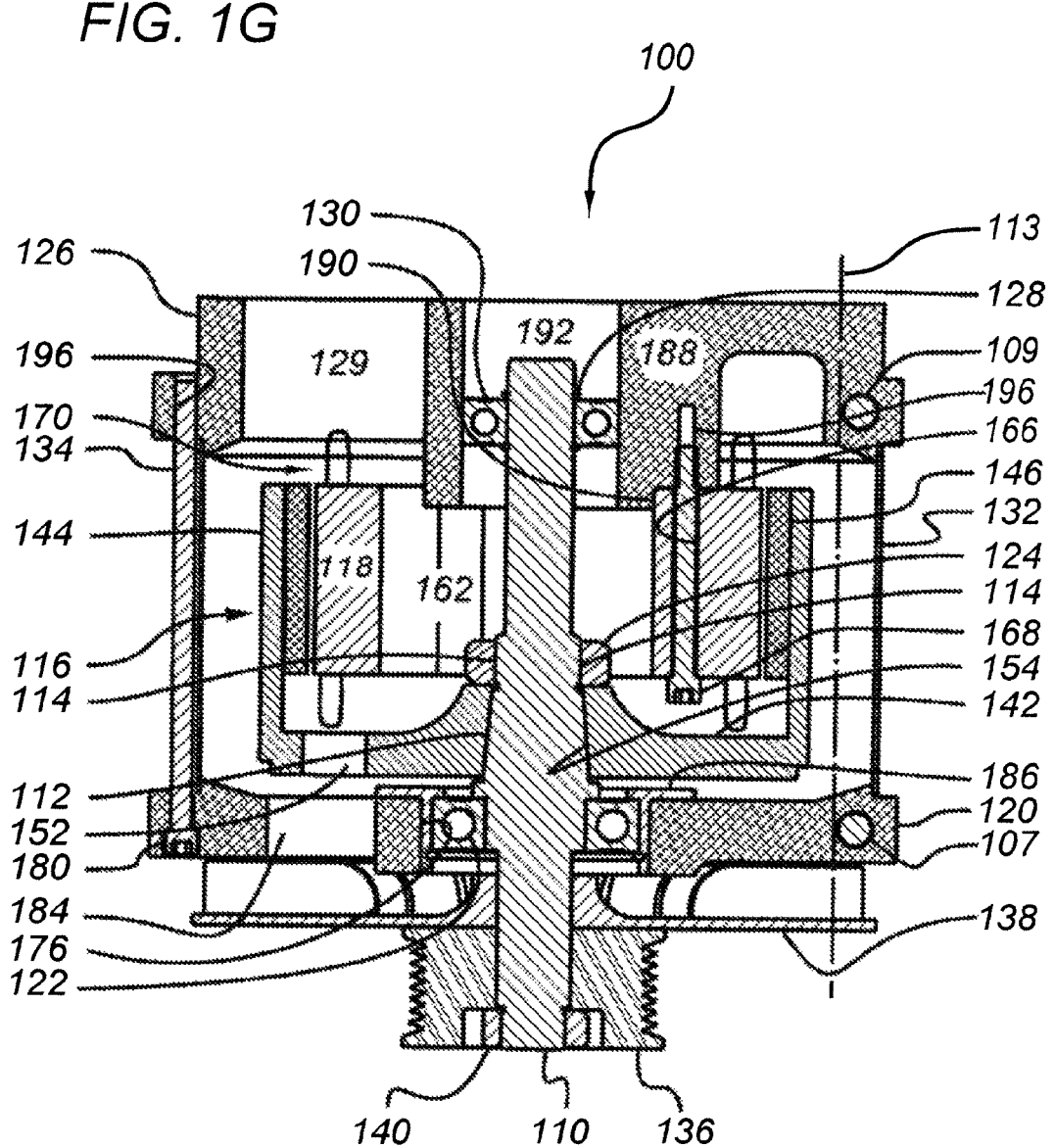
FIG. 1G is a schematic sectional view (taken along line AA in FIG. 1A) of the Pad Mount alternator of FIGS. 1A and 1B.
Figure 1H:
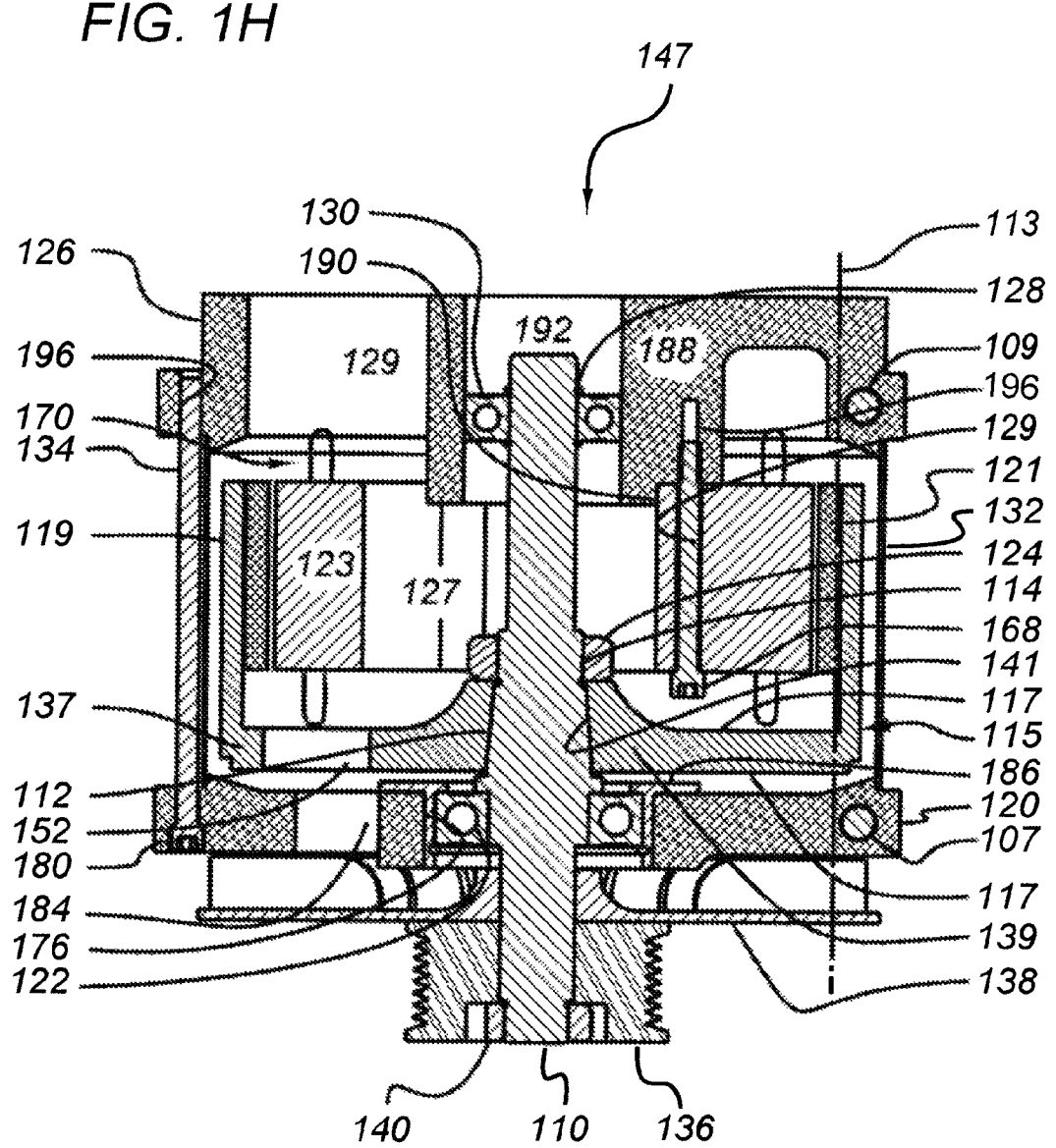
FIG. 1H is a schematic sectional view (taken along line AA in FIG. 1A) of the Pad Mount alternator of FIGS. 1A and 1B illustrating a larger diameter rotor.
Figure 1I:
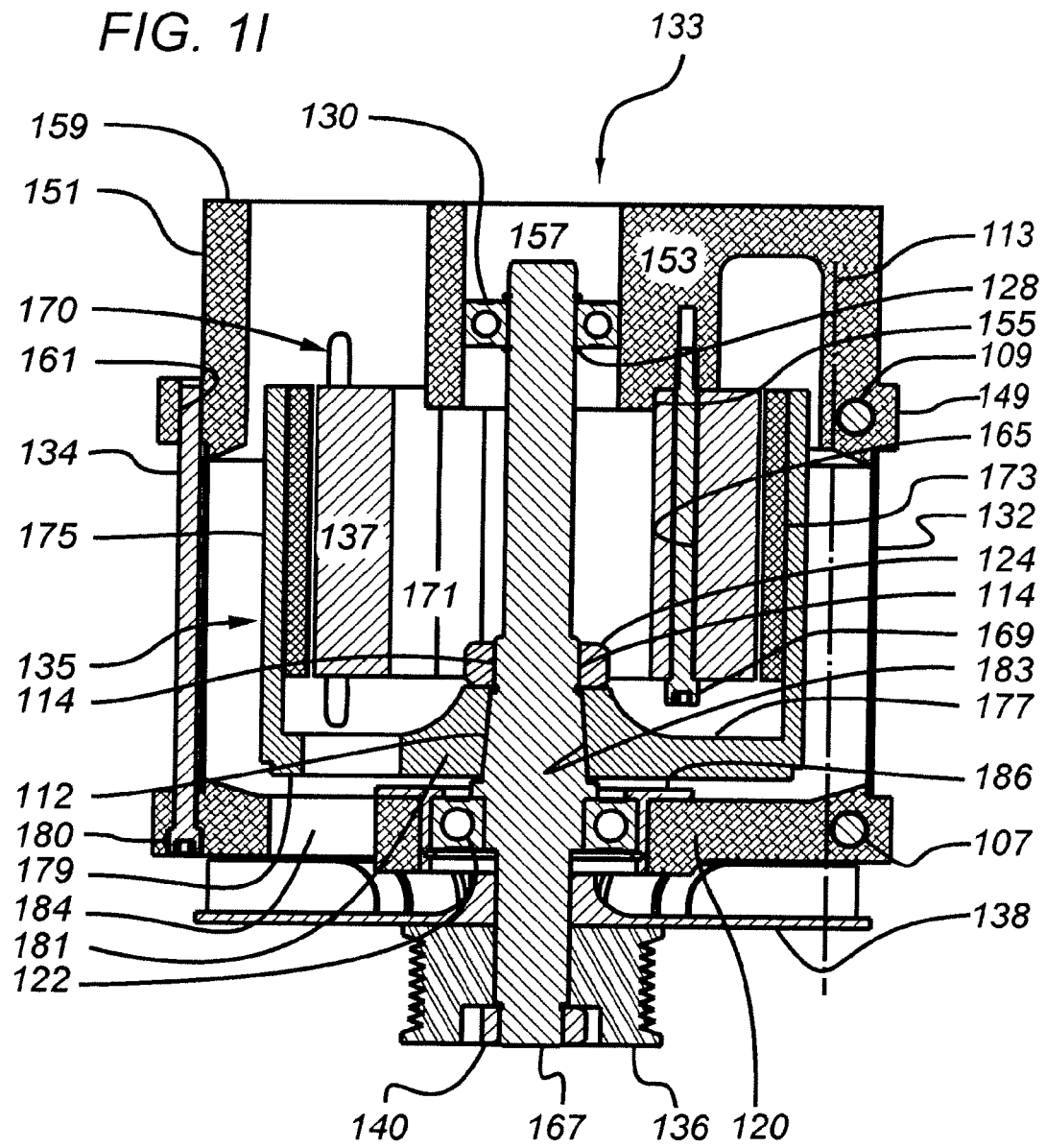
FIG. 1I is a schematic sectional view (taken along line AA in FIG. 1A) of the Pad Mount alternator of FIGS. 1A and 1B illustrating an axially longer rotor.

When considering mounting bolts 103, 105, 107 and 109 in Pad Mount applications there are two current methods of increasing power. The first is to increase the diameter of the rotor such that its overall length fits between the axial spread of the mounting bolts to avoid interference as best seen in FIG. 1H. The second method is to increase the overall length of the rotor by selecting a rotor diameter that avoids interference with the radial spread of the mounting bolts as best seen in FIG. 1I. Of the two methods, increasing diameter is more desirable since the increase in power is proportional to the square of the diameter whereas increasing rotor length only yields an increase in power proportional to length.

Conventional alternator manufacturers have chosen to design alternators with the overall stator and armature diameters within the radial spread as proposed by the SAE. This is in part due to the increase the armature of a conventional alternator adds to the overall diameter, i.e. a modest increase in power for a conventional alternator translates to an unacceptable increase in diameter. As a result the approach has been to increase the axial length rather than diameter. FIG. 1G shows witness line 113 illustrating the maximum air gap diameter from the central axis of the alternator that could be attained in an alternator when restricted by the radial spread of the mounting bolts. In reality the maximum attainable radius for the rotor is further reduced due to material of endplate 126 surrounding each mounting bolt. Although the preferred method of increasing output is to increase the overall air gap diameter, the possible overall axial length is limited thereby limiting potential output. Conversely, increasing the axial length of the rotor to improve output is limited due to the diminished air gap diameter. It would be desirable therefore to incorporate both increased diameter and increased axial length in a single Pad Mount alternator to maximize potential output.

Referring now to FIGS. 1A-1G an apparatus for converting between mechanical and electrical energy, e.g., alternator 100, which conforms to SAE proposed pad mount standard version 2-3, comprises: a shaft 110, preferably including a tapered projecting portion 112 and a threaded portion 114 (best seen in FIG. 1G); a rotor 116; a stator 118; a front endplate 120; a front bearing 122; a rear endplate 126; a rear shaft retaining rings 128; a rear bearing 130; an outer casing 132 and respective tie rods 134. Rotor 116 is mounted on shaft 110 for rotation with the shaft. Stator 118 is closely received within rotor 116, separated from rotor 116 by a small air gap AG. Front endplate 120, front bearing 122, rear bearing 130, rear endplate 126, outer casing 132 and tie rods 134 cooperate as a support assembly to maintain alignment of shaft 110, rotor 116, and stator 118. Shaft 110 is maintained by bearings 122 and 130, which are mounted on front endplate 120 and rear endplate 126, respectively, and rotatably maintain and align shaft 110 concentric and perpendicular with the endplates. Rotor 116 is mounted for rotation on shaft 110 and fixed axially by jam nut 124, positively positioned by cooperation with tapered shaft portion 112. Rear endplate 126 mounts and locates stator 118 so that it is disposed within rotor 116 properly aligned with shaft 110 and rotor 116. Outer casing 132 has end faces perpendicular to its axis (is preferably cylindrical) and is disposed between front endplate 120 and rear endplate 126. Tie rods 134; compress endplates 120 and 126 against outer casing 132, keeping the components squared and in alignment.

In a typical automotive alternator application, pulley 136, fan 138 and nut 140 are mounted on the end of shaft 110. Power from an engine (not shown) is transmitted through an appropriate belt drive (not shown) to pulley 136, and hence shaft 110. Torque so applied to the shaft 110 in turn causes rotor 116 to rotate about stator 118. Rotor 116 generates a magnetic field, which interacts with windings on stator 118. As the magnetic field intercepts the windings, an electrical current is generated, which is provided to a suitable load. The induced current is typically applied to a bridge rectifier, sometimes regulated, and provided as an output. In some instances, the regulated output signal is applied to an inverter to provide an AC output.

As best seen in FIG. 1G, rotor 116 preferably comprises an endcap 142, a cylindrical casing 144 and a predetermined number (e.g. 8 pairs) of alternatively poled permanent magnets 146 disposed in the interior side wall of casing 144.

As best seen in FIG. 1D, rotor endcap 142 is suitably substantially open, including a peripheral portion 131, respective cross-arms 148 and a central rotor hub 150 to provide for connection to shaft 110. Respective air passageways 152 are provided through endcap 142, bounded by peripheral portion 131, adjacent cross arms 148, and central hub 150. Central rotor hub 150 includes a through-bore 154 having a predetermined taper (e.g. 1 in. per foot) corresponding to that of shaft portion 112. In assembly, shaft 110 is journaled through bore 154, such that shaft tapered portion 112 is received in bore 154 just forward of threaded shaft portion 114. Threaded shaft portion 114 cooperates with jam nut 124 to positively locate rotor 116 on shaft 110. In general, the thickness of crossarms 148 is suitably chosen to be as thin as possible (to minimize weight and material cost) while still capable of withstanding expected loads, suitably in the range of ⅜ in. to ⅝ inch at its thinnest point. Since rotor casing 144 is, in effect, cantilevered from endcap 142, the necessary thickness is proportional to the length of casing 144. Rotor hub 150, in the vicinity of bore 154, is suitably thick enough to provide adequate surface contact with tapered shaft portion 112, suitably on the order of 1½ inch.

Stator 118 suitably comprises a core 156 and conductive windings 170. Core 156 suitably comprises laminated stack of thin sheets of soft magnetic material, e.g. non-oriented, low loss (lead free) steel, that are cut or punched to the desired shape, aligned and joined (e.g. welded or epoxied together in a precision jig to maintain the separate laminations in alignment). As best seen in FIGS. 1E and 1F, core 156 is generally cylindrical, with an axially crenellated outer peripheral surface, i.e., includes a predetermined number of teeth 158 and slots 160. The tooth alignment is typically axial but under certain control systems requiring the acquisition of waveform timing and/or to eliminate the cogging effect found in axially aligned laminations, the laminations can be progressively skewed of a prescribed tooth offset from end to end (preferably but not limited to an offset of one tooth) as will be explained later, a method of securing a skewed stator without negatively impacting air flow will be explained. Core 156 is preferably substantially open, with a central aperture 162, and suitably includes crossarms 164 and axial through-bores 166 to facilitate mounting to rear endplate 126 using mounting bolts 168. As will be described later radial slots can be utilized to mount the lamination stack to optimize air flow through central aperture 162

Windings 170, formed of a suitably insulated electrical conductor, preferably varnished copper motor wire, are provided on core 156, wound through a respective slot 160, outwardly along the side face of core 156 around a predetermined number of teeth 158, then back through another slot 160.

In assembly, stator 118 is disposed coaxially with rotor 116, and is closely received within interior cavity of rotor 116. As will be explained, rear endplate 126 mounts and locates stator 118 so that it is properly aligned within internal chamber of rotor 116. The peripheral surface of stator core 156 is separated from the interior surface of magnets 146 by a small predetermined air gap AG (best seen in FIG. 1F). Air gap AG is suitably in the range of 20 to 40 thousands of an inch, and in the embodiments of FIGS. 1A-1I on the order of 30 thousands of an inch, e.g., 31 thousands of an inch. Accordingly, the inner diameter of casing 144, magnets 146, and outer diameter of stator core 156 are preferably held to close tolerances to maintain alignment. It is important that rotor 116 and stator 118 be carefully aligned, and displacement of the elements from their normal positions due to external forces on the alternator held below a threshold value.

As noted above, alignment of shaft 110, rotor 116, and stator 118 achieved by a bearing structure comprising front endplate 120, front bearing 122, rear bearing 130, rear endplate 126, outer casing 132 and tie rods 134. Bearings 122 and 130, in effect, provide respective points of rotatable connection between shaft 110 and the bearing structure. Bearings 122 and 130, and hence shaft 110, are disposed concentric and perpendicular with endplates 120 and 126, respectively. Rotor 116 is preferably positively positioned with respect to shaft 110 through cooperation of tapered rotor hub through bore 154 and tapered shaft portion 112. Stator 118 is located relative to and aligned with shaft 110, and hence rotor 116, by rear endplate 126. The alignment of endplates 120 and 126 is maintained by outer casing 132 and tie rods 134.

Front endplate 120 is suitably generally cylindrical, including: a centrally disposed hub 174, including a coaxial aperture 176 with a peripheral portion 178 including respective (e.g. 4) counter bored holes 180 disposed at predetermined radial distances from the center of aperture 176, distributed at equal angular distances, to receive tie rods 134; and respective (e.g., 4) crossarms 182 connecting peripheral portion 178 to hub 174, and defining respective air passages 184. Front endplate 120 is dimensioned and machined to high tolerance (e.g. plus or minus 0.0008 TYP for aperture 176, 0.005 TYP for other features, such as tie rod hole 180 patterns, outer case shoulder, mounting hole patterns), suitably formed of metal e.g. cast aluminum, and should be sufficiently strong to withstand the rotational loads created by the turning of shaft 110 and rotor 116, as well as side loading that occurs as a result of the belt pulling on pulley 136. Front bearing 122 is closely received in bearing sleeve 186. Front endplate 120 and bearing sleeve 186 which is used to distribute the stresses produced by the loads transferred from shaft 110 to bearing 122. Bearing sleeve 186 locates front bearing 122 and shaft 110.

Rear endplate 126 carries and locates rear bearing 130, mounts and locates stator 118. Rear endplate 126 suitably includes a stepped central hub 188 having a forward reduced diameter portion 190 and central aperture 192 there through, and a generally cylindrical rearward going outer peripheral portion 194, preferably having the same outer profile as front endplate 120, connected to hub 188 by respective crossarms 145. Respective tapped holes 196 are provided cylindrical outer peripheral portion 194, at the same radial distance from center and angular dispositions as counter bored holes 180 in front endplate 120. A predetermined number of tapped holes 196 (e.g. 4) corresponding to stator crossarm bores 166 are provided in the stepped surface of projection 188. The outer diameter of reduced diameter portion 190 is substantially equal to (but slightly less than) the diameter of the concentric radial locating features 198 on crossarms 164, so that rear endplate portion 190 may be closely received within the concentric radial locating features 198 on crossarms 164 of stator 118. Rear endplate 126 is dimensioned and machined to high tolerance (e.g. plus or minus 0.0008 TYP for central aperture 192, 0.005 TYP for other features, such as tapped holes 196 patterns, outer case shoulder, mounting hole patterns), suitably formed of metal e.g. cast aluminum. Rear bearing 130 is closely received within aperture 192 of rear endplate hub 188 and thus centers shaft 110. Stator 118 is mounted on hub 188, with reduced diameter hub portion 190 received within the concentric radial locating features 198 on crossarms 164 of stator 118 and the stator rear sidewall against the hub step. Respective bolts 168 journaled through bores 166 and secured in tapped holes 196, secure stator 118 to rear endplate 126. Stator 118 is thus positively located and aligned relative to shaft 110. Since endplates 120 and 126 are held in alignment with each other by outer casing 132 and tie rods 134, shaft 110 (and tapered portion 112) is held in alignment with endplates 120 and 126 by bearings 122 and 130, and stator 118 is positively positioned and aligned with shaft 110 by endplate 126, the positive positioning and a centering of rotor 116 on shaft 110 also provides relative positioning and alignment between rotor 116 and stator 118.

For a given stator length, increasing the diameter of a stator and rotor of a permanent magnet machine, more specifically, increasing the air gap diameter Dag produces a significant increase in output (output increases by the square of the diameter).

Referring now to FIG. 1H, increasing the air gap diameter significantly increases output of alternator 100 without changing any components other than increasing the diameter of the rotor and stator. Alternator 147, which also conforms to SAE proposed pad mount standard version 2-3, comprises: a shaft 110, preferably including a tapered projecting portion 112 and a threaded portion 114 (best seen in FIG. 1H); a rotor 115; a stator 123; a front endplate 120; a front bearing 122; a rear endplate 126; a rear shaft retaining rings 128; a rear bearing 130; an outer casing 132 and respective tie rods 134.

Rotor 115 is mounted on shaft 110 for rotation with the shaft 110. Rotor 115 has a larger diameter then that of rotor 116 and extends beyond witness line 113. Like rotor 116, rotor 115 is comprised of an endcap 117, a cylindrical casing 119 and a predetermined number (e.g. 8 pairs) of alternatively poled permanent magnets 121 disposed in the interior side wall of casing 119. Rotor endcap 117 is suitably substantially open, including a peripheral portion 137, respective crossarms (not shown) and a central rotor hub 139 to provide for connection to shaft 110. Respective air passageways 152 are provided through endcap 117, bounded by peripheral portion 137, adjacent cross arms (not shown), and central hub 139. Central rotor hub 139 includes a through-bore 141 having a predetermined taper (e.g. 1 in. per foot) corresponding to that of shaft portion 112. In assembly, shaft 110 is journaled through bore 141, such that shaft tapered portion 112 is received in bore 141 just forward of threaded shaft portion 114. Threaded shaft portion 114 cooperates with jam nut 124 to positively locate rotor 115 on shaft 110. In general, the thickness of the crossarms (not shown) is suitably chosen to be as thin as possible (to minimize weight and material cost) while still capable of withstanding expected loads, suitably in the range of ⅜ in. to ⅝ inch at its thinnest point. Since rotor casing 119 is, in effect, cantilevered from endcap 117, the necessary thickness is roughly proportional to the length of casing 119. Rotor hub 139, in the vicinity of bore 141, is suitably thick enough to provide adequate surface contact with tapered shaft portion 112, suitably on the order of 1½ inch. In all physical and functional respects, rotor 115 is similar to rotor 116 of alternator 100

There is a corresponding increase in the diameter of stator 123 to match that of rotor 115 which increases the air gap diameter Dag. Stator 123 suitably comprises a core (not shown) and conductive windings 170. The stator core suitably comprises laminated stack of thin sheets of soft magnetic material, e.g. non-oriented, low loss (lead free) steel, that are cut or punched to the desired shape, aligned and joined (e.g. welded or epoxied together in a precision jig to maintain the separate laminations in alignment). The core is generally cylindrical, with an axially crenellated outer peripheral surface, i.e., includes a predetermined number of teeth and slots (reference FIG. 1E) and is preferably substantially open, with a central aperture 127, and suitably includes crossarms (not shown) and axial through-bores 129 to facilitate mounting to rear endplate 126 using mounting bolts 168. Windings 170, formed of a suitably insulated electrical conductor, preferably varnished copper motor wire, are provided on the core (not shown), wound through a respective slot (not shown), outwardly along the side face of core (not shown) around a predetermined number of teeth (not shown), then back through another slot (not shown).

In assembly, stator 123 is disposed coaxially with rotor 115, and is closely received within interior cavity of rotor 115. The peripheral surface of stator core (not shown) is separated from the interior surface of magnets 121 by a small predetermined air gap AG (see, e.g., FIG. 1F). Air gap AG is suitably in the range of 20 to 40 thousands of an inch, and in the embodiments of FIGS. 1A-1I on the order of 30 thousands of an inch, e.g., 31 thousands of an inch. Accordingly, the inner diameter of casing 119, magnets 121, and outer diameter of stator 123 are preferably held to close tolerances to maintain alignment. It is important that rotor 116 and stator 118 be carefully aligned, and displacement of the elements from their normal positions due to external forces on the alternator held below a threshold value.

Stator 123 is mounted on hub 188, with reduced diameter hub portion 190 received within the concentric radial locating features 198 on crossarms (not shown) of stator 118 and the stator rear sidewall against the hub step. Respective bolts 168 journaled through bores 129 and secured in tapped holes 196, secure stator 123 to rear endplate 126. Stator 123 is thus positively located and aligned relative to shaft 110. Since endplates 120 and 126 are held in alignment with each other by outer casing 132 and tie rods 134, shaft 110 (and tapered portion 112) is held in alignment with endplates 120 and 126 by bearings 122 and 130, and stator 123 is positively positioned and aligned with shaft 110 by endplate 126, the positive positioning and a centering of rotor 115 on shaft 110 also provides relative positioning and alignment between rotor 116 and stator 118. In all respects, physical and functional, stator 123 is similar to stator 118 of alternator 100.

The second method of improving output in a permanent magnet machine is achieved by increasing the axial length of both the rotor and stator. Lengthening the rotor and stator is a less desirable method since the increase in output varies linearly in relationship to increases in length. However, in certain applications increasing length of the rotor and stator may be the only viable method of increasing output. Among other drawbacks to increasing length, as described by Lafontaine et al., the length of the rotor in applications such as engine mounting is practically limited by the forces exerted on the alternator from a cantilevered installation.

Referring now to FIG. 1I; Alternator 133, which also conforms to SAE proposed pad mount standard version 2-3, comprises: a shaft 167, preferably including a tapered projecting portion 112 and a threaded portion 114 (best seen in FIG. 1H); a rotor 135; a stator 137; a front endplate 120; a front bearing 122; a rear endplate 149; a rear shaft retaining rings 128; a rear bearing 130; an outer casing 132 and respective tie rods 134.

The outer diameter of rotor 135 is designed such that clearance is maintained between rotor casing 175 and rear endplate 149. Rotor 135 is mounted on shaft 167 for rotation with the shaft 110. Rotor 135 is comprised of an endcap 177, a cylindrical casing 175 and a predetermined number (e.g. 8 pairs) of alternatively poled permanent magnets 173 disposed in the interior side wall of casing 175. Rotor endcap 177 is suitably substantially open, including a peripheral portion 179, respective cross-arms (not shown) and a central rotor hub 181 to provide for connection to shaft 167. Respective air passageways 183 are provided through endcap 177, bounded by peripheral portion 179, adjacent cross arms (not shown), and central hub 181. Central rotor hub 181 includes a through-bore 183 having a predetermined taper (e.g. 1 in. per foot) corresponding to that of shaft portion 112. In assembly, shaft 167 is journaled through bore 183, such that shaft tapered portion 112 is received in bore 183 just forward of threaded shaft portion 114. Threaded shaft portion 114 cooperates with jam nut 124 to positively locate rotor 135 on shaft 167. In general, the thickness of the crossarms (not shown) is suitably chosen to be as thin as possible (to minimize weight and material cost) while still capable of withstanding expected loads, suitably in the range of ⅝ in. to 5¾ inch at its thinnest point due to the increased length. Since rotor casing 175 is, in effect, cantilevered from endcap 177, the necessary thickness is roughly proportional to the length of casing 177. Rotor hub 181, in the vicinity of bore 183, is suitably thick enough to provide adequate surface contact with tapered shaft portion 112, suitably on the order of 1½ inch. In all physical and functional respects, rotor 135 is similar to rotor 116 of alternator 100.

Rear endplate 149 carries and locates rear bearing 130, mounts and locates stator 137. Rear endplate 149 includes a rearward extension 151 to accept the increased length of stator 137 and suitably includes a stepped central hub 153 having a forward reduced diameter portion 155 and central aperture 157 there through, and a generally cylindrical rearward going outer peripheral portion 159, preferably having the same outer profile as front endplate 120. Respective tapped holes 161 are provided cylindrical outer peripheral portion 159, at the same radial distance from center and angular dispositions as counter bored holes 180 in front endplate 120. A predetermined number of tapped holes 163 (e.g. 4) corresponding to stator 137 crossarm bores 165 are provided in the stepped surface of projection 153. The outer diameter of reduced diameter portion 155 is substantially equal to (but slightly less than) the diameter of the concentric radial locating features (not shown) on crossarms (not shown), so that rear endplate portion 155 may be closely received within the concentric radial locating features (not shown) on crossarms (not shown) of stator 137. Rear endplate 149 is dimensioned and machined to high tolerance (e.g. plus or minus 0.0008 TYP for central aperture 157, 0.005 TYP for other features, such as tapped holes 163 patterns, outer case shoulder, mounting hole patterns), suitably formed of metal e.g. cast aluminum. Rear bearing 130 is closely received within aperture 157 of rear endplate hub 153 and thus centers shaft 167. Stator 137 is mounted on hub 153, with reduced diameter hub portion 155 received within the concentric radial locating features (not shown) on crossarms (not shown) of stator 137 and the stator rear sidewall against the hub step. Respective bolts 169 journaled through bores 165 and secured in tapped holes 163, secure stator 137 to rear endplate 149. Stator 137 is thus positively located and aligned relative to shaft 167. Since endplates 120 and 149 are held in alignment with each other by outer casing 132 and tie rods 134, shaft 167 (and tapered portion 112) is held in alignment with endplates 120 and 149 by bearings 122 and 130, and stator 137 is positively positioned and aligned with shaft 167 by endplate 149, the positive positioning and a centering of rotor 135 on shaft 167 also provides relative positioning and alignment between rotor 135 and stator 137.

Stator 137, with its corresponding increase in the length to match that of rotor 135, suitably comprises a core (not shown) and conductive windings 170. The stator core suitably comprises laminated stack of thin sheets of soft magnetic material, e.g. non-oriented, low loss (lead free) steel, that are cut or punched to the desired shape, aligned and joined (e.g. welded or epoxied together in a precision jig to maintain the separate laminations in alignment). The core is generally cylindrical, with an axially crenellated outer peripheral surface, i.e., includes a predetermined number of teeth and slots (reference FIG. 1E) and is preferably substantially open, with a central aperture 171, and suitably includes crossarms (not shown) and axial through-bores 165 to facilitate mounting to rear endplate 149 using mounting bolts 169. Windings 170, formed of a suitably insulated electrical conductor, preferably varnished copper motor wire, are provided on the core (not shown), wound through a respective slot (not shown), outwardly along the side face of core (not shown) around a predetermined number of teeth (not shown), then back through another slot (not shown).

In assembly, stator 137 is disposed coaxially with rotor 135, and is closely received within interior cavity of rotor 135. The peripheral surface of stator core (not shown) is separated from the interior surface of magnets 173 by a small predetermined air gap AG (reference FIG. 1F). The air gap AG is suitably in the range of 20 to 40 thousands of an inch, and in the embodiments of FIG. 1I on the order of 30 thousands of an inch, e.g., 31 thousands of an inch. Accordingly, the inner diameter of rotor casing 175, magnets 173, and outer diameter of stator 137 are preferably held to close tolerances to maintain alignment. It is important that rotor 135 and stator 137 be carefully aligned, and displacement of the elements from their normal positions due to external forces on the alternator held below a threshold value.

As described above, alternators conforming to the proposed SAE Pad Mount standard are limited by the mounting bolt hole pattern. Manufacturers can either increase the air gap diameter Dag, fitting the rotor and stator between the axial mounting bolts or utilize a significantly smaller diameter rotor and stator and staying between the radial spread of the mounting bolts. Referring now to FIGS. 2A-2E that illustrate a method of dramatically increasing alternator output by combining diametrically opposed rotor casings while still maintaining compatibility with the SAE proposed Pad Mount Standard.

Alternator 200 has many similar features found in alternator 100; a shaft 202, preferably including a tapered projecting portion 112 and a threaded portion 114; a jam nut 124; front end plate 204; a front bearing 122; a bearing sleeve 176; a rear bearing 130; a rear shaft retaining ring 128; an outer casing 132 and respective tie rods 134. Rear end plate 206 has been extended to except rear stator 217 and rotor portion 209.

Rotor 201, like rotor 116, has support plate 203, analogous to rotor endplate 134; but is centrally located with two diametrically opposed rotor casing portions 207; and 209; of unequal diameters. Rotor casing portion 209 is of a reduced diameter sufficient to clear mounting bolts 105 and 109. Front endplate 206, unlike front endplate 120, mounts and locates front stator 215 as well as carrying and locating front bearing 122.

Figure 2A:
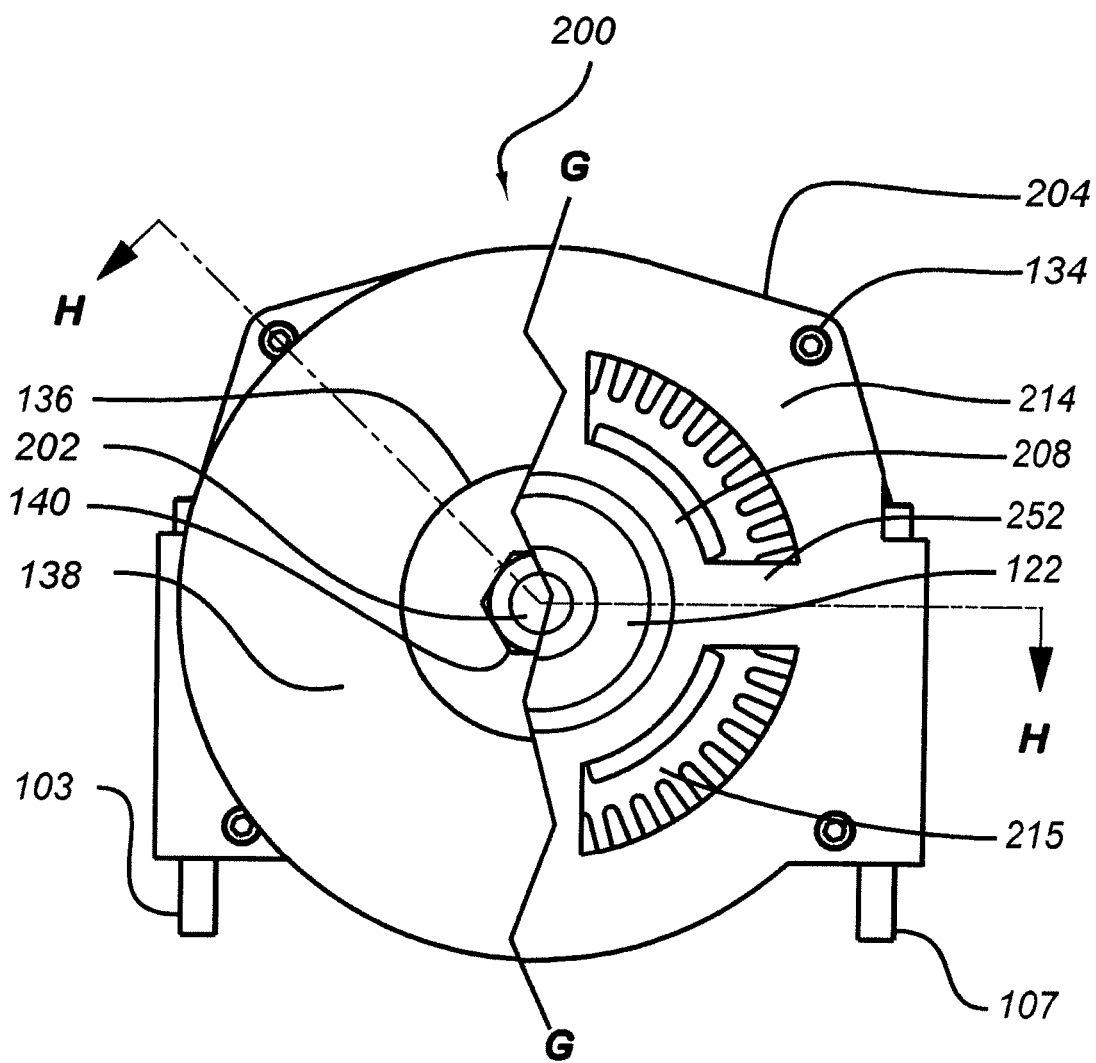
FIG. 2A is a front view of the first embodiment of a Pad Mount alternator in accordance with the present invention illustrating a method of increasing output utilizing two diametrically opposed but unified rotors.
Figure 2B:
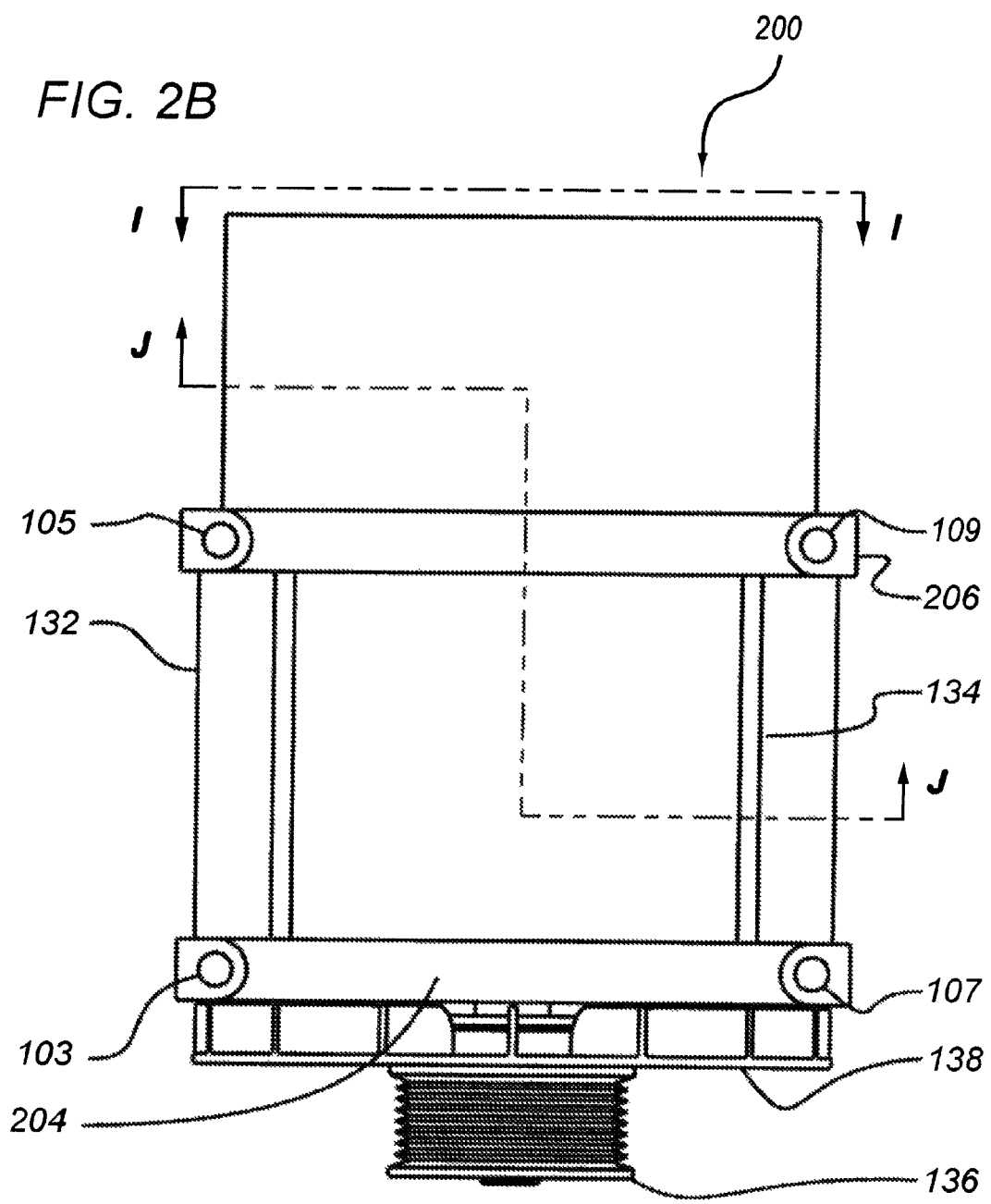
FIG. 2B is a top view of the Pad Mount alternator of FIG. 2A.
Figure 2D:
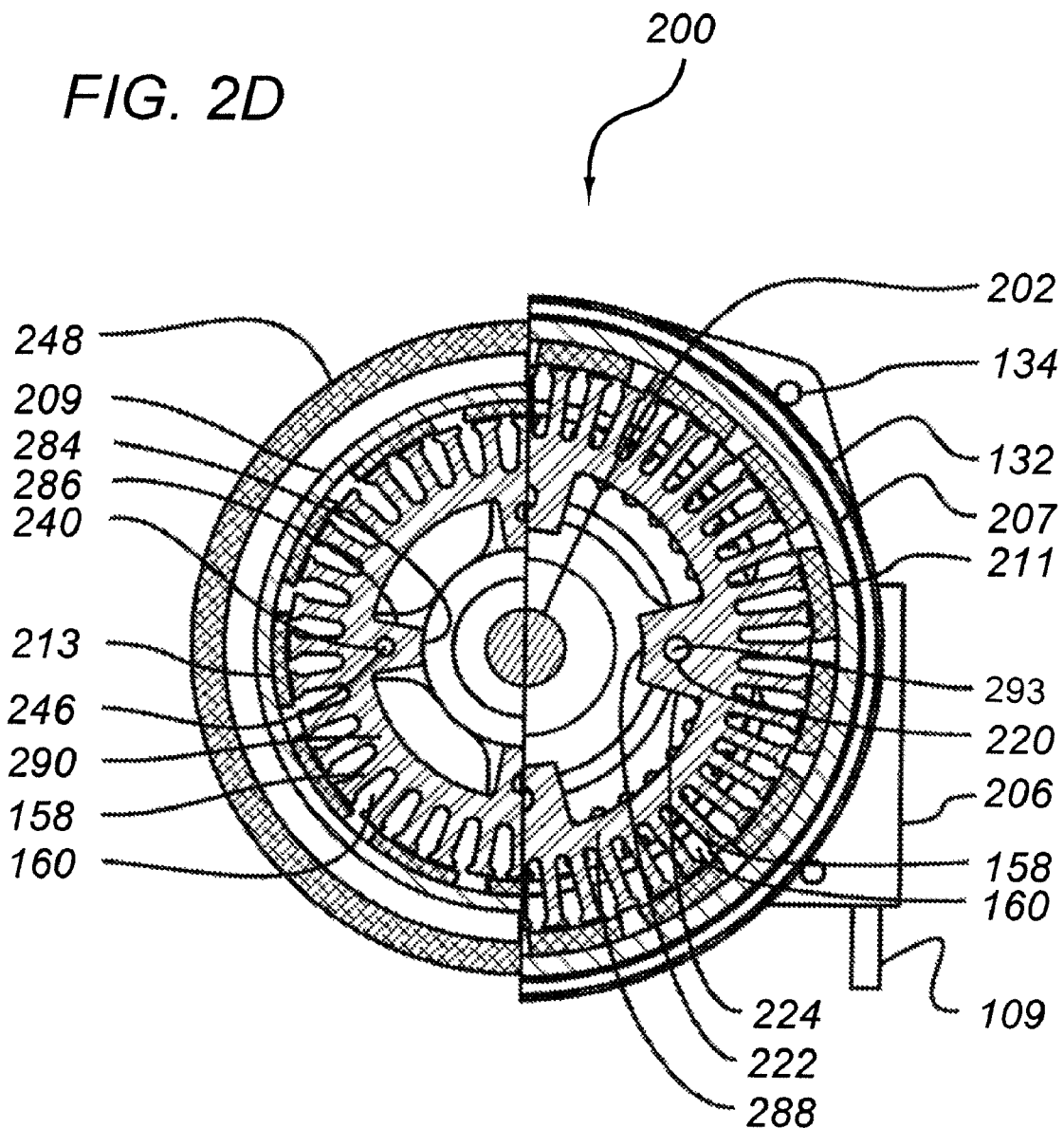
FIG. 2D is a section view of the alternator of FIG. 2B (taken along line J-J).

Stators 215 and 217 suitably comprise cores 288 and 290 respectively and conductive windings 272 and 254 respectively. Cores 288 and 290 suitably comprises laminated stack of thin sheets of soft magnetic material, e.g. non-oriented, low loss (lead free) steel, that are cut or punched to the desired shape, aligned and joined (e.g. welded or epoxied together in a precision jig to maintain the separate laminations in alignment). As best seen in FIG. 2D, cores 288 and 290 are generally cylindrical, with an axially crenellated outer peripheral surface, i.e., includes a predetermined number of teeth 158 and slots 160. Both stator 215 and 217 are preferably substantially open, with stator 215 having a central aperture 266 and suitably includes crossarms 224, radial locating feature 222 and axial through-bores 220 to facilitate mounting to front endplate 204 using mounting bolts 246 and stator 217 having a central aperture 262 and suitably includes crossarms 286, radial locating feature 284 and axial through-bores 240 to facilitate mounting to rear endplate 248 using mounting bolts 246. As will be described later radial slots can be utilized to mount the lamination stack to optimize air flow through the central apertures 262 and 266

Windings 254 and 272, formed of a suitably insulated electrical conductor, preferably varnished copper motor wire, are provided on cores 288 and 290, wound through a respective slot 160, outwardly along the side face of cores 288 and 290 around a predetermined number of teeth 158, then back through another slot 160.

In assembly, stators 215 and 217 are disposed coaxially with rotor 201, and are closely received within interior cavities of rotor 201. As will be explained, rear endplate 206 mounts and locates rear stator 217 and front endplate 204 mounts and locates front stator 215 so that it is properly aligned within internal chambers of rotor 201. The peripheral surface of stator cores 288 and 290 are separated from the interior surface of magnets 211 and 213 by a small predetermined air gap diameter Dag (best seen in FIG. 1F).

Front endplate 204 suitably includes a stepped central hub 208 having a forward reduced diameter portion 210 and central aperture 212 there through, and a generally cylindrical outer peripheral portion 214 connected to hub 208 by respective crossarms 252. Respective counter bored holes 216 are provided cylindrical outer peripheral portion 214. A predetermined number of tapped holes 218 (e.g. 4) corresponding to stator crossarm bores 220 are provided in the stepped surface of projection 208. The outer diameter of reduced diameter portion 210 is substantially equal to (but slightly less than) the diameter of the concentric radial locating features 222 on crossarms 224, so that front endplate portion 210 may be closely received within the concentric radial locating features 222 on crossarms 224 of stator 215. Front bearing sleeve 176 is closely received within counter bore 226 of front endplate hub 208 and thus centers shaft 202. Stator 215 is mounted on hub 208, with reduced diameter hub portion 210 received within the concentric radial locating features 222 on crossarms 224 of stator 215 and the stator front sidewall against the hub step. Respective bolts 293 journaled through bores 220 and secured in tapped holes 218, secure stator 215 to front endplate 204. Stator 215 is thus positively located and aligned relative to shaft 202.

Rear endplate 206, to accommodate the increase in axial length as a result of the addition of rear rotor portion 209 and stator 217, has cylindrical extension 248 that carries and locates rear bearing 130, mounts and locates stator 217. Cylindrical extension 248 must be of adequate strength to support the increased stress as a result of mounting stator 217. Rear endplate 206, has a generally cylindrical rearward going outer peripheral portion 234, preferably having the same outer profile as front endplate 204, cylindrical extension 248 suitably includes a stepped central hub 208 connected by respective crossarms 244 having a forward reduced diameter portion 230 and central aperture 232 there through. Respective tapped holes 236 are provided cylindrical outer peripheral portion 234, at the same radial distance from center and angular dispositions as counter bored holes 216 in front endplate 204. A predetermined number of tapped holes 238 (e.g. 4) corresponding to stator crossarm bores 240 are provided in the stepped surface of projection 228. The outer diameter of reduced diameter portion 230 is substantially equal to (but slightly less than) the diameter of the concentric radial locating features 284 on crossarms 286, so that rear endplate reduced portion 230 may be closely received within the concentric radial locating features 284 on crossarms 286 of stator 217. Rear bearing 130 is closely received within aperture 232 of rear endplate hub 228 and thus centers shaft 202. Stator 217 is mounted on hub 228, with reduced diameter hub portion 230 received within the concentric radial locating features 284 on crossarms 286 of stator 217 and the stator rear sidewall against the hub step. Respective bolts 246 journaled through bores 240 and secured in tapped holes 238, secure stator 217 to rear endplate 206. Stator 217 is thus positively located and aligned relative to shaft 202.

Rotor 201 is mounted on shaft 202 for rotation with the shaft. Stators 215; and 217 are closely received within rotor 201, separated from rotor 201 by a respective air gaps AG. Front endplate 204, bearing sleeve 186, front bearing 122, rear bearing 130, rear endplate 206, outer casing 132 and tie rods 134 cooperate as a support assembly to maintain alignment of shaft 202, rotor 201, and stators 215 and 217. Shaft 202 is maintained by bearings 122 and 130, which are mounted on front endplate 204 and rear endplate 206, respectively, and rotatably maintain and align shaft 202 concentric and perpendicular with the endplates. Rotor 201 is mounted for rotation on shaft 202, positively positioned by cooperation with tapered shaft portion 112. Front endplate 204 mounts and locates stator 215 that it is disposed within rotor 201 properly aligned with shaft 202 and rotor 201. Rear endplate 206 mounts and locates stator 217 so that it is disposed within rotor 201 properly aligned with shaft 202 and rotor 201. Outer casing 132 has end faces perpendicular to its axis (is preferably cylindrical) and is disposed between front endplate 204 and rear endplate 206. Tie rods 134; compress endplates 204 and 206 against outer casing 132, keeping the components squared and in alignment.

Figure 2E:
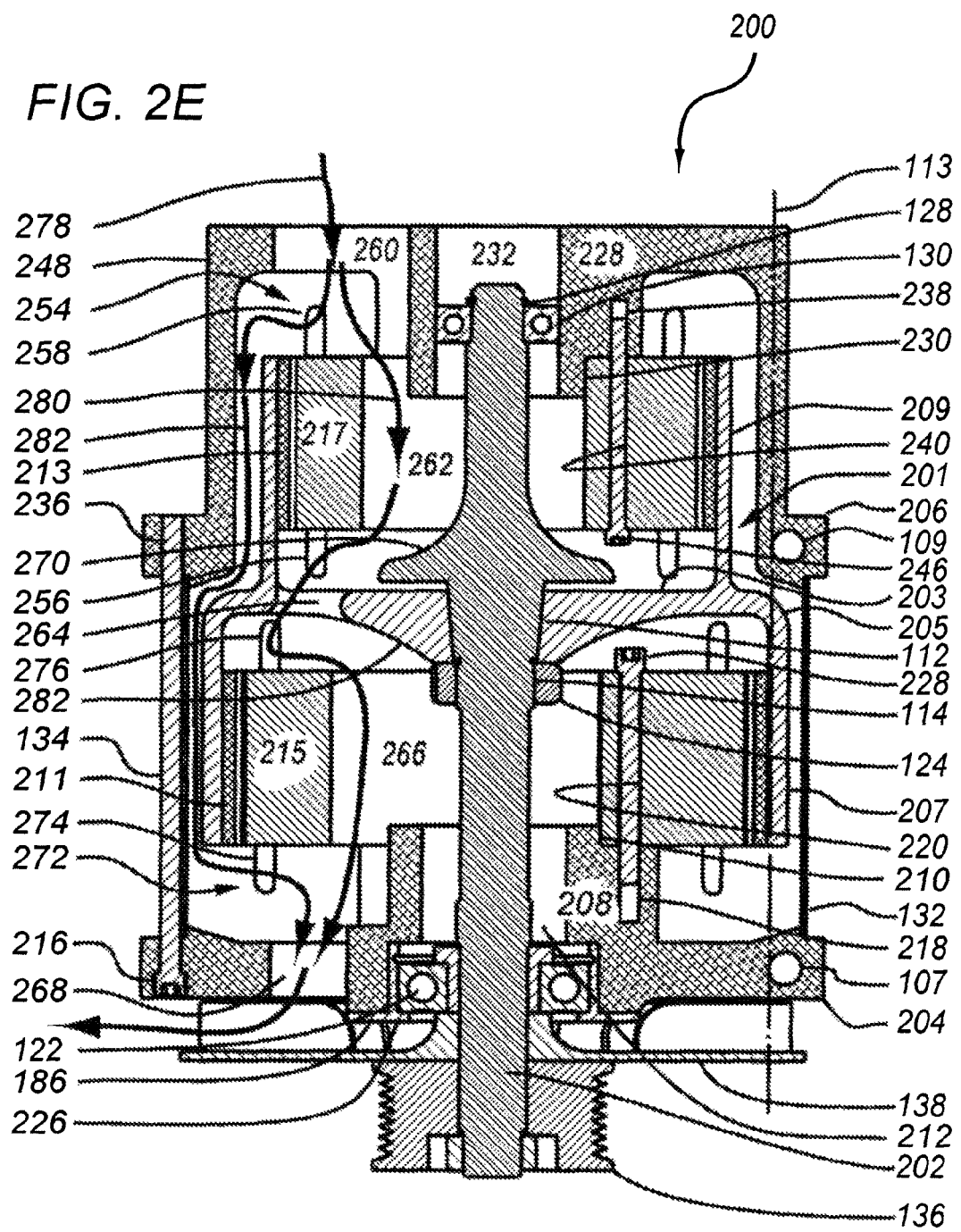
FIG. 2E is a schematic sectional view (taken along line H-H in FIG. 2A) of the Pad Mount alternator of FIGS. 2A and 2B.

Referring to FIG. 2E, a cooling airflow 278 entering alternator 200 is directed over stator windings 254 (preferably through loosely wrapped front-side and rear-side end turns 256 and 258 respectively) by employing a cooling system comprising air passageways 260 in rear end plate 206 (bounded by adjacent rear end plate crossarms 244, outer portion 248, and hub 228), stator 217 central aperture 262, rotor air passages 264, over stator windings 272 (preferably through loosely wrapped front-side and rear-side end turns 274 and 276 respectively) stator 215 central aperture 266 and front end plate air passages 268. Air flow 278 entering rear end plate air passage way 260 is directed to impinge on windings 254 (rear-side end turns 258), Air exiting stator central aperture 262 is directed to impinge on windings 254 (front-side end turns 256), by virtue of suitable relative disposition or contouring, or, as in the embodiment of FIG. 2E, cooperation with a shaft mounted rear deflector 270. Air exiting rotor air passages 264 is directed to impinge on windings 272 of stator 215 through rear-side end turns 276. After passing over rear-side end turns 276 is then directed to stator 215 central aperture 266 by use of rotor deflector 282 then over front-side end turns 274 then through front endplate 204 air passageway 268. An asynchronous forced air supply, e.g., electric fan as outlined by Lafontaine et al., may be mounted to the rear of end plate 206 to enhance air flow. In the preferred embodiment, centrifugal fan 138 is mounted for rotation with shaft 202 between pulley 136 and front end plate 204. The cross sections, contours (turns and edges) and relative dispositions of the various air passageways are preferably chosen to minimize decreases in air velocity, and maximize airflow over end turns 258, 256 of stator 217 and end turns 274, 276 of stator 215.

More specifically, cooling air, generally indicated by arrows 278 is introduced into alternator 200 through end plate air passageways 260. Airflow 278 impinges upon rear end turn 258. Airflow 278 then splits into respective streams 280 and 282. After exiting the end turns 258, air stream 280 flows through stator 217 central aperture 262, impinges upon rear shaft deflector 270, is then directed through the front-side loosely wrapped end turns 256, air flow 280 then enters rotor passageways 264, impinges on end turns 276 of stator 215 then with the cooperation of rotor deflector 282, is directed into stator 215 central aperture 266 and then exits alternator 200 through air passageways 268 in front end plate 204. Air stream 282, after exiting rear-side end turns 258, flows between the outside of rotor casing portion 209 and then between rotor portion 207 and the inside of cylindrical portion 248 and outer case 132 then impinges on front side end turns 274 of stator 215 then exits alternator 200 through air passageways 268 in front end plate 204. Air stream 282 provides cooling of magnets 213, 211 and front side end turns 274. Air stream 280 provides cooling for end turns 258, 256 and 276.

As described above, the use of diametrically opposed rotor casings offers an opportunity to significantly increase alternator output without subjecting the rotor to excessive deformation if the entire length of the rotor casing were otherwise cantilevered. In the case of an SAE pad mount alternator, the use of a reduced rotor diameter at one end of a diametrically opposed rotor casing to adequately clear mounting bolts is of particular advantage. In applications in which the diameter of the rotor can be maximized for the entire length of the rotor, maximum output is achieved for that application. Alternator 300, due to the increased length and singular axial diameter, could not be used in an application conforming to the proposed SAE Pad Mount standard but would also be well suited in a variety of other mounting applications such as the J180 SAE standard or other similar mounting pattern.

Referring now to FIGS. 3A-3E, Alternator 300 has many similar features found in alternator 200 but most notably the diametrically opposed rotors are of equal diameters. Alternator 300 has a shaft 302, preferably including a tapered projecting portion 112 and a threaded portion 114; a jam nut 124; front end plate 304; a front bearing 122; rear endplate 306; a rear bearing 130; a rear shaft retaining ring 128; an outer casing 308 and respective tie rods 310. Rotor 326 has support plate 328 that is centrally located in rotor casing 330 with two diametrically opposed rotor casing portions 332; and 334 that are of equal diameters.

Figure 3A:
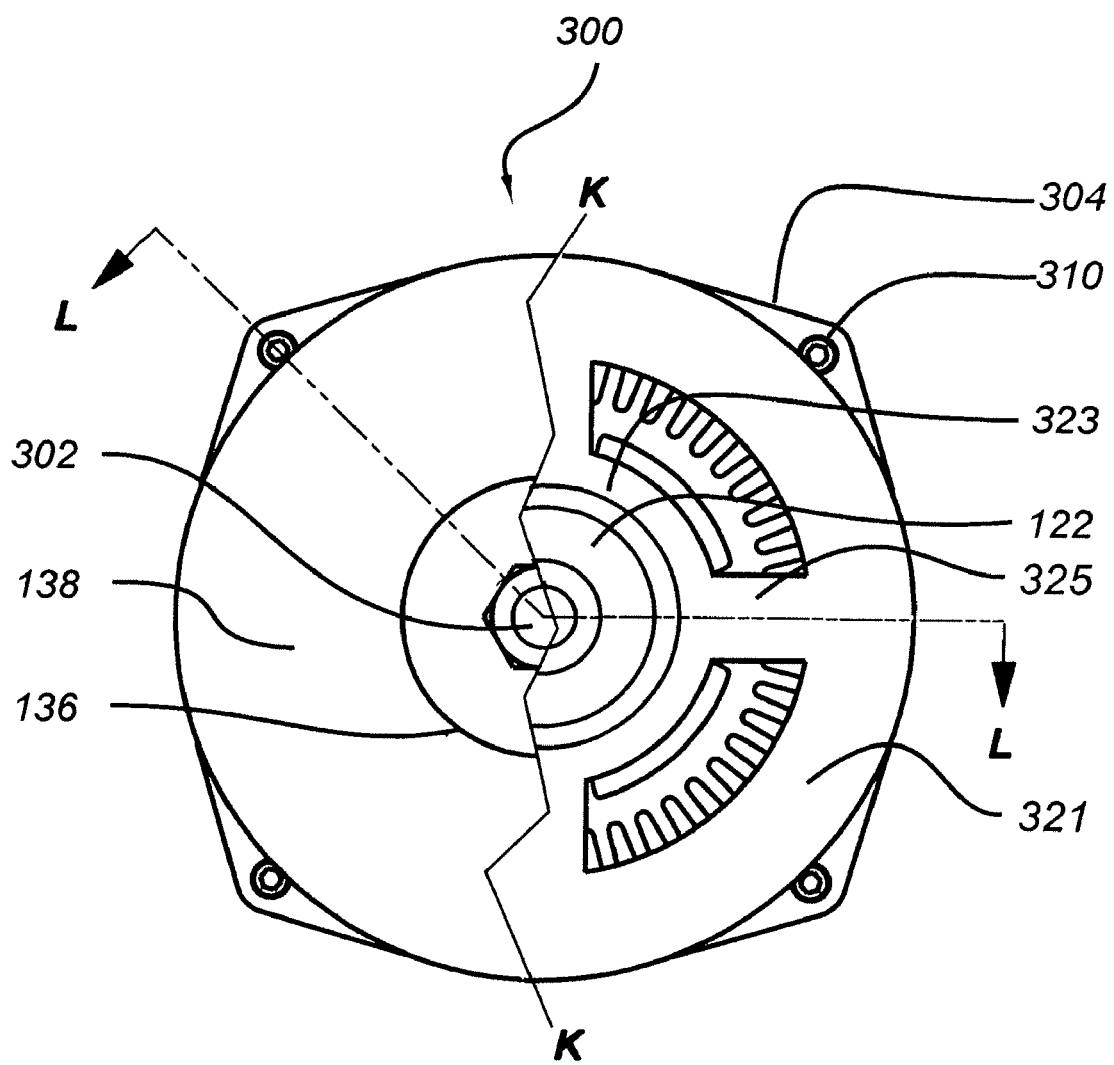
FIG. 3A is a front view of a second embodiment of an alternator in accordance with the present invention that maximizes output utilizing two diametrically opposed but unified rotors of equal diameters and lengths.
Figure 3C:
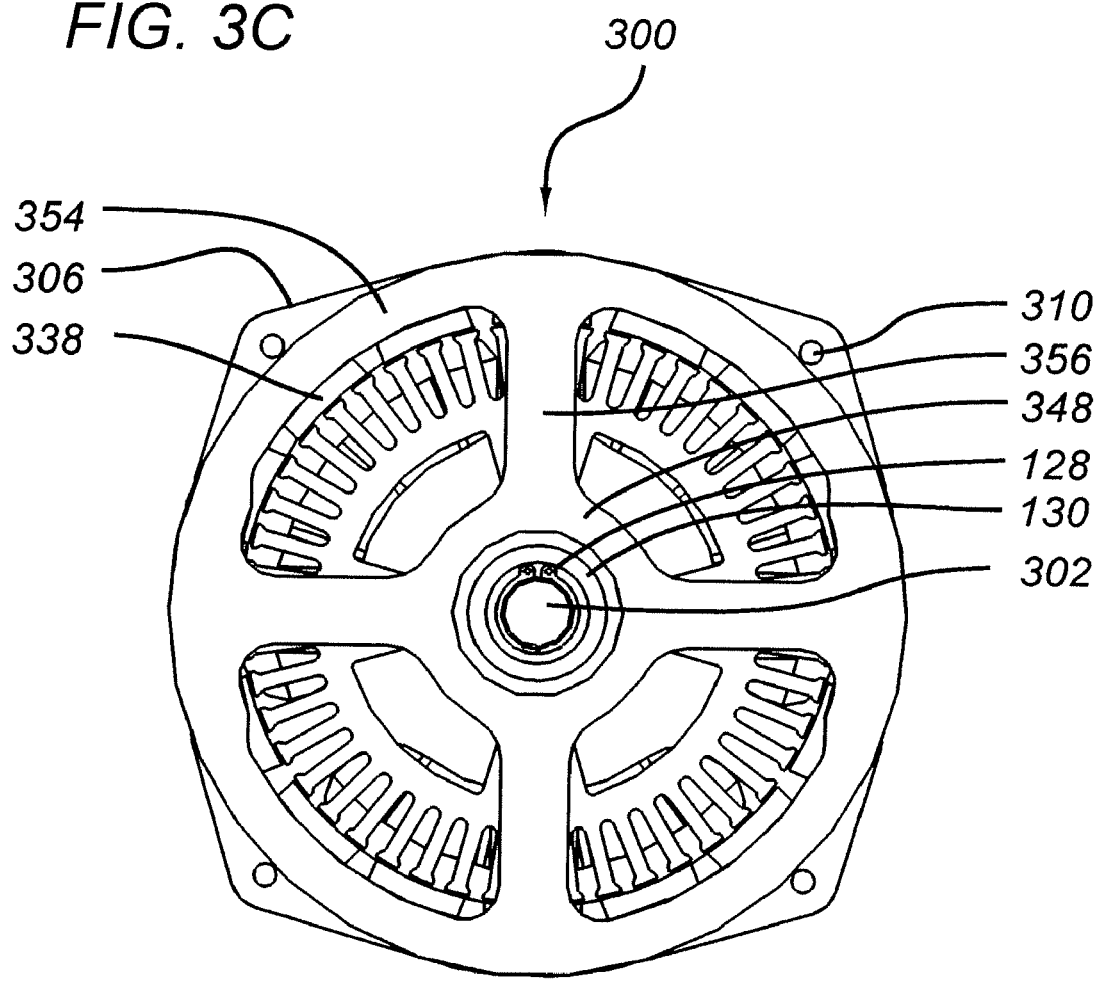
FIG. 3C is a rear view of the alternator of FIG. 3A (View M-M of FIG. 3B).
Figure 3D:
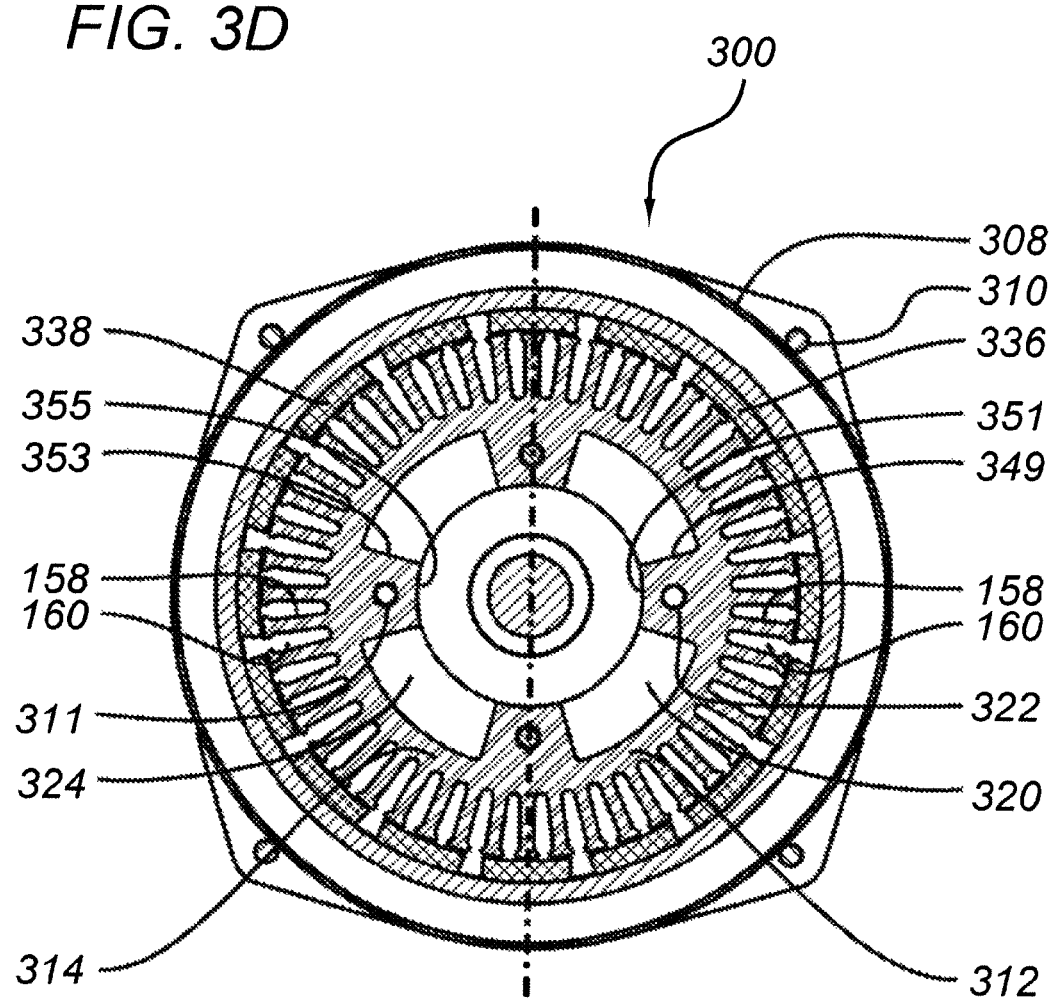
FIG. 3D is a schematic sectional view (taken along line N-N in FIG. 3A) of the alternator of FIGS. 3A and 3B.
Figure 3E:
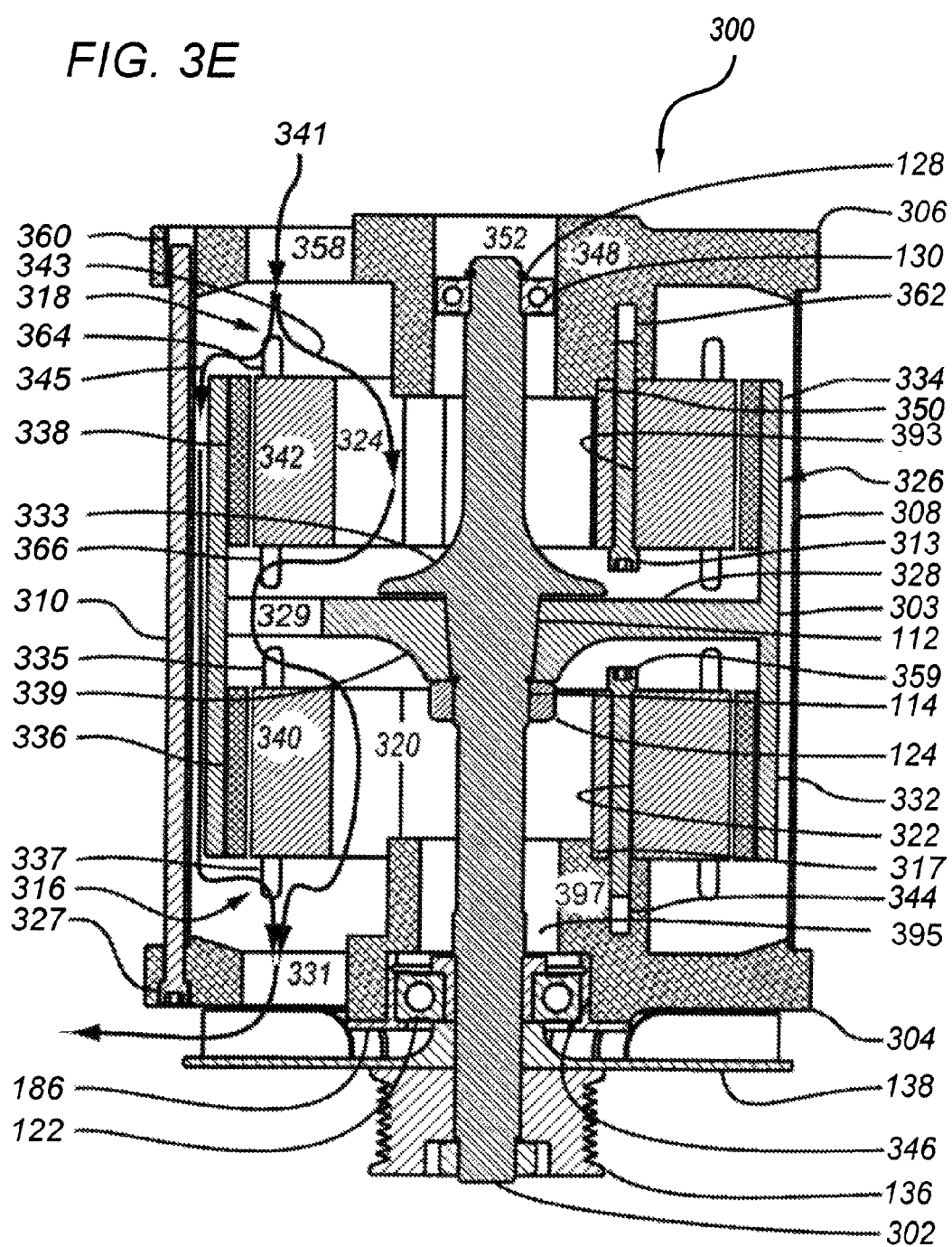
FIG. 3E is a schematic sectional view (taken along line L-L in FIG. 3A) of the alternator of FIGS. 3A and 3B.

Stators 340 and 342 suitably comprise cores 312 and 314 respectively and conductive windings 316 and 318 respectively. Cores 312 and 314 suitably comprises laminated stack of thin sheets of soft magnetic material, e.g. non-oriented, low loss (lead free) steel, that are cut or punched to the desired shape, aligned and joined (e.g. welded or epoxied together in a precision jig to maintain the separate laminations in alignment). As best seen in FIG. 3D, cores 312 and 314 are generally cylindrical, with an axially crenellated outer peripheral surface, i.e., includes a predetermined number of teeth 158 and slots 160. Both stator 340 and 342 are preferably substantially open, with stator 340 having a central aperture 320 and suitably includes crossarms 349, radial locating feature 351 and axial through-bores 322 to facilitate mounting to front endplate 304 using mounting bolts 359 and stator 342 having a central aperture 324 and suitably includes crossarms 353, radial locating feature 355 and axial through-bores 393 to facilitate mounting to rear endplate 306 using mounting bolts 313.

Windings 316 and 318, formed of a suitably insulated electrical conductor, preferably varnished copper motor wire, are provided on cores 312 and 314, wound through a respective slot 160, outwardly along the side face of cores 312 and 314 around a predetermined number of teeth 158, then back through another slot 160.

In assembly, stators 340 and 342 are disposed coaxially with rotor 326, and are closely received within interior cavity of rotor 326. As will be explained, rear endplate 306 mounts and locates rear stator 342 and front endplate 304 mounts and locates front stator 340 so that it is properly aligned within internal chambers of rotor 326. The peripheral surface of stator 340 and 342 are separated from the interior surface of magnets 336 and 338 by a small predetermined air gap AG (see, e.g., FIG. 1F).

Front endplate 304 suitably includes a stepped central hub 397 having a forward reduced diameter portion 317 and central aperture 395 there through, and a generally cylindrical outer peripheral portion 321 connected to hub 323 by respective crossarms 325. Front endplate air passageways 331 are bounded by outer peripheral portion 321, hub 323 and crossarms 325. Respective counter bored holes 327 are provided cylindrical outer peripheral portion 321. A predetermined number of tapped holes 344 (e.g. 4) corresponding to stator crossarm bores 322 are provided in the stepped surface of projection 397. The outer diameter of reduced diameter portion 317 is substantially equal to (but slightly less than) the diameter of the concentric radial locating features 351 on crossarms 349, so that reduced diameter portion 317 may be closely received within the concentric radial locating features 351 on crossarms 349 of stator 340. Front bearing sleeve 186 is closely received within counter bore 346 of front endplate hub 397 and thus centers shaft 302. Stator 340 is mounted on hub 397; with reduced diameter hub portion 317 received within the concentric radial locating features 351 on crossarms 349 of stator 340 and the stator front sidewall against the hub step. Respective bolts 359 journaled through bores 322 and secured in tapped holes 344, secure stator 340 to front endplate 304. Stator 340 is thus positively located and aligned relative to shaft 302.

Rear endplate 306 carries and locates rear bearing 130, mounts and locates stator 342. Rear endplate 306 suitably includes a stepped central hub 348 having a forward reduced diameter portion 350 and central aperture 352 there through, and a generally cylindrical outer peripheral portion 354, preferably having the same outer profile as front endplate 304, connected to hub 348 by respective crossarms 356. Outer peripheral portion 354, crossarms 356 and hub 348 form rear endplate 306 air passageways 358. Respective tapped holes 360 are provided in cylindrical outer peripheral portion 354, at the same radial distance from center and angular dispositions as counter bored holes 327 in front endplate 304. A predetermined number of tapped holes 362 (e.g. 4) corresponding to stator crossarm bores 393 are provided in the stepped surface projection of hub 348. The outer diameter of reduced diameter portion 350 is substantially equal to (but slightly less than) the diameter of the concentric radial locating features 355 on cross arms 353 of stator 342, so that reduced diameter portion 350 may be closely received within the concentric radial locating features 355 on cross arms 353 of stator 342. Rear bearing 130 is closely received within aperture 352 of rear endplate hub 348 and thus centers shaft 302. Stator 342 is mounted on hub 348, with reduced diameter hub portion 350 received within the concentric radial locating features 355 on crossarms 353 of stator 342 and the stator rear sidewall against the hub step. Respective bolts 313 journaled through bores 393 and secured in tapped holes 362, secure stator 342 to rear endplate 306. Stator 342 is thus positively located and aligned relative to shaft 302.

Rotor 326 is mounted on shaft 302 for rotation with the shaft. Stators 340 and 342 are closely received within rotor 326, separated from rotor 326 by a small air gap AG (see, e.g., FIG. 1F). Front endplate 304, bearing sleeve 186, front bearing 122, rear bearing 130, rear endplate 306, outer casing 308 and tie rods 310 cooperate as a support assembly to maintain alignment of shaft 302, rotor 326, and stators 340 and 342. Shaft 302 is maintained by bearing sleeve 186, bearings 122 and 130, which are mounted on front endplate 304 and rear endplate 306, respectively, and rotatably maintain and align shaft 302 concentric and perpendicular with the endplates 304 and 306. Rotor 326 is mounted for rotation on shaft 302, positively positioned by cooperation with tapered shaft portion 112. Front endplate 304 mounts and locates stator 340 so that it is disposed within rotor portion 332 properly aligned with shaft 302 and rotor 326. Rear endplate 306 mounts and locates stator 342 so that it is disposed within rotor portion 334 properly aligned with shaft 302 and rotor 326. Outer casing 308 has end faces perpendicular to its axis (is preferably cylindrical) and is disposed between front endplate 304 and rear endplate 306. Tie rods 310; compress endplates 304 and 306 against outer casing 308, keeping the components squared and in alignment.

Referring again to FIG. 3E, a cooling airflow is directed over stator windings 318 of stator 342 (preferably through loosely wrapped rear-side and front-side end turns 364 and 366 respectively) by employing a cooling system comprising air passageways 358 in rear end plate 306, stator 342 central aperture 324, rotor air passages 329, stator 340 central aperture 320 and front end plate air passages 331. Air entering rear end plate air passage way 358 is directed to impinge on rear-side end turns 364 of windings 318, Air exiting stator central aperture 324 is directed to impinge on windings 318 (front-side end turns 366), by virtue of suitable relative disposition or contouring, or, as in the embodiment of FIG. 3E, cooperation with a shaft mounted rear deflector 333. Air exiting rotor air passages 329 is directed to impinge on windings 316 of stator 340 (preferably through loosely wrapped rear-side and front-side end turns 335 and 337 respectively). After passing over rear-side end turns 335 is then directed to stator 340 central aperture 320 by use of rotor deflector 339 then over front-side end turns 337 then through front endplate 304 air passageway 331. An asynchronous forced air supply, e.g., electric fan as outline by Lafontaine et al., may be mounted on the back of rear end plate 306 to enhance air flow. In the preferred embodiment, centrifugal fan 138 is mounted for rotation with shaft 302 between pulley 136 and front end plate 304. The cross sections, contours (turns and edges) and relative dispositions of the various air passageways are preferably chosen to minimize decreases in air velocity, and maximize airflow over end turns 364, 366 of stator 342 and end turns 335, 337 of stator 342.

More specifically, cooling air, generally indicated by arrows 341 is introduced into alternator 300 through rear end plate air passageways 358. Airflow 341 impinges upon rear end turn 364. Airflow 341 then splits into respective streams 343 and 345. After exiting the end turns 364, air stream 343 flows through stator 342 central aperture 324, impinges upon rear shaft deflector 333, is directed through the front-side loosely wrapped end turns 366, rotor passageways 329, impinges on end turns 335 of stator 340 is, with cooperation of rotor deflector 339, directed into stator 340 central aperture 320 then partial impinges on end turns 337 and then exits alternator 300 through air passageways 331 in front end plate 304. Air stream 345, after exiting rear-side end turns 364, flows between the outside of rotor casing 303 and the inside of outer casing 308 then impinges on front side end turns 337 of stator 340 then exits alternator 300 through air passageways 331 in front end plate 304. Air stream 345 provides cooling for magnets 336, 338 and end turns 364 and 337. Air stream 343 provides cooling for end turns 364, 366, 335 and 337.

The demand is high for a single device to provide multiple electrical outputs for use with possible multiple output voltages and/or current configurations, for example a single apparatus configured to provide 12 VDC to power vehicle systems and 110 VAC to power equipment such as saws and drills for use in remote locations. The alternator stators described in FIGS. 3A-3E can be wound independently to produce voltage ranges more closely matching the desired application. For example stator 342 can be optimized to closely match the 12 V DC vehicle system power with stator 340 optimized to more closely match the 110V AC power requirements. The disadvantage in taking this approach with two equally sized stators is for example, the excess capability stator 340 has in powering the 12 VDC vehicle system. Modern trucks typically require 80 amps or less to power vehicle systems. With stators 340 and 342 equally sized, it would not be unexpected to have stator 340 capable of producing 250 to 350 amps of power. In that particular configuration, 170 to 270 amps of power would, in essence, go to 'waste'. Therefore it would be beneficial in certain applications to have different stator lengths in order to optimize output. Specifically stator 342 could be shortened to more closely match the 80 amp vehicle requirement and stators 340 could be lengthened to deliver the maximum amperage possible for the 110 V AC system.

Figure 3F:
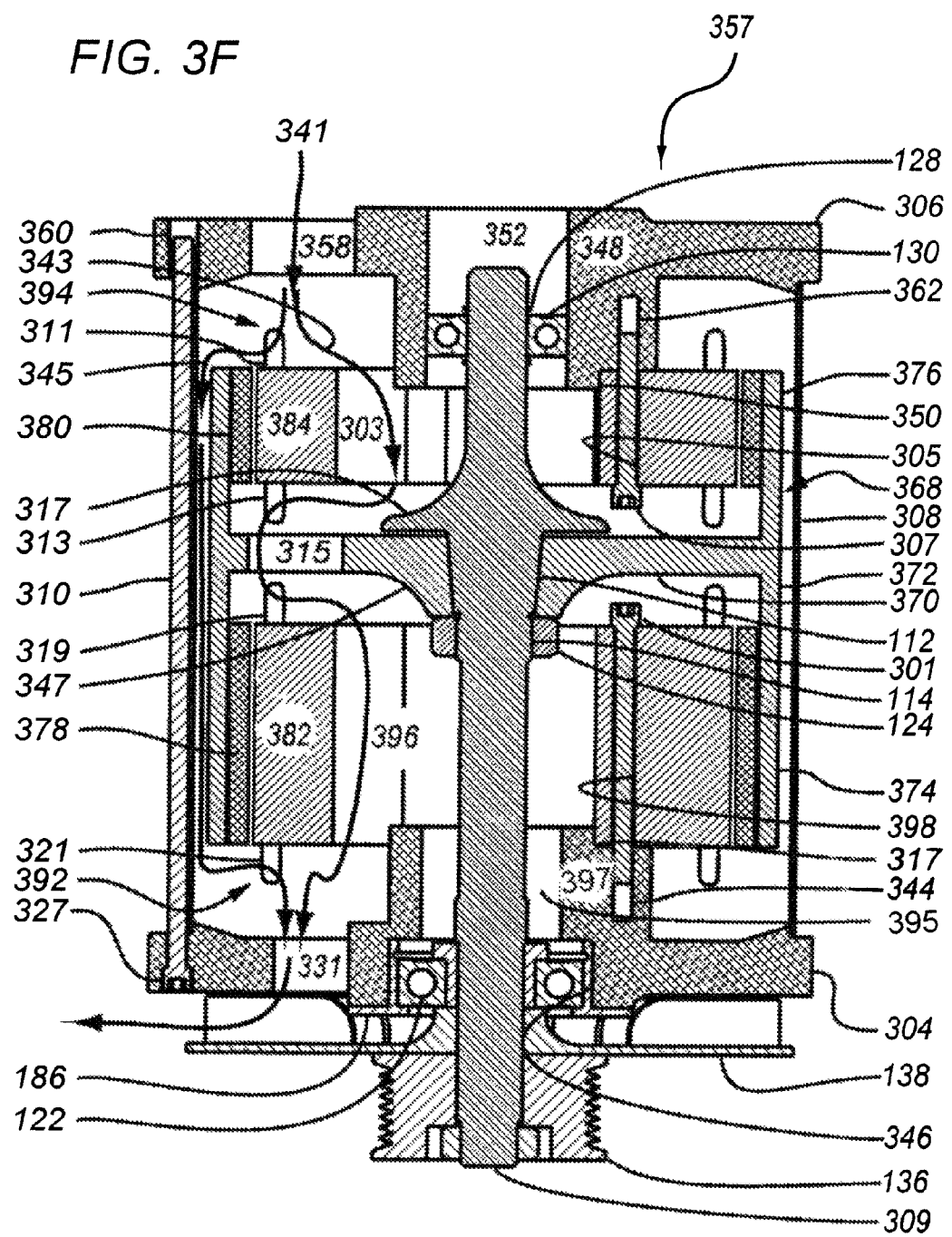
FIG. 3F is a schematic sectional view (taken along line L-L in FIG. 3A) of the alternator of FIGS. 3A and 3B that maximizes output utilizing two diametrically opposed but unified rotors of equal diameters and unequal lengths, illustrating stator and rotor groups of unequal length.

Referring now to FIG. 3F, Alternator 357 has a shaft 309, preferably including a tapered projecting portion 112 and a threaded portion 114; a jam nut 124; front end plate 304; a front bearing 122; rear endplate 306; a rear bearing 130; a rear shaft retaining ring 128; an outer casing 308 and respective tie rods 310. Rotor 368 has support plate 370 that is located offset from center in rotor casing 372 with two diametrically opposed rotor casing portions 374 and 376 having equal diameters. Rotor portion 374 and stator 382 are longer than rotor portion 376 and stator 384.

Stators 382 and 384 suitably comprise cores and conductive windings 392 and 394 respectively. Stators 382 and 384 cores suitably comprises laminated stack of thin sheets of soft magnetic material, e.g. non-oriented, low loss (lead free) steel, that are cut or punched to the desired shape, aligned and joined (e.g. welded or epoxied together in a precision jig to maintain the separate laminations in alignment). Stators 382 and 384 cores are generally cylindrical, with an axially crenellated outer peripheral surface, i.e., includes a predetermined number of teeth and slots (not shown, reference FIG. 3D). Both stator 382 and 384 are preferably substantially open, with stator 382 having a central aperture 396 and suitably includes crossarms (not shown, reference FIG. 3D), radial locating feature (not shown, reference FIG. 3D) and axial through-bores 398 to facilitate mounting to front endplate 304 using mounting bolts 301 and stator 384 having a central aperture 303 and suitably includes crossarms (not shown, reference FIG. 3D), radial locating feature (not shown, reference FIG. 3D) and axial through-bores 305 to facilitate mounting to rear endplate 306 using mounting bolts 307.

Windings 392 and 394, formed of a suitably insulated electrical conductor, preferably varnished copper motor wire, are provided on cores of stator 382 and 384 respectively, wound through respective slots, outwardly along the side face of cores around a predetermined number of teeth, then back through another slot.

In assembly, stators 382 and 384 are disposed coaxially with rotor 368, and are closely received within interior cavity of rotor 368. As will be explained, rear endplate 306 mounts and locates rear stator 384 and front endplate 304 mounts and locates front stator 382 so that it is properly aligned within internal chambers of rotor 368. The peripheral surface of stator cores 382 and 384 are separated from the interior surface of magnets 378 and 380 by a small predetermined air gap AG (see, e.g., FIG. 1F).

Front endplate 304, as previously described, suitably includes a stepped central hub 397 having a forward reduced diameter portion 317. A predetermined number of tapped holes 344 (e.g. 4) corresponding to stator crossarm bores 398 are provided in the stepped surface of projection 397. Reduced diameter portion 317 is substantially equal to (but slightly less than) the diameter of the concentric radial locating features (not shown, reference FIG. 3D) on crossarms (not shown, reference FIG. 3D), so that front endplate portion 304 may be closely received within the concentric radial locating features (not shown, reference FIG. 3D) on crossarms (not shown, reference FIG. 3D) of stator 382. Front bearing sleeve 186 is closely received within counter bore 346 of front endplate hub 397 and thus centers shaft 309. Stator 382 is mounted on hub 397, with reduced diameter hub portion 317 received within the concentric radial locating features (not shown, reference FIG. 3D) on crossarms (not shown, reference FIG. 3D) of stator 382 and the stator front sidewall against the hub step. Respective bolts 301 journaled through bores 398 and secured in tapped holes 344, secure stator 382 to front endplate 304. Stator 382 is thus positively located and aligned relative to shaft 309.

Rear endplate 306 mounts and locates stator 384. Rear endplate 306 suitably includes a stepped central hub 348 having a forward reduced diameter portion 350. A predetermined number of tapped holes 362 (e.g. 4) corresponding to stator crossarm bores 305 are provided in the stepped surface projection of hub 348. The outer diameter of reduced diameter portion 350 is substantially equal to (but slightly less than) the diameter of the concentric radial locating features (not shown, reference FIG. 3D) on cross arms (not shown, reference FIG. 3D) of stator 382, so that reduced diameter portion 350 of rear endplate 306 may be closely received within the concentric radial locating features (not shown, reference FIG. 3D) on the cross arms (not shown, reference FIG. 3D) of stator 382. Rear bearing 130 is closely received within aperture 352 of rear endplate hub 348 and thus centers shaft 309. Stator 384 is mounted on hub 348, with reduced diameter hub portion 350 received within the concentric radial locating features (not shown, reference FIG. 3D) on crossarms (not shown, reference FIG. 3D) of stator 384 and the stator rear sidewall against the hub step. Respective bolts 307 journaled through bores 305 and secured in tapped holes 362, secure stator 382 to rear endplate 306. Stator 382 is thus positively located and aligned relative to shaft 309.

Rotor 326 is mounted on shaft 309 for rotation with the shaft. Stators 382 and 384 are closely received within rotor 368, separated from rotor 368 by a small air gap AG (see, e.g., FIG. 1F). Front endplate 304, bearing sleeve 186, front bearing 122, rear bearing 130, rear endplate 306, outer casing 308 and tie rods 310 cooperate as a support assembly to maintain alignment of shaft 309, rotor 368, and stators 382 and 384. Shaft 309 is maintained by bearings 122 and 130, which are mounted on front endplate 302 and rear endplate 306, respectively, and rotatably maintain and align shaft 309 concentric and perpendicular with the endplates 304 and 306. Rotor 368 is mounted for rotation on shaft 309, positively positioned by cooperation with tapered shaft portion 112. Front endplate 304 mounts and locates stator 384 so that it is disposed within rotor portion 374 properly aligned with shaft 309 and rotor 368. Rear endplate 306 mounts and locates stator 384 so that it is disposed within rotor portion 376 properly aligned with shaft 309 and rotor 368. Outer casing 308 has end faces perpendicular to its axis (is preferably cylindrical) and is disposed between front endplate 304 and rear endplate 306. Tie rods 310; compress endplates 304 and 306 against outer casing 308, keeping the components squared and in alignment.

Referring again to FIG. 3F, a cooling airflow is directed over stator windings 394 of stator 384 (preferably through loosely wrapped rear-side and front-side end turns 311 and 313 respectively) by employing a cooling system comprising air passageways 358 in rear end plate 306, stator 384 central aperture 303, rotor air passages 315, stator 382 central aperture 396 and front end plate air passages 331. Air entering rear end plate air passage way 358 is directed to impinge on rear-side end turns 311 of windings 394, Air exiting stator central aperture 303 is directed to impinge on windings 394 (front-side end turns 313), by virtue of suitable relative disposition or contouring, or, as in the embodiment of FIG. 3F, cooperation with a shaft mounted rear deflector 317. Air exiting rotor air passages 315 is directed to impinge on windings 392 of stator 382 (preferably through loosely wrapped rear-side and front-side end turns 319 and 321 respectively). After passing over rear-side end turns 319 is then directed to stator 382 central aperture 396 by use of rotor deflector 347 then over front-side end turns 321 then through front endplate 304 air passageway 331. An asynchronous forced air supply, e.g., electric fan as outline by Lafontaine et al., may be mounted on the back of rear end plate 306 to enhance air flow. In the preferred embodiment, centrifugal fan 138 is mounted for rotation with shaft 309 between pulley 136 and front end plate 304. The cross sections, contours (turns and edges) and relative dispositions of the various air passageways are preferably chosen to minimize decreases in air velocity, and maximize airflow over end turns 311, 313 of stator 384 and end turns 319, 321 of stator 382.

More specifically, cooling air, generally indicated by arrows 341 is introduced into alternator 357 through rear end plate air passageways 358. Airflow 341 impinges upon rear end turn 311. Airflow 341 then splits into respective streams 343 and 345. After exiting the end turns 311, air stream 343 flows through stator 384 central aperture 303, impinges upon rear shaft deflector 317, is directed through the front-side loosely wrapped end turns 313, rotor passageways 315, impinges on end turns 319 of stator 382 then with cooperation with rotor deflector 347, is directed into stator 382 central aperture 396 then partial impinges on end turns 321 and then exits alternator 357 through air passageways 331 in front end plate 304. Air stream 345, after exiting rear-side end turns 311, flows between the outside of rotor casing 372 and the inside of outer casing 308 then impinges on front side end turns 321 of stator 382 then exits alternator 357 through air passageways 331 in front end plate 304. Air stream 345 provides cooling of magnets 378, 380 and end turns 311 and 321. Air stream 343 provides cooling for end turns 311, 313, 319 and 321.

The embodiments of the invention described in FIGS. 2 and 3 carry with it an ancillary benefit in that deformation of the rotor is greatly reduced during accelerations due to the nature of the physical configuration of the rotor casing and rotor endplate. As described by Lafontaine et al., the maximum length of a rotor is limited by the amount of load the rotor endplate can effectively resist to prevent critical deformation resulting in destructive clashing between magnets and rotor.

Referring to FIGS. 4A-4C (which have been greatly simplified to improve clarity), In the absence of external forces, rotor 116 of alternator 100 is concentric and perpendicular with shaft 110; rotor casing 144 is in a nominal normal position (designated by lines 402 and 404) coaxial with shaft 110 and the forward (closest to forward endplate) edge of rotor endcap 142 is in a nominal normal position (designated by line 406) perpendicular to the axis of shaft 110. Components of external forces typically encountered parallel to the axis of shaft 110 tend to have little effect on the disposition of rotor 116; rotor endcap 142 and cooperation of rotor hub (not shown), tapered shaft portion 112, and jam nut (not shown) are sufficiently strong to resist axial movement or distortion of rotor 116, and, in any event, there is greater tolerance to axial distortions. However, external forces encountered perpendicular to the axis of shaft 110 of sufficient strength will distort rotor 116 if not properly account for.

More specifically, rotor 116 has a centroid (center of gravity) 403 that extends out beyond the conjunction of rotor endcap 142 and shaft 110 (indicated a schematically as pivot (cantilever) point 408 creating a moment arm when subjected to accelerations that are perpendicular to shaft 110. This is true as well for those accelerations that are not completely perpendicular but which present a perpendicular component of the resultant acceleration to shaft 110. When subjected to accelerations perpendicular to the axis of shaft 110, rotor casing 144 tends to resist deformation due to its cylindrical shape, however the distortion can manifested itself in rotor endcap 142. In effect, rotor 116 is cantilevered and in response to perpendicular accelerations, rotor 116, in effect, pivots about pivot point 408. Maximum deflection from the nominal normal position is experienced at the portions of rotor 116 farthest from pivot point 408, i.e. the distal (rear) end of casing 144, and the outer periphery of endcap 142 (where endcap 142 joins casing 144). If the deflection in the vicinity of magnets 146 exceeds air gap AG, e.g. 31 thousands of an inch, magnets 146 will clash with stator 118, causing possibly destructive interference.

For example, as shown in FIG. 4B, in response to an upward acceleration, rotor 116 will in effect pivot downwardly (as shown but exaggerated for clarity, in a clockwise direction). The upward side of rotor casing 144 will effectively pivot inwardly towards shaft 110, with the distal end deflected inwardly from the nominal normal position 402 by an amount generally indicated as 410. The upward periphery of endcap 142 similarly moves to the rear of its nominal normal position 406 by an amount generally indicated as 412. Conversely, the distal end of downward side of rotor casing 144 will be deflected outwardly from the nominal normal position 402 by an amount generally indicated as 414 and the downward periphery of endcap 142 similarly moves forward of its nominal normal position 406 by an amount generally indicated as 416. Since cylindrical rotor casing 144 tends to maintain its shape, the amount of deflection of the corresponding upper and lower portions are substantially proportional i.e. deflections 410 and 412 are substantially proportional to deflections 414 and 416, respectively.

Forces from opposite directions will cause mirror image deflections. For example, as shown in FIG. 4C, in response to a downward acceleration, rotor 116 will in effect pivot upwardly (as shown, in a counterclockwise direction). The downward side of rotor casing 144 will effectively pivot inwardly towards shaft 110, with the distal end deflected inwardly from the nominal normal position 404 by an amount generally indicated as 418. The downward periphery of endcap 142 similarly moves to the rear of its nominal normal position 406 by an amount generally indicated as 420. Conversely, the distal end of upward side of rotor casing 144 will be deflected upwardly from the nominal normal position 402 by an amount generally indicated as 422 and the upward periphery of endcap 142 similarly moves forward of its nominal normal position 406 by an amount generally indicated as 424. Again, since cylindrical rotor casing 144 maintains its shape, the amount of deflection of the corresponding upper and lower portions are substantially proportional i.e. deflections 418 and 420 are substantially proportional essays to deflections 422 and 424, respectively.

As described above, accelerations perpendicular to shaft 110 tend to deflect rotor 116 such that magnets 146 could clash with stator 118 if the acceleration is severe enough. The problem of rotor deflection increases as the axial length increases, more specifically as the length of the moment arm increases. As with any mechanical system, the rotor can be designed to resist destructive deflections, no matter how severe the acceleration, but in practical terms this would require a rotor with very thick rotor end plates and casings to resist deflection, very undesirable in automotive and other applications in which weight is an important consideration. As was described in FIG. 3, it is possible to dramatically increase the output utilizing diametrically opposed rotors without subjecting the rotor to deformation resulting in a clash between magnets and stator.

Figure 4D:
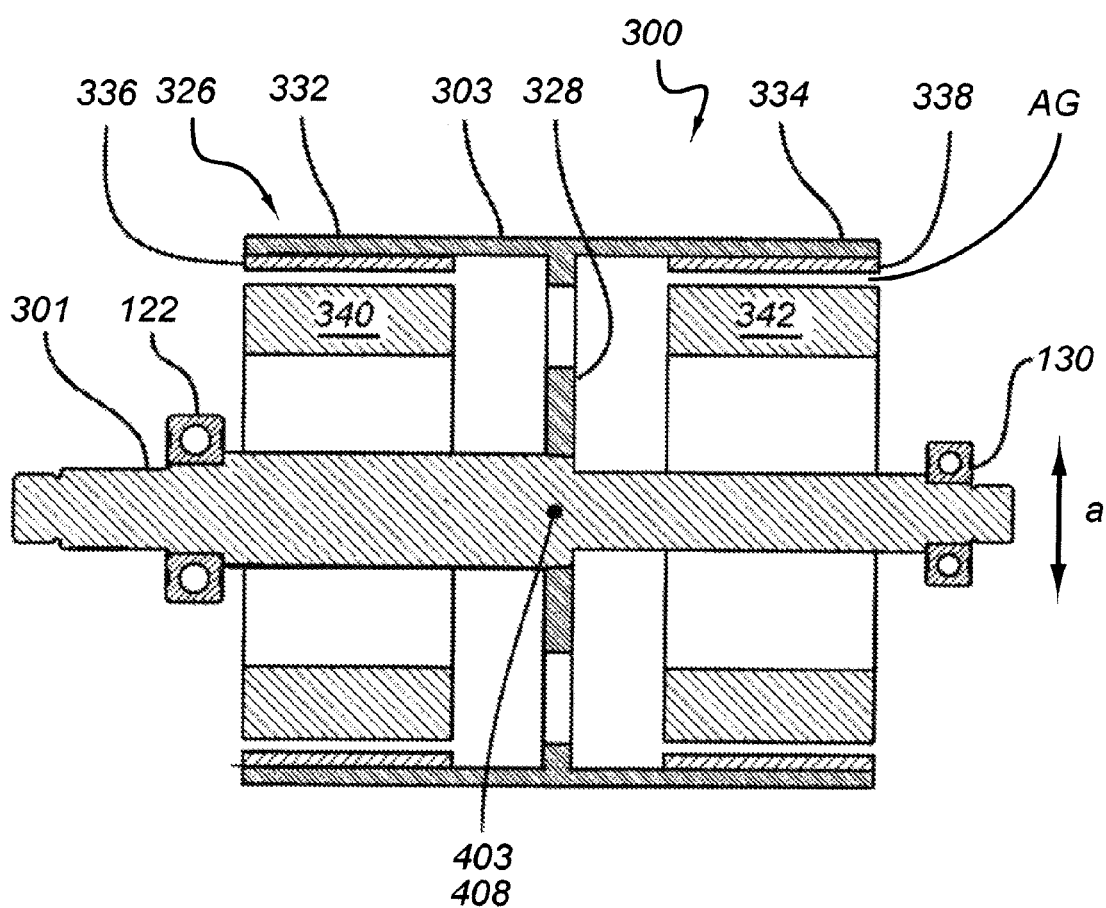
FIGS. 4D-4F are simplified schematics illustrating the effects of radial loading on diametrically opposed but unified rotor of equal diameter and length (Alternator in FIG. 3A-3D).
Figure 4E:
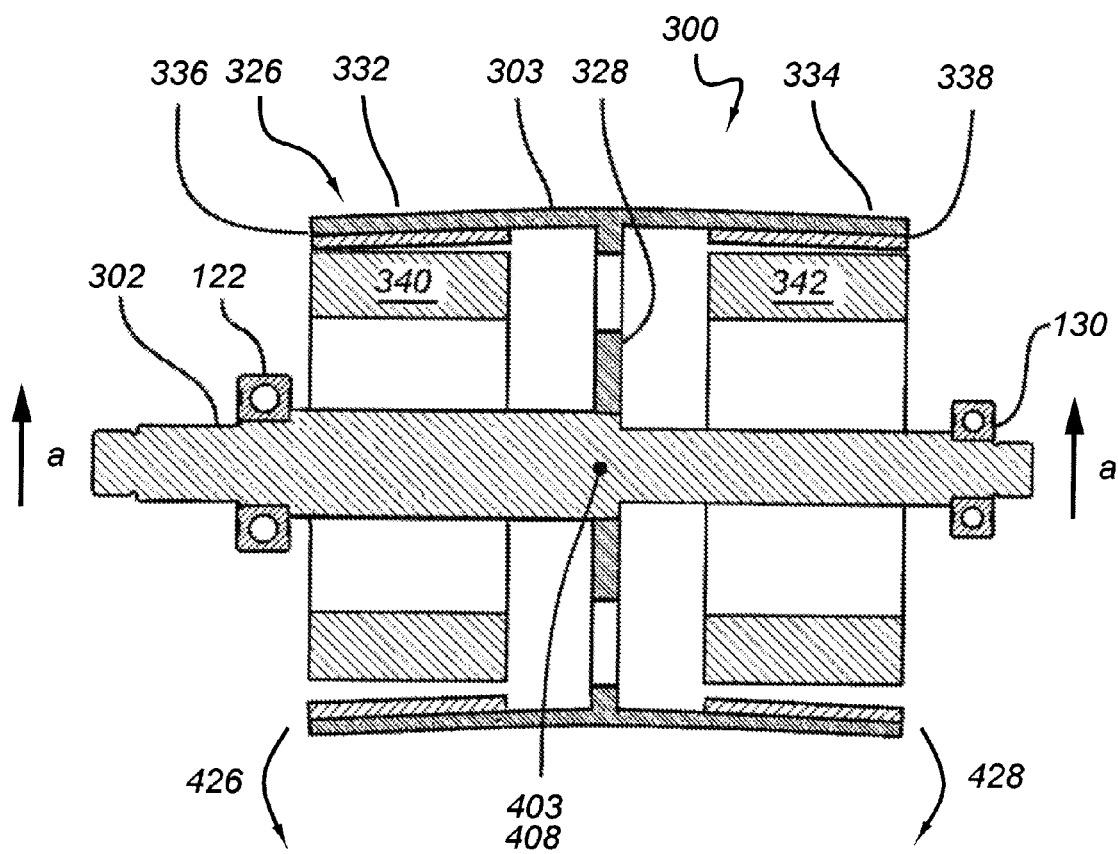
Figure 4F:
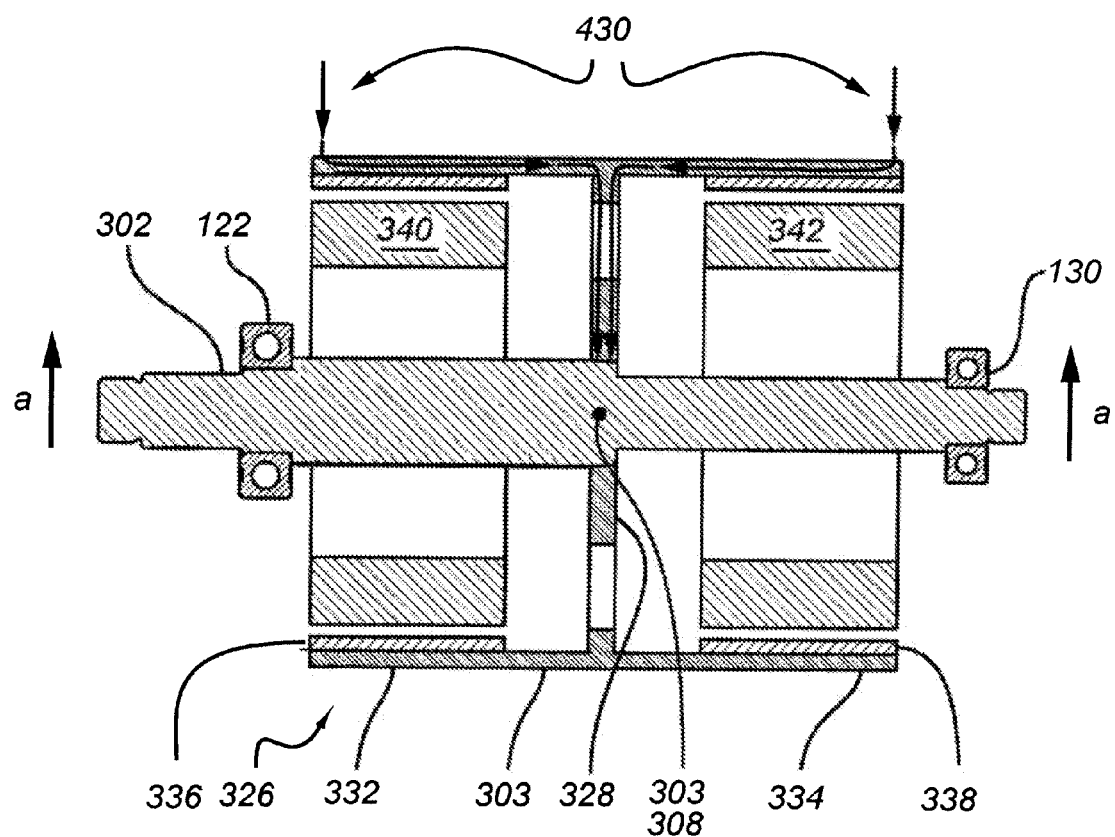

Referring now to FIGS. 4D-4F (which have been simplified to improve clarity), rotor 326 of alternator 300 is comprised of support plate 328 coaxially disposed at the axial center of a single cylindrical rotor casing 330, forming two diametrically opposed cylindrical casing portions 332 and 334. Cylindrical casing portion 332 has a predetermined number (e.g. 8 pairs) of alternatively poled permanent magnets 336 disposed in the interior wall of casing portion 332. Cylindrical casing portion 334 as well has a predetermined number (e.g. 8 pairs) of alternatively poled permanent magnets 338 disposed in the interior wall of casing portion 334. Because rotor support plate 328 of rotor 326 is centrally located within casing 330 the centroid 403 of rotor 326 is located at pivot point 408. As the alternator is subjected to accelerations, rotor casing portion 332 of rotor 326 will tend to deflect counter clockwise (direction 426) about pivot point 408. Rotor casing portion 334 of rotor 326 will tend to deflect clockwise (direction 428) about pivot point 408. Rotor casing 330 due to its cylindrical shape is very well suited to resist deformation and since centroid 403 of rotor 326 is at pivot point 408, loads will tend to be transferred along path 430 down through the body of support plate 328 to shaft 110. Since the forces being transferred through support plate 328 do not extend beyond the body of support plate 328, there is no moment arm therefore no significant deformation to rotor 326 occurs.

As was described in regards to FIGS. 2A-2E, a method of dramatically increasing output while conforming to the proposed SAE pad mount standard was detailed. This rotor configuration also benefits in its ability to resist deformation due to severe acceleration.

Figure 4G:
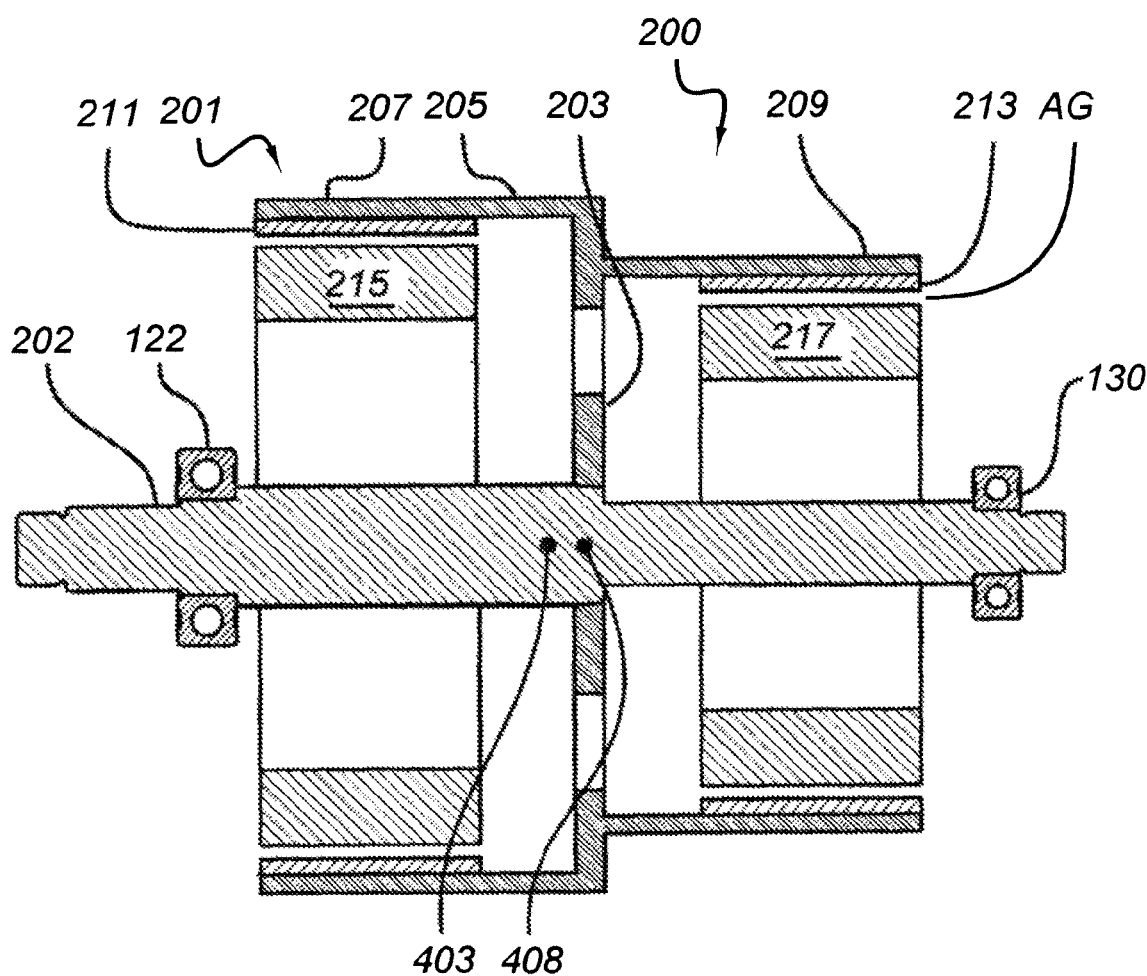

Referring now to FIGS. 4G and 4H (which have been simplified to improve clarity), rotor 201 of alternator 200 is comprised of two diametrically opposed rotors of unequal diameters. Rotor 201 is comprised of support plate 203 coaxially disposed at the axial center of a dual cylindrical rotor casing 205 forming two diametrically opposed cylindrical casing portions 207 and 209 which is of a lesser diameter. Cylindrical casing portion 207 has a predetermined number (e.g. 8 pairs) of alternatively poled permanent magnets 211 disposed in the interior wall of casing portion 207. Cylindrical casing portion 209 as well has a predetermined number (e.g. 8 pairs) of alternatively poled permanent magnets 213 disposed in the interior wall of casing portion 209. Rotor support plate 203 of rotor 201 is centrally located within casing 205 but because rotor portion 207 is of a larger diameter than that of rotor portion 209 it has a slightly larger mass which locates centroid 403 of rotor 201 slightly to the left of pivot point 408. It's important to note the difference in mass between rotor portions 207 and 209 is relatively small creating a small moment arm during acceleration, much smaller than that of alternator 100 and as would be expected, a smaller amount of distortion. As alternator 200 is subjected to accelerations, rotor casing portion 207 of rotor 201 will tend to deflect counter clockwise (direction 426) about pivot point 408. Rotor casing portion 209 of rotor 201 will tend to deflect clockwise (direction 428) about pivot point 408. Rotor casing 201 due to its cylindrical shape is very well suited to resist deformation and since centroid 403 of rotor 201 is just slightly left of pivot point 408, loads will tend to be transferred to shaft 110 with only slight deformation to rotor support plate 203 due to the small moment arm presented.

Optimizing an alternator by utilizing discrete output is beneficial in applications requiring dual voltage outputs. By producing an alternator with stators of different lengths to produce amperage output at different voltages, an optimization is realized. In such applications the rotor support plate can be engineered to sufficiently resist the deformation caused by the increased centroid length presented during acceleration.

Figure 4I:
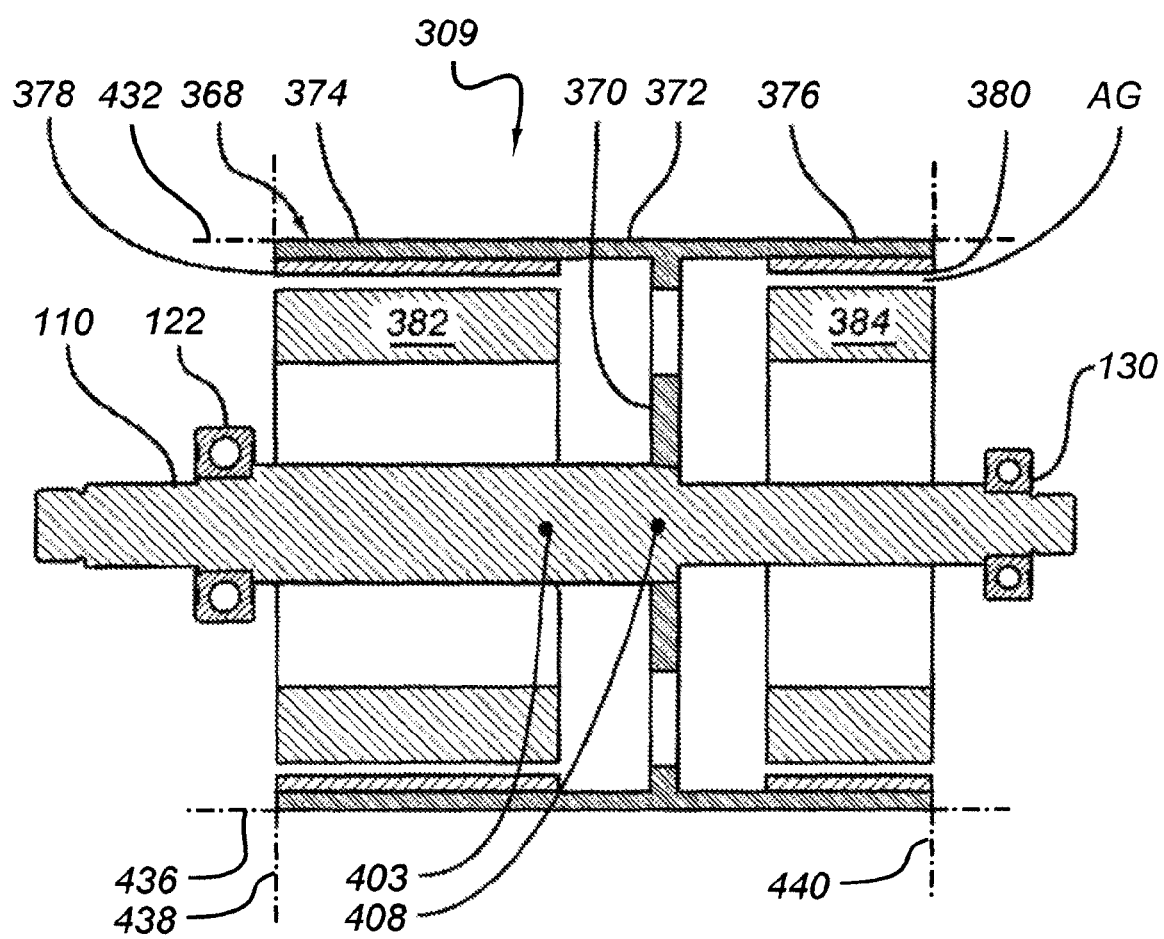
FIGS. 4I-4J are simplified schematics illustrating the effects of radial loading on diametrically opposed but unified rotors of equal diameters but unequal lengths (Alternator in FIG. 3F).
Figure 4J:
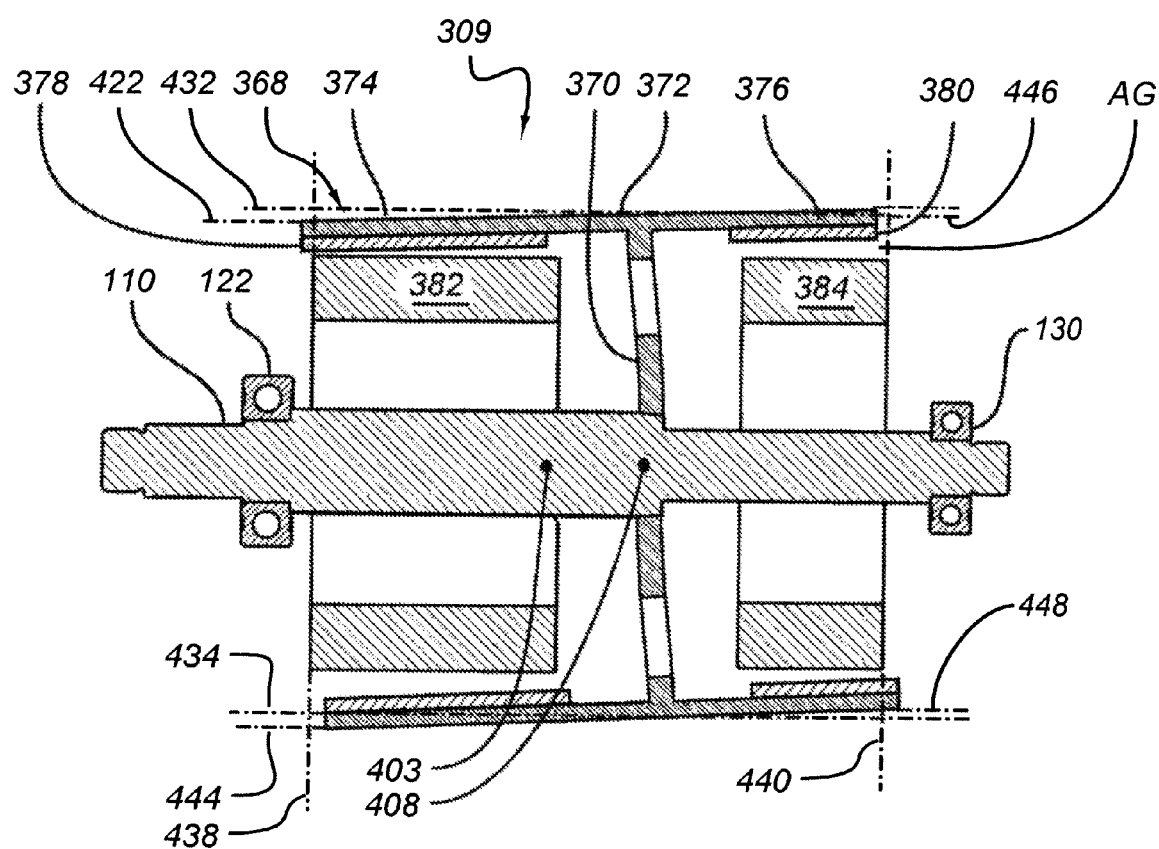

Referring now to FIGS. 4I and 4J, (which have been greatly simplified to improve clarity), In the absence of external forces, rotor 368 of alternator 309 is concentric and perpendicular with shaft 309; rotor casing 372 is in a nominal normal position (designated by lines 432 and 436) coaxial with shaft 309 and the forward (closest to front endplate 304) edge of rotor casing 372 is in a nominal normal position (designated by line 438) perpendicular to the axis of shaft 309 and the rearward (closest to rear endplate 306) edge of rotor casing 372 is in a nominal normal position (designated by line 440) is also perpendicular to the axis of shaft 309. Components of external forces typically encountered parallel to the axis of shaft 309 tend to have little effect on the disposition of rotor 368; rotor support plate 370 and cooperation of rotor hub (not shown), tapered shaft portion 112, and jam nut (not shown) are sufficiently strong to resist axial movement or distortion of rotor 368, and, in any event, there is greater tolerance to axial distortions. However, external forces encountered perpendicular to the axis of shaft 309 can be of sufficient strength to distort rotor 368 if not properly account for.

More specifically, rotor 368 has a centroid (center of gravity) 403 that extends out beyond the conjunction of rotor support plate 370 and shaft 309 (indicated a schematically as pivot point 408) creating a moment arm (cantilever) due to the unequal lengths, when subjected to accelerations that are perpendicular to shaft 309. This is true as well for those accelerations that are not completely perpendicular but which present a perpendicular component of the resultant acceleration to shaft 309. When subjected to accelerations perpendicular to the axis of shaft 309, rotor casing 372 tends to resist deformation due to its cylindrical shape, however the distortion can manifested itself in rotor support plate 370. In effect, rotor 368 is cantilevered and in response to perpendicular accelerations, rotor 368 pivots about pivot point 408. Maximum deflection from the nominal normal position is experienced at the portions of rotor 368 farthest from pivot point 408, i.e. the distal (rotor portion 374) end of rotor casing 372. If the deflection in the vicinity of magnets 378 exceeds air gap AG, e.g. 31 thousands of an inch, magnets 378 will clash with stator 382, causing possibly destructive interference. For example, as shown in FIG. 4J, in response to an upward acceleration, rotor 368 will in effect pivot downwardly (as shown but exaggerated for clarity, in a counter clockwise direction). The upward side of rotor portion 374 will effectively pivot downwardly from the nominal normal position 432 by an amount generally indicated as 442. The downward side of rotor portion 374 will effectively pivot downwardly from the nominal normal position 434 by an amount generally indicated as 444. Conversely, the upward side of rotor portion 376 will be deflected upwardly from the nominal normal position 432 by an amount generally indicated as 446, the downward side of rotor portion 376 will be deflected upwardly from the nominal normal position 432 by an amount generally indicated as 448. Since rotor portion 374 is farthest away from pivot point 408, it will see the greatest amount of deflection for a given amount of rotation by rotor 368. Rotor support plate 370 must therefore be of sufficient strength to resist deformation causing destructive clashing between magnets 378 and stator 382.

The alternators described in FIGS. 2 and 3, utilizing diametrically opposed rotor casings with a single rotor support plate is of particular advantage in terms of both increased output and ability to resist deformation. Although certainly not as capable in resisting deformation when subjected to substantial acceleration, two independent rotors each consisting of discrete endplates and rotor casings positioned in diametric opposition on a single shaft can attain similar increases in output to that of alternator 300. Since each rotor casing is in essence cantilevered care must be taken to properly engineer and select materials for the rotor and plates that will resist destructive deformation resulting in rotor magnets clashing with each stator.

Figure 5A:
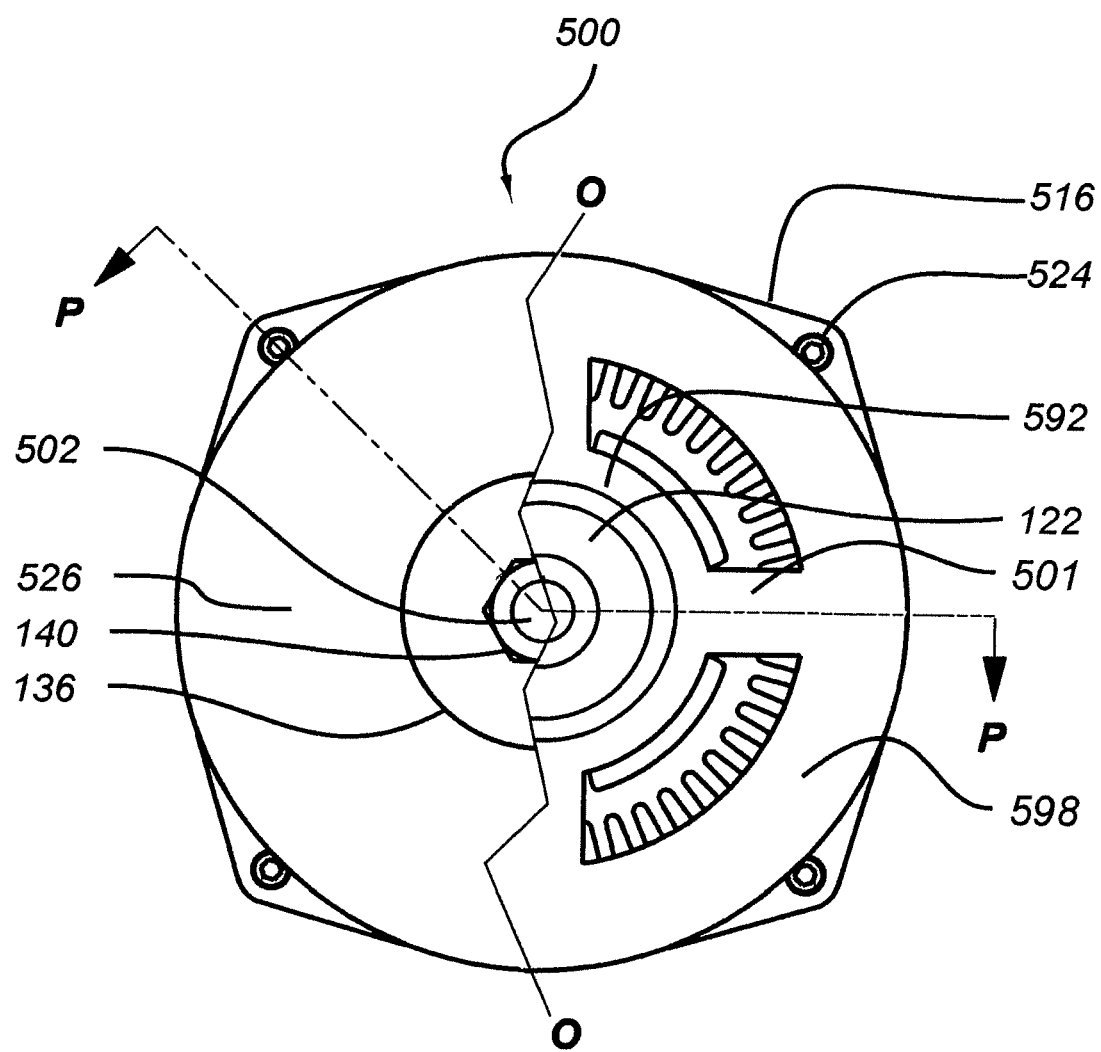
FIG. 5A is a front view of a fifth embodiment of an alternator in accordance with the present invention that maximizes output for a given diameter utilizing two discrete rotors FIG. 5A includes a cut-away view taken along line O-O.
Figure 5B:
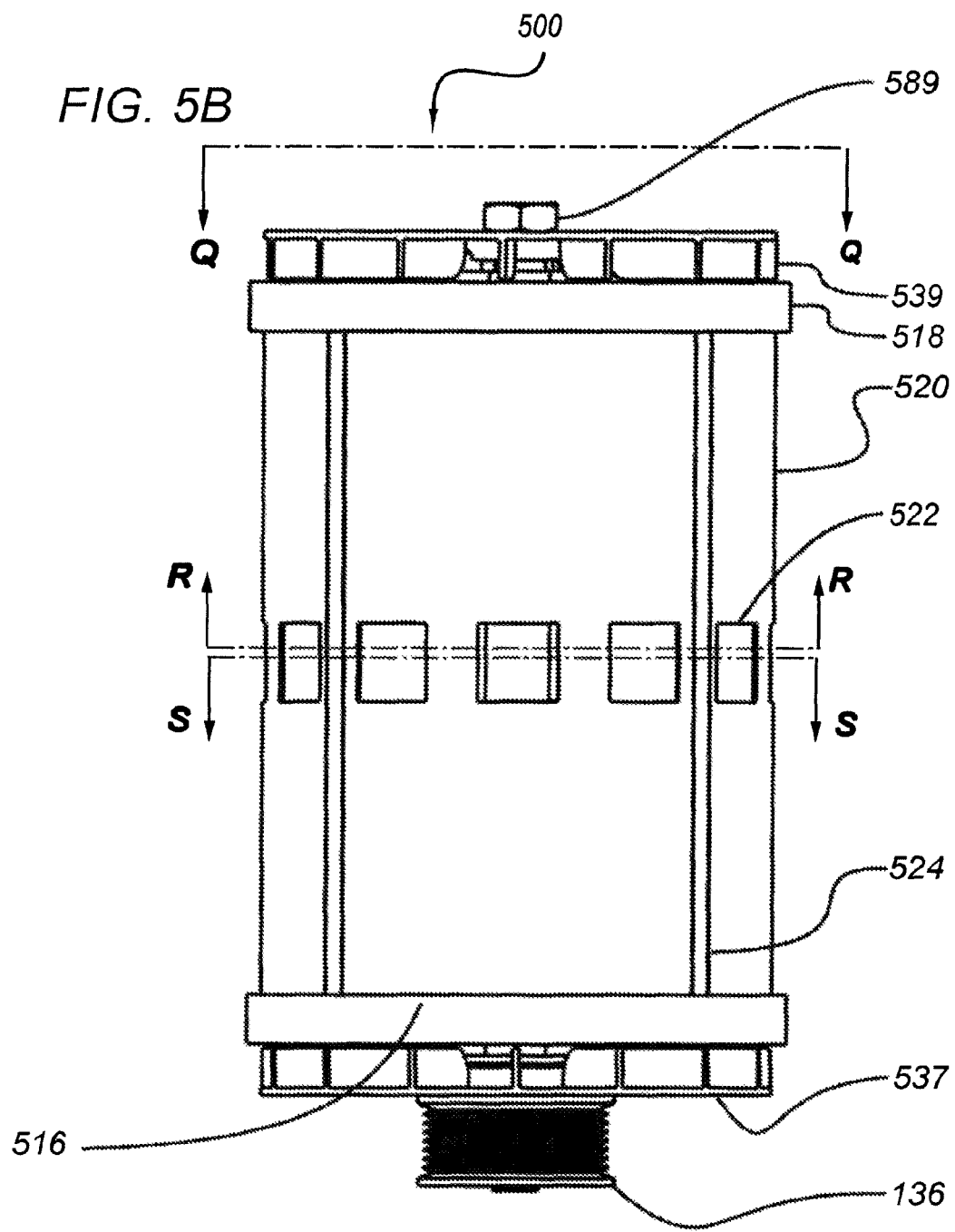
FIG. 5B is a top view of the alternator of FIG. 5A.
Figure 5C:
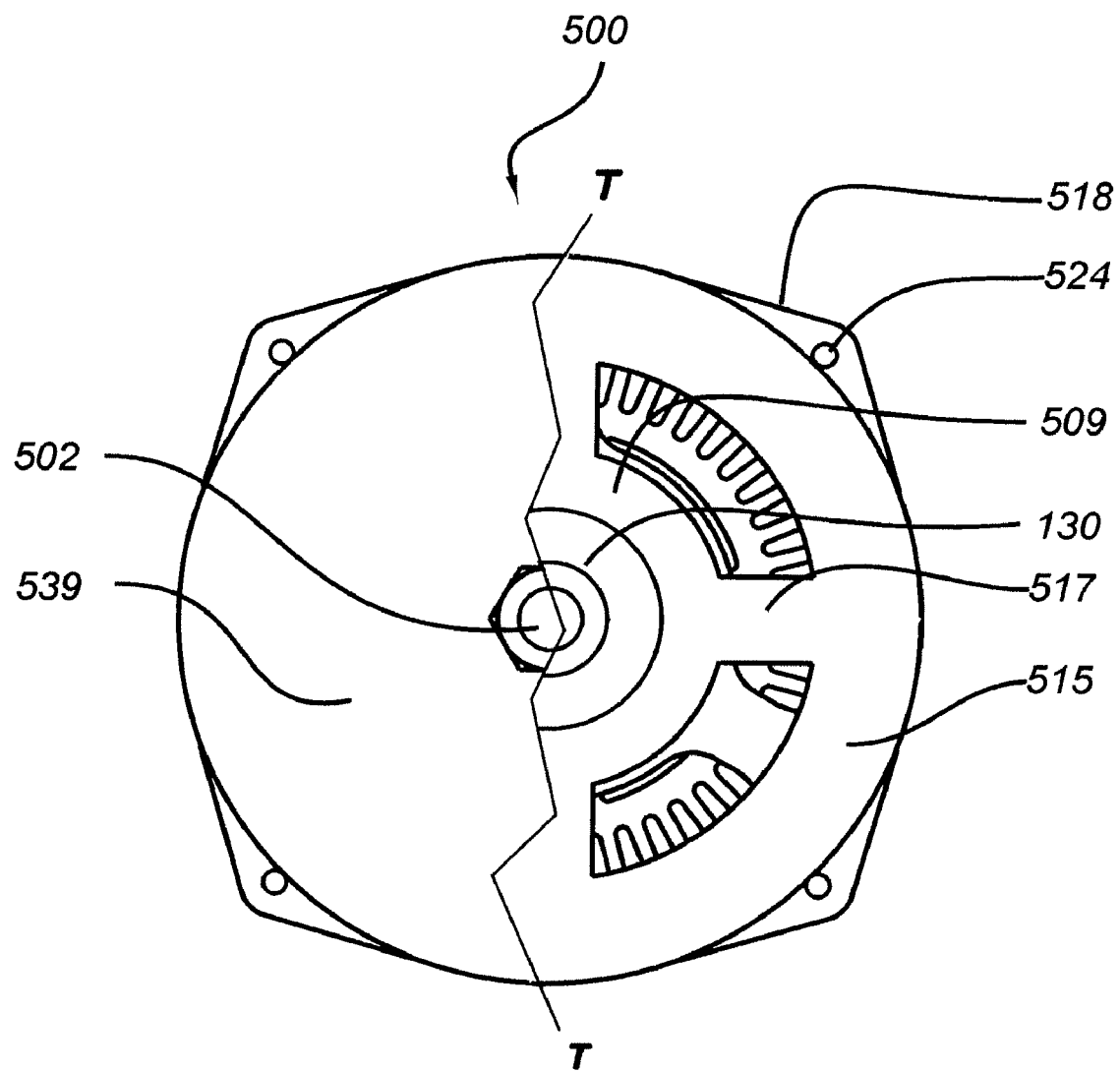
FIG. 5C is a rear view of the alternator of FIG. 5A taken along line Q-Q (FIG. 5C includes a cutaway view taken along line T-T).
Figure 5D:
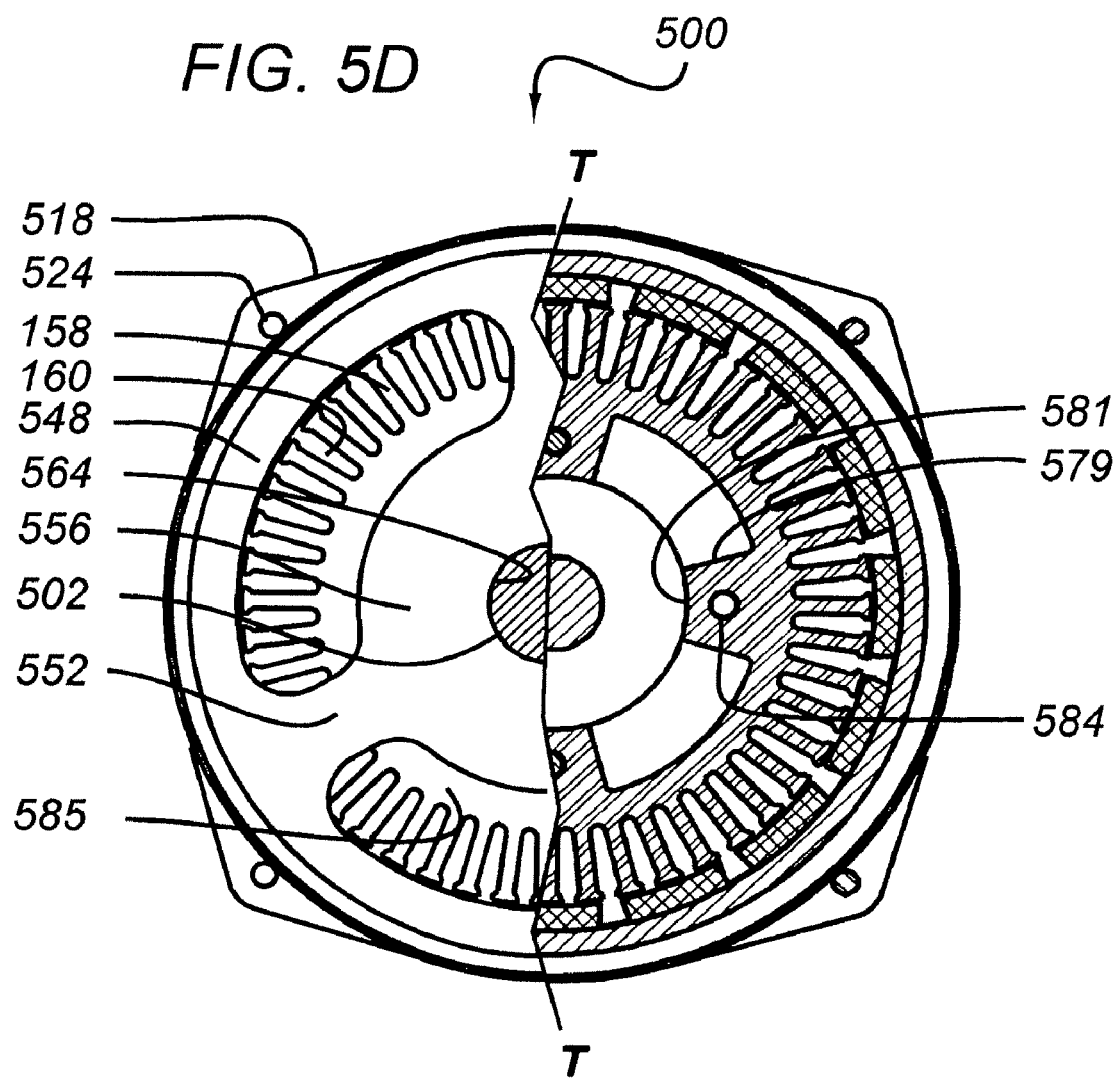
FIG. 5D is a section view of the alternator of FIG. 5B taken along line R-R (FIG. 5D includes a cut-away view taken along line U-U).
Figure 5E:
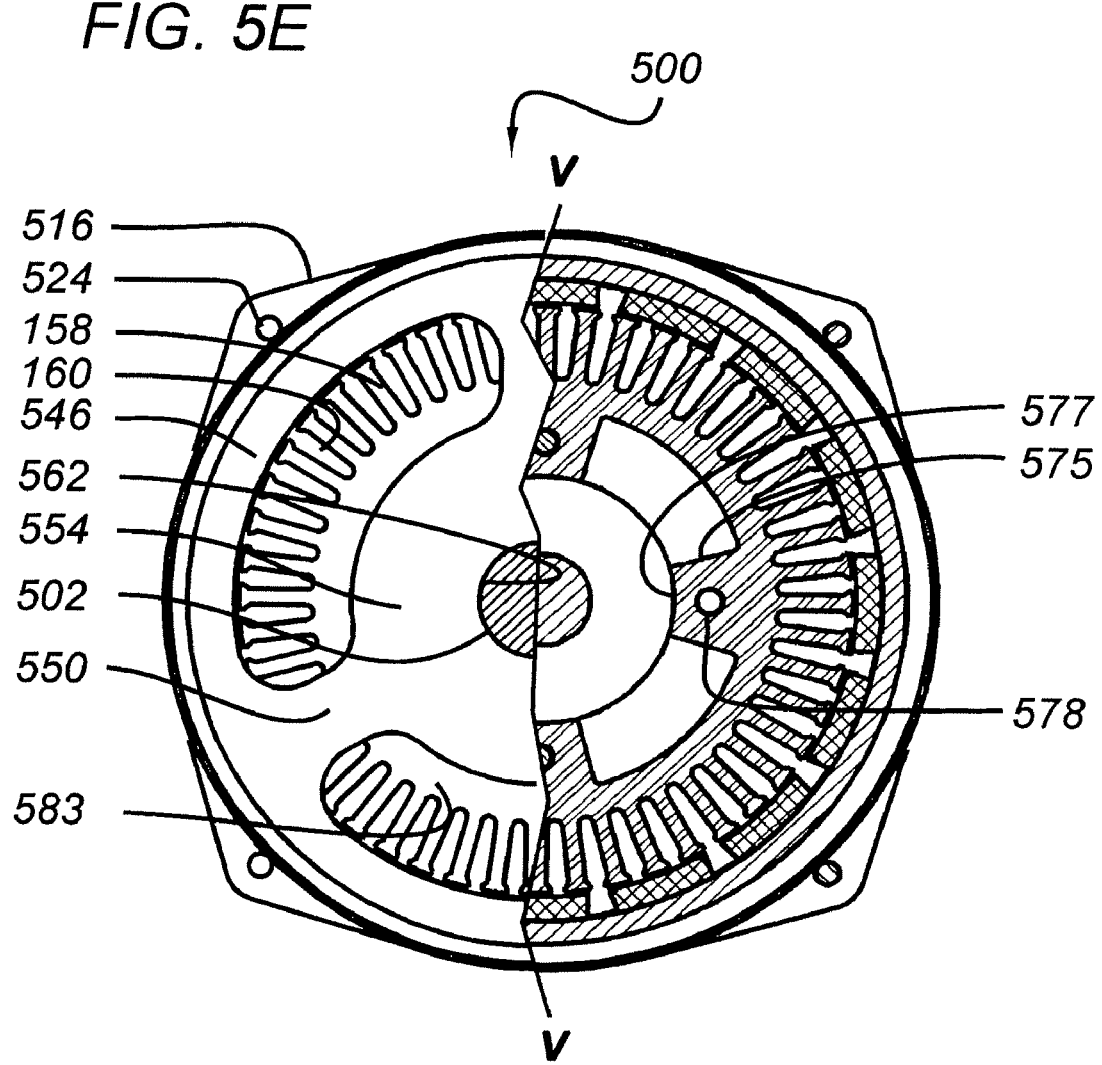
FIG. 5E is a partial section view of the alternator of FIG. 5B taken along line S-S (FIG. 5E includes a cut-away view taken along line V-V.
Figure 5F:
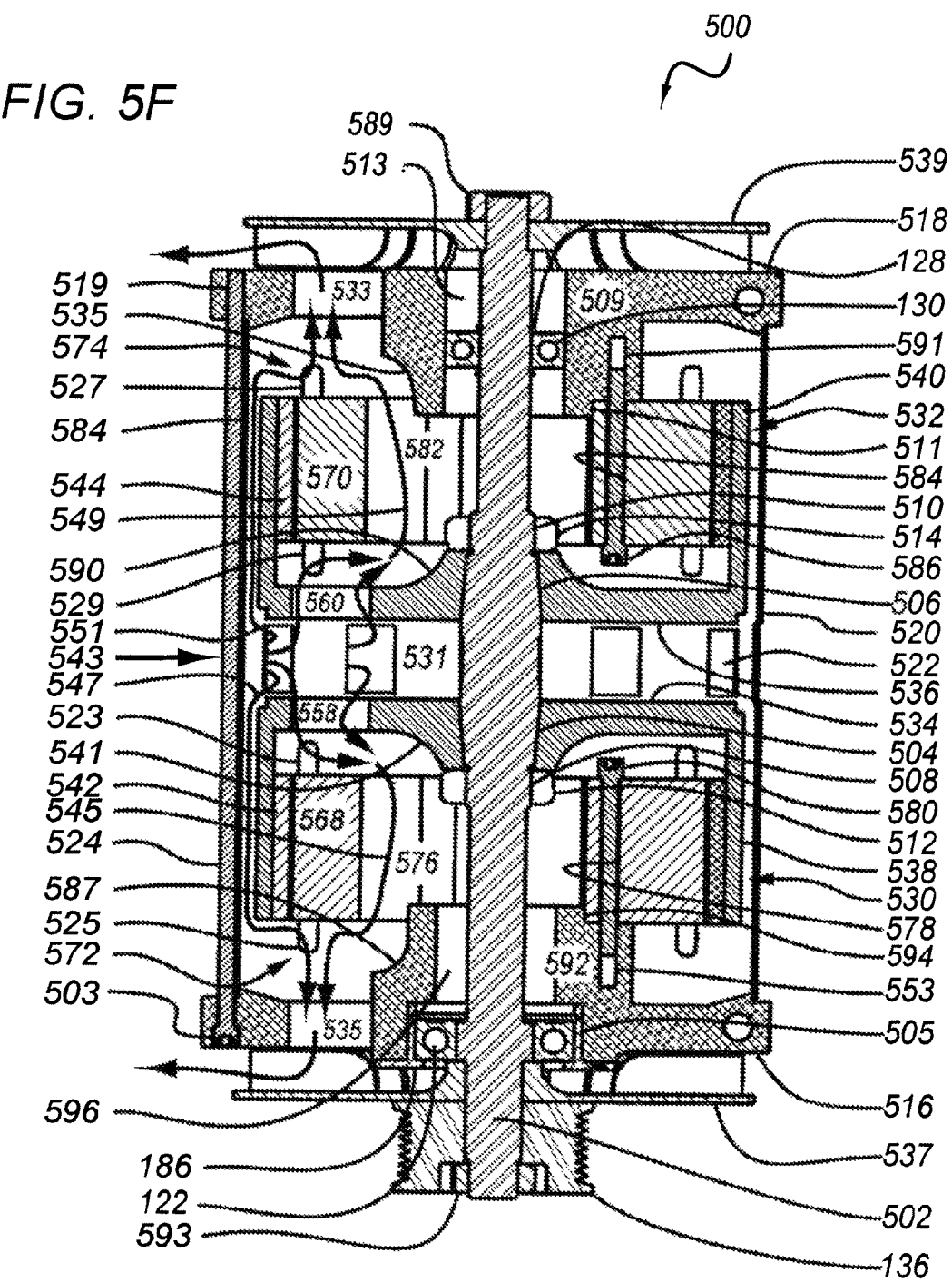
FIG. 5F is a schematic sectional view (taken along line P-P in FIG. 5A) alternator of FIGS. 5A and 5B.

Referring now to FIG. 5A-5F, Alternator 500 suitably includes a shaft 502 with two tapered projecting portions, 504 and 506 and two threaded portions 508 and 510; two jam nuts 512 and 514; front end plate 516; a front bearing 122; bearing sleeve 186; rear endplate 518, rear shaft retaining rings 128; a rear bearing 130; twin rotors 530 and 532; stators 568 and 570; an outer case 520 contain air flow intake vents 522 and respective tie rods 524. Fans 537 and 539, in cooperation with vents 522, cool the heat producing components of alternator 500. Twin rotors 530 and 532, as best seen in FIG. 5F, both preferably comprise an endcap 534 and 536, a cylindrical casing 538 and 540 respectfully and a predetermined number (e.g. 8 pairs) of alternatively poled permanent magnets 542 disposed in the interior side wall of casing 538 and a predetermined number (e.g. 8 pairs) of alternatively poled permanent magnets 544 disposed in the interior side wall of casing 540.

As best seen in FIGS. 5D and 5E, rotors 530 and 532 are suitably substantially open, including peripheral portions 546 and 548 respectfully, and respective cross-arms 550 and 552 and a central rotor hubs 554 and 556 respectfully to provide for connection to shaft 502. Respective air passageways 558 are provided through endcap 534 of rotor 530, bounded by peripheral portion 546, adjacent cross arms 550, and central hub 554. Respective air passageways 560 are provided through endcap 536 of rotor 532, bounded by peripheral portion 548, adjacent cross arms 552, and central hub 556. Central rotor hubs 554 and 556 include through-bores 562 and 564 respectively having a predetermined taper (e.g. 1 in. per foot) corresponding to that of shaft portion 504 and 506. In assembly, shaft 502 is journaled through both bores 562 and 564, such that shaft tapered portions 504 and 506 are received in bores 562 and 564 just forward of threaded shaft portions 508 and 510. Threaded shaft portions 508 and 510 cooperate with jam nuts 514 and 516 to positively locate rotors 530 and 532 on shaft 502. As was previously described, the thickness of crossarms 550 and 552 are suitably chosen to be as thin as possible (to minimize weight and material cost) while still capable of withstanding expected loads.

Stators 568 and 570 suitably comprise cores 583 and 585 and conductive windings 572 and 574 respectively. Stators 568 and 570 cores suitably comprises laminated stack of thin sheets of soft magnetic material, e.g. non-oriented, low loss (lead free) steel, that are cut or punched to the desired shape, aligned and joined (e.g. welded or epoxied together in a precision jig to maintain the separate laminations in alignment). Stators 568 and 570 cores are generally cylindrical, with an axially crenellated outer peripheral surface, i.e., includes a predetermined number of teeth 158 and slots 160. Both stator 568 and 570 are preferably substantially open, with stator 568 having a central aperture 576 and suitably includes crossarms 575, radial locating feature 577 and axial through-bores 578 to facilitate mounting to front endplate 516 using mounting bolts 580 and stator 570 having a central aperture 582 and suitably includes crossarms 579, radial locating feature 581 and axial through-bores 584 to facilitate mounting to rear endplate 518 using mounting bolts 586.

Windings 572 and 574, formed of a suitably insulated electrical conductor, preferably varnished copper motor wire, are provided on cores 583 and 585 of stator 568 and 570 respectively, wound through respective slots 160, outwardly along the side face of cores around a predetermined number of teeth 158, then back through another slot.

In assembly, stator 568 is disposed coaxially with rotor 530 and is closely received within interior cavity of rotor 530. As will be explained, front endplate 516 mounts and locates front stator 568 so that it is properly aligned within internal chambers of rotor 530 and stator 570 is disposed coaxially with rotor 532 and is closely received within interior cavity of rotor 532. As will be explained, rear endplate 518 mounts and locates rear stator 570 so that it is properly aligned within internal chambers of rotor 532. The peripheral surface of stators 568 and 570 are separated from the interior surface of magnets 542 and 544 respectively by a small predetermined air gap AG (see, e.g., FIG. 1F).

Front endplate 516 suitably includes a stepped central hub 592 having a forward reduced diameter portion 594 and central aperture 596 there through, and a generally cylindrical outer peripheral portion 598, preferably having the same outer profile as rear endplate 518, connected to hub 592 by respective crossarms 501. Respective counter bored holes 503 are provided cylindrical outer peripheral portion 598. A predetermined number of tapped holes 553 (e.g. 4) corresponding to stator crossarm bores 578 are provided in the stepped surface of hub 592. Reduced diameter portion 594 is substantially equal to (but slightly less than) the diameter of the concentric radial locating features 577 on crossarms 575 of stator 568, so that front endplate portion 594 may be closely received within the concentric radial locating features 577 on crossarms 575 of stator 568. Front bearing sleeve 186 is closely received within counter bore 505 of front endplate hub 592 and thus centers bearing 122 and shaft 502. Stator 568 is mounted on hub 592, with reduced diameter hub portion 594 received within the concentric radial locating features 577 on crossarms 575 of stator 568 and the stator front sidewall against the hub step. Respective bolts 580 journaled through bores 578 and secured in tapped holes 553, secure stator 568 to front endplate 516. Stator 516 is thus positively located and aligned relative to shaft 502.

Rear endplate 518 carries and locates rear bearing 130, mounts and locates stator 570. Rear endplate 518 suitably includes a stepped central hub 509 having a forward reduced diameter portion 511 and central aperture 513 there through, and a generally cylindrical outer peripheral portion 515, preferably having the same outer profile as front endplate 516, connected to hub 509 by respective crossarms 517. Respective tapped holes 519 are provided cylindrical outer peripheral portion 515, at the same radial distance from center and angular dispositions as counter bored holes 503 in front endplate 516. A predetermined number of tapped holes 591 (e.g. 4) corresponding to stator crossarm bores 584 are provided in the stepped surface of hub 509. The outer diameter of reduced diameter portion 511 is substantially equal to (but slightly less than) the diameter of the concentric radial locating features 581 on crossarms 579, so that rear endplate portion 511 may be closely received within the concentric radial locating features 581 on crossarms 579 of stator 570. Rear bearing 130 is closely received within aperture 513 of rear endplate hub 509 and thus centers shaft 502. Stator 570 is mounted on hub 509, with reduced diameter hub portion 511 received within the concentric radial locating features 581 on crossarms 579 of stator 570 and the stator rear sidewall against the hub step. Respective bolts 586 journaled through bores 584 and secured in tapped holes 591, secure stator 570 to rear endplate 518. Stator 570 is thus positively located and aligned relative to shaft 502.

Rotors 530 and 532 are mounted on shaft 502 for rotation with the shaft. Stators 568; and 570 are closely received within rotors 530 and 532, separated from rotors 530 and 532 by a small air gap AG. (see, e.g., FIG. 1F) Front endplate 516, bearing sleeve 186, front bearing 122, rear bearing 130, rear endplate 518, outer casing 520 and tie rods 524 cooperate as a support assembly to maintain alignment of shaft 502, rotors 530 and 532, and stators 568 and 570. Shaft 502 is maintained by bearing sleeve 186, bearings 122 and 130, which are mounted on front endplate 516 and rear endplate 518, respectively, and rotatably maintain and align shaft 502 concentric and perpendicular with the endplates. Rotors 530 and 532 are mounted for rotation on shaft 502, positively positioned by cooperation with tapered shaft portions 504 and 506. Front endplate 516 mounts and locates stator 568 so that it is disposed within rotor 530 properly aligned with shaft 502 and rotor 530. Rear endplate 518 mounts and locates stator 570 so that it is disposed within rotor 532 properly aligned with shaft 502 and rotor 532. Outer casing 520 has end faces perpendicular to its axis (is preferably cylindrical) and is disposed between front endplate 516 and rear endplate 518. Tie rods 524; compress endplates 516 and 518 against outer casing 520, keeping the components squared and in alignment.

Referring again to FIG. 5F, a cooling airflow is directed over stator windings 572 of stator 568 (preferably through loosely wrapped rear-side and front-side end turns 523 and 525 respectively) and over stator windings 574 of stator 570 (preferably through loosely wrapped rear-side and front-side end turns 527 and 529 respectively) by employing a cooling system comprising air intake vents 522, inter-rotor spatial gap 531, rotor air passages 560 and 558, stator central apertures 580 and 582 rear endplate 518 air passageways 533 bounded by adjacent rear end plate crossarms 517, outer portion 515, and hub 509 and front end plate 516 air passages 535 bounded by adjacent rear end plate crossarms 501, outer portion 598, and hub 592 and fans 537 and 539. Air entering inter-rotor spatial gap 531 between rotors 530 and 532 through air intake vents 522 of outer case 520 splits with half the airflow entering rotor air passages 560 and the other half entering rotor air passages 558. Air flow leaving rotor air passage 560 is directed over front-side end turns 529 of stator winding 574. After leaving front end turns 529, airflow enters stator 570 central aperture 582 with cooperation of rotor deflector 590 and is then directed over loosely wrapped rear end turns 527 of stator windings 574 by virtue of suitable relative disposition or contouring, or, as in the embodiment of FIG. 5D, cooperation with a rear deflector 535. Air flow then enters passageways 533 bounded by adjacent rear end plate crossarms 517, outer portion 515, and hub 509 in rear end plate 518 and is driven by fan 539 which is mounted to shaft 502 by nut 589. Airflow leaving rotor air passage 558 is directed over rear-side end turns 523 of stator winding 572. After leaving rear end turns 523, airflow enters stator 568 central aperture 580 with cooperation of deflector 541 and is then directed over loosely wrapped front end turns 525 of stator windings 574 by virtue of suitable relative disposition or contouring, or, as in the embodiment of FIG. 5D, cooperation with a front deflector 587. Airflow then enters passageways 535 bounded by adjacent front end plate outer portion 598, crossarms 501, and hub 592 in front end plate 516 and is driven by fan 537. In the preferred embodiment, centrifugal fan 537 is mounted for rotation with shaft 502 between pulley 136 and front end plate 516 and centrifugal fan 539 is mounted for rotation with shaft 502 between nut 589 and rear end plate 518 The cross sections, contours (turns and edges) and relative dispositions of the various air passageways are preferably chosen to minimize decreases in air velocity, and maximize airflow over end turns 523 and 525 of stator 568 and end turns 527 and 529 of stator 570.

More specifically, cooling air, generally indicated by arrows 541 is introduced into alternator 500 through air intake vents 522 and enters inter-rotor spatial gap 531. Airflow 543 splits into four distinct airflow paths, 545, 547, 549 and 551. Airflow 545 enters rotor passageway 558 and impinges on stator end turns 523. After leaving end turns 523 airflow 545 is re-directed by rotor air deflector 541 and enters aperture 576 of stator 568. Airflow 545 is then re-directed over end turns 525 by use of front endplate air deflector 587 then leaves stator 500 through air passages 535 driven by fan 537. Airflow 547 moves between rotor casing 538 and outer case 520 thereby cooling magnets 542 that are attached to rotor casing 538. Airflow 547 then impinges on end turns 525 after which it enters air passageway 535 leaving alternator 500 driven by fan 537. Airflow 549 enters rotor passageway 560 and impinges on stator end turns 529. After leaving end turns 529, airflow 549 is re-directed by rotor air deflector 590 and enters aperture 582 of stator 570. Airflow 549 is then re-directed over end turns 527 by use of rear endplate air deflector 535 then leaves stator 500 through air passages 533 driven by fan 539. Airflow 551 moves between rotor casing 540 and outer case 520 thereby cooling magnets 544 that are attached to rotor casing 540. Airflow 551 then impinges on end turns 527 after which it enters air passageway 533 leaving alternator 500 driven by fan 539. Airflows 545 and 547 cool front components, specifically end turns 523 and 525 as well as magnets 542 and airflows 549 and 551 cool rear components, specifically end turns 529 and 527 as well as magnets 544.

Although effective in cooling components of alternator 500, air intakes 522 may not always be possible for all applications, in which case, an air flow path similar to that of alternator 300 must be utilized.

Figure 5G:
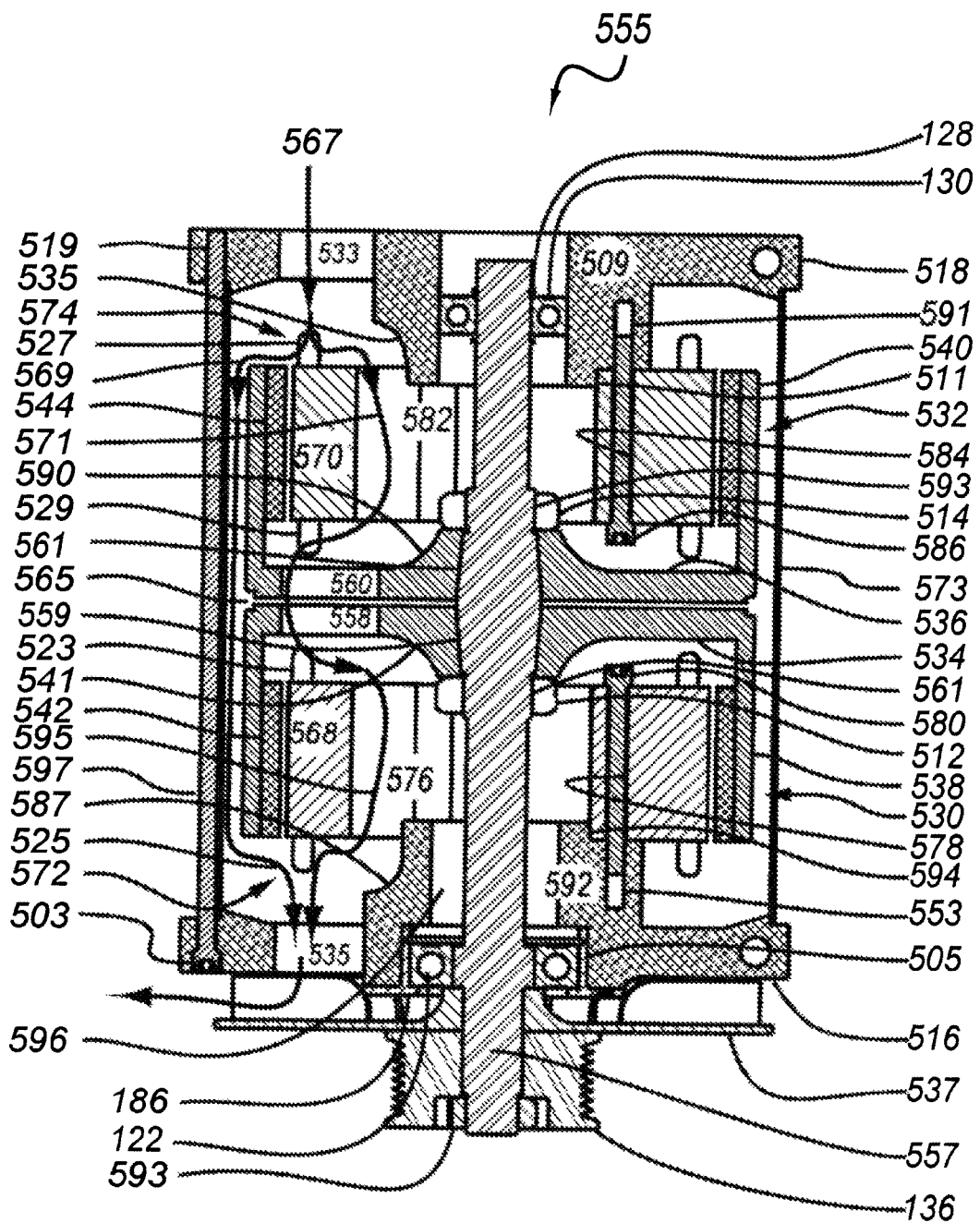
FIG. 5G is a schematic sectional view (taken along line P-P in FIG. 5A) of the Pad Mount alternator of FIGS. 5A and 5B with the option of two closely spaced discrete rotors.

Referring now to FIG. 5G, Alternator 555 suitably includes a shaft 557 including two tapered projecting portions, 559 and 561 and two threaded portions 561 and 593; two jam nuts 512 and 514; front end plate 516; a front bearing 122; bearing sleeve 186; rear endplate 518, rear shaft retaining rings 128; a rear bearing 130; twin rotors 526 and 528; stators 568 and 570; an outer case 573 and respective tie rods 595. Twin rotors 530 and 532, as best seen in FIG. 5G, both preferably comprise an endcap 534 and 536, a cylindrical casing 538 and 540 respectfully and a predetermined number (e.g. 8 pairs) of alternatively poled permanent magnets 542 disposed in the interior side wall of casing 538 and a predetermined number (e.g. 8 pairs) of alternatively poled permanent magnets 544 disposed in the interior side wall of casing 540.

Rotors 530 and 532 are suitably substantially open, including peripheral portions 546 and 548 respectfully, and respective cross-arms 550 and 552 and a central rotor hubs 554 and 556 respectfully to provide for connection to shaft 502. Respective air passageways 558 are provided through endcap 534, bounded by peripheral portion 546, adjacent cross arms 550, and central hub 554. Respective air passageways 560 are provided through endcap 536, bounded by peripheral portion 548, adjacent cross arms 552, and central hub 556. Central rotor hubs 554 and 556 include through-bores 562 and 564 respectively having a predetermined taper (e.g. 1 in. per foot) corresponding to that of shaft portion 559 and 561. In assembly, shaft 502 is journaled through both bores 562 and 564, such that shaft tapered portions 559 and 561 are received in bores 562 and 564 just forward of threaded shaft portions 561 and 563. Threaded shaft portions 561 and 563 cooperate with jam nuts 514 and 516 to positively locate rotors 530 and 532 on shaft 502. As was previously described, the thickness of crossarms 550 and 552 are suitably chosen to be as thin as possible (to minimize weight and material cost) while still capable of withstanding expected loads. Rotors 530 and 532 are mounted in close proximity axially on shaft 557 such that when rotor 530 is seated on tapered portion 559 and rotor 532 is seated on tapered portion 561 a small gap 565 remains after assembly. This assures the rotors will have proper clearance to fully seat when torque is applied to bolts 512 and 514 respectively. Rotor air passages 558 and 560 are aligned during assembly to create an uninterrupted cooling fluid passageway.

Stators 568 and 570 suitably comprise cores 583 and 585 and conductive windings 572 and 574 respectively. Stators 568 and 570 cores suitably comprises laminated stack of thin sheets of soft magnetic material, e.g. non-oriented, low loss (lead free) steel, that are cut or punched to the desired shape, aligned and joined (e.g. welded or epoxied together in a precision jig to maintain the separate laminations in alignment). Stators 568 and 570 cores are generally cylindrical, with an axially crenellated outer peripheral surface, i.e., includes a predetermined number of teeth 158 and slots 160. Both stator 568 and 570 are preferably substantially open, with stator 568 having a central aperture 576 and suitably includes crossarms 575, radial locating feature 577 and axial through-bores 578 to facilitate mounting to front endplate 516 using mounting bolts 580 and stator 570 having a central aperture 582 and suitably includes crossarms 575, radial locating feature 581 and axial through-bores 584 to facilitate mounting to rear endplate 518 using mounting bolts 586.

Windings 572 and 574, formed of a suitably insulated electrical conductor, preferably varnished copper motor wire, are provided on cores 583 and 585 of stator 568 and 570 respectively, wound through respective slots 160, outwardly along the side face of cores around a predetermined number of teeth 158, then back through another slot.

In assembly, stator 568 is disposed coaxially with rotor 530 and is closely received within interior cavity of rotor 530. As will be explained, front endplate 516 mounts and locates front stator 568 so that it is properly aligned within internal chambers of rotor 530 and stator 570 is disposed coaxially with rotor 532 and is closely received within interior cavity of rotor 532. As will be explained, rear endplate 518 mounts and locates rear stator 570 so that it is properly aligned within internal chambers of rotor 532. The peripheral surface of stators 568 and 570 are separated from the interior surface of magnets 542 and 544 respectively by a small predetermined air gap AG (see, e.g., FIG. 1F).

Front endplate 516 suitably includes a stepped central hub 592 having a forward reduced diameter portion 594 and central aperture 596 there through, and a generally cylindrical outer peripheral portion 598, preferably having the same outer profile as rear endplate 518, connected to hub 592 by respective crossarms 501. Respective counter bored holes 503 are provided cylindrical outer peripheral portion 598. A predetermined number of tapped holes 553 (e.g. 4) corresponding to stator crossarm bores 578 are provided in the stepped surface of hub 592. Reduced diameter portion 594 is substantially equal to (but slightly less than) the diameter of the concentric radial locating features 577 on crossarms 575 of stator 568, so that front endplate portion 594 may be closely received within the concentric radial locating features 577 on crossarms 575 of stator 568. Front bearing sleeve 186 is closely received within counter bore 505 of front endplate hub 592 and thus centers bearing 122 and shaft 502. Stator 568 is mounted on hub 592, with reduced diameter hub portion 594 received within the concentric radial locating features 577 on crossarms 575 of stator 568 and the stator front sidewall against the hub step. Respective bolts 580 journaled through bores 578 and secured in tapped holes 553, secure stator 568 to front endplate 516. Stator 516 is thus positively located and aligned relative to shaft 502.

Rear endplate 518 carries and locates rear bearing 130, mounts and locates stator 570. Rear endplate 518 suitably includes a stepped central hub 509 having a forward reduced diameter portion 511 and central aperture 513 there through, and a generally cylindrical outer peripheral portion 515, preferably having the same outer profile as front endplate 516, connected to hub 509 by respective crossarms 517. Respective tapped holes 519 are provided cylindrical outer peripheral portion 515, at the same radial distance from center and angular dispositions as counter bored holes 503 in front endplate 516. A predetermined number of tapped holes 591 (e.g. 4) corresponding to stator crossarm bores 584 are provided in the stepped surface of hub 509. The outer diameter of reduced diameter portion 511 is substantially equal to (but slightly less than) the diameter of the concentric radial locating features 581 on crossarms 579, so that rear endplate portion 511 may be closely received within the concentric radial locating features 581 on crossarms 579 of stator 570. Rear bearing 130 is closely received within aperture 513 of rear endplate hub 509 and thus centers shaft 502. Stator 570 is mounted on hub 509, with reduced diameter hub portion 511 received within the concentric radial locating features 581 on crossarms 579 of stator 570 and the stator rear sidewall against the hub step. Respective bolts 586 journaled through bores 584 and secured in tapped holes 519, secure stator 570 to rear endplate 518. Stator 570 is thus positively located and aligned relative to shaft 502.

Rotors 530 and 532 are mounted on shaft 502 for rotation with the shaft. Stators 568; and 570 are closely received within rotors 530 and 532, separated from rotors 530 and 532 by a small air gap AG. (see, e.g., FIG. 1F) Front endplate 516, bearing sleeve 186, front bearing 122, rear bearing 130, rear endplate 518, outer casing 520 and tie rods 524 cooperate as a support assembly to maintain alignment of shaft 502, rotors 530 and 532, and stators 568 and 570. Shaft 502 is maintained by bearing sleeve 186, bearings 122 and 130, which are mounted on front endplate 516 and rear endplate 518, respectively, and rotatably maintain and align shaft 502 concentric and perpendicular with the endplates. Rotors 530 and 532 are mounted for rotation on shaft 502, positively positioned by cooperation with tapered shaft portions 557 and 559. Front endplate 516 mounts and locates stator 568 so that it is disposed within rotor 530 properly aligned with shaft 502 and rotor 530. Rear endplate 518 mounts and locates stator 570 so that it is disposed within rotor 532 properly aligned with shaft 502 and rotor 532. Outer casing 520 has end faces perpendicular to its axis (is preferably cylindrical) and is disposed between front endplate 516 and rear endplate 518. Tie rods 597; compress endplates 516 and 518 against outer casing 573, keeping the components squared and in alignment.

Referring again to FIG. 5G, a cooling airflow is directed over stator windings 574 of stator 570 (preferably through loosely wrapped rear-side and front-side end turns 527 and 529 respectively) by employing a cooling system comprising air passageways 533 in rear end plate 518, stator 570 central aperture 582, rotor air passages 558 and 560, stator 568 central aperture 576 and front end plate air passages 535. Air entering rear end plate air passage way 533 is directed to impinge on rear-side end turns 527 of windings 518, Air exiting stator central aperture 582 is directed to impinge on windings 574 (front-side end turns 529), by virtue of suitable relative disposition or contouring, or, as in the embodiment of FIG. 5G, cooperation with rotor deflector 590. Air exiting rotor air passages 558 and 560 is directed to impinge on windings 572 of stator 568 (preferably through loosely wrapped rear-side and front-side end turns 523 and 525 respectively). After passing over rear-side end turns 523 is then directed to stator 568 central aperture 576 by use of rotor deflector 541 then over front-side end turns 525 then through front endplate 516 air passageway 535. An asynchronous forced air supply, e.g., electric fan as outline by Lafontaine et al., may be mounted on the back of rear end plate 518 to enhance air flow. In the preferred embodiment, centrifugal fan 138 is mounted for rotation with shaft 557 between pulley 136 and front end plate 516. The cross sections, contours (turns and edges) and relative dispositions of the various air passageways are preferably chosen to minimize decreases in air velocity, and maximize airflow over end turns 527, 529 of stator 570 and end turns 523, 525 of stator 570.

More specifically, cooling air, generally indicated by arrows 567 is introduced into alternator 555 through rear end plate air passageways 533. Airflow 567 impinges upon rear end turn 527. Airflow 567 then splits into respective streams 571 and 569. After exiting the end turns 527, air stream 571 flows through stator 570 central aperture 582, impinges upon rotor deflector 590, is directed through the front-side loosely wrapped end turns 529, rotor passageways 558 and 560, then with cooperation of rotor deflector 541, impinges on end turns 523 of stator 568 is directed into stator 568 central aperture 576 then partial impinges on end turns 525 and then exits alternator 555 through air passageways 535 in front end plate 516. Air stream 569, after exiting rear-side end turns 527, flows between the outside of rotor casings 538 and 540 and the inside of outer case 573 then impinges on front side end turns 525 of stator 568 then exits alternator 555 through air passageways 535 in front end plate 516. Air stream 569 provides cooling of magnets 544, 542 and end turns 574, 525. Air stream 571 provides cooling for end turns 527, 529, 523 and 525.

The effects of magnetic fringing are well known and can be utilized to increase power of a permanent magnet machine. In conventional permanent magnet machines the length of magnets are generally equal to the stator length. If given the opportunity to extend the length of the magnet beyond both stator faces, the magnetic fringing fields created would extend beyond the stator and intercept the winding end turns which also extend beyond the stator. Therefore, in an embodiment, permanent magnets have predetermined lengths that exceeds predetermined stator face lengths, and in an embodiment with a plurality of stators, the predetermined length of multiple pluralities of magnets may exceed face lengths of respective stator face lengths. The result is an overall increase in flux interacting with the windings that in turn produces more power for a given length of stator.

Figure 6A:
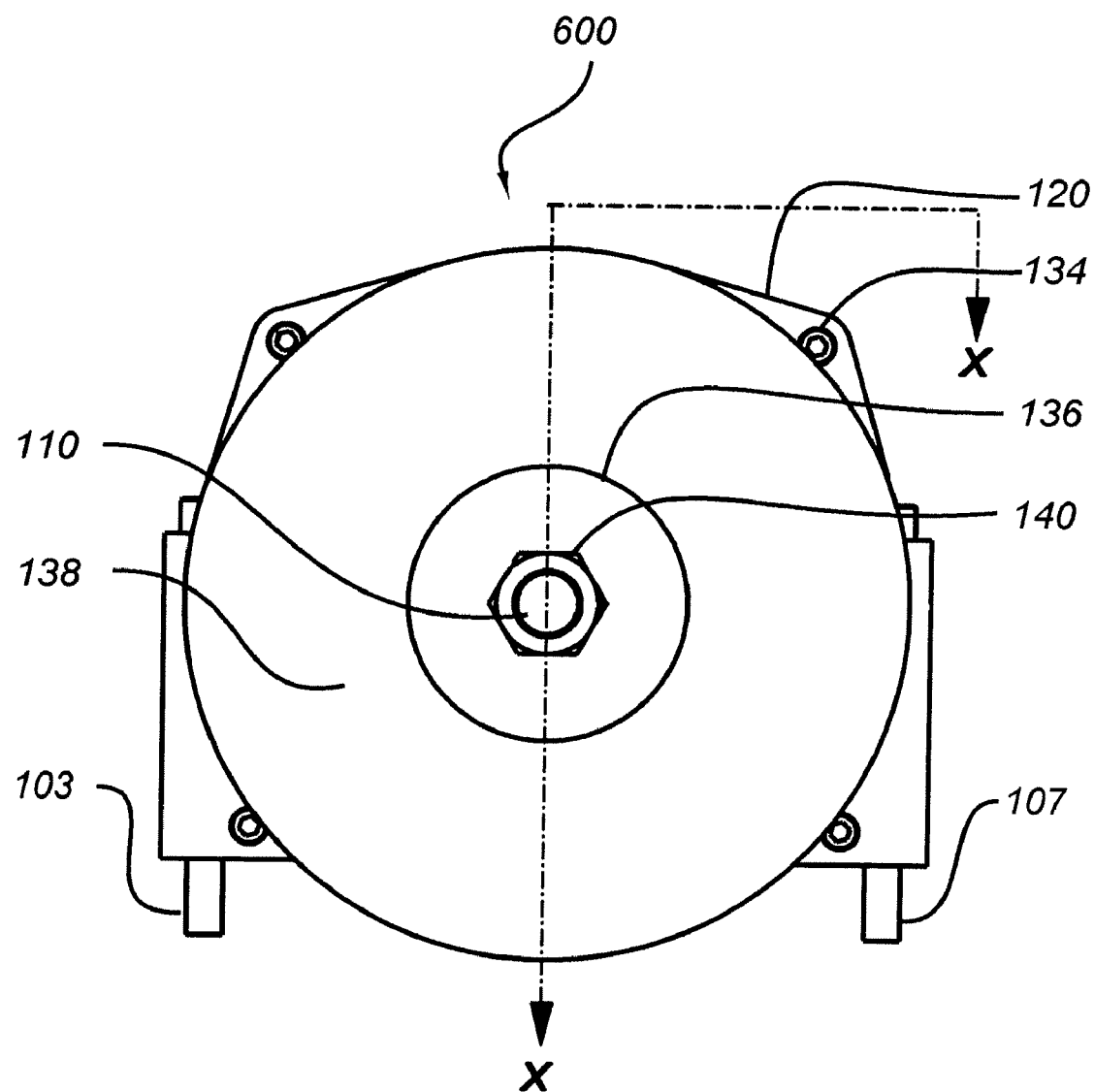
FIG. 6A is a front view of a sixth embodiment of a Pad Mount alternator in accordance with the present invention that maximizes output utilizing magnetic fringing.
Figure 6B:
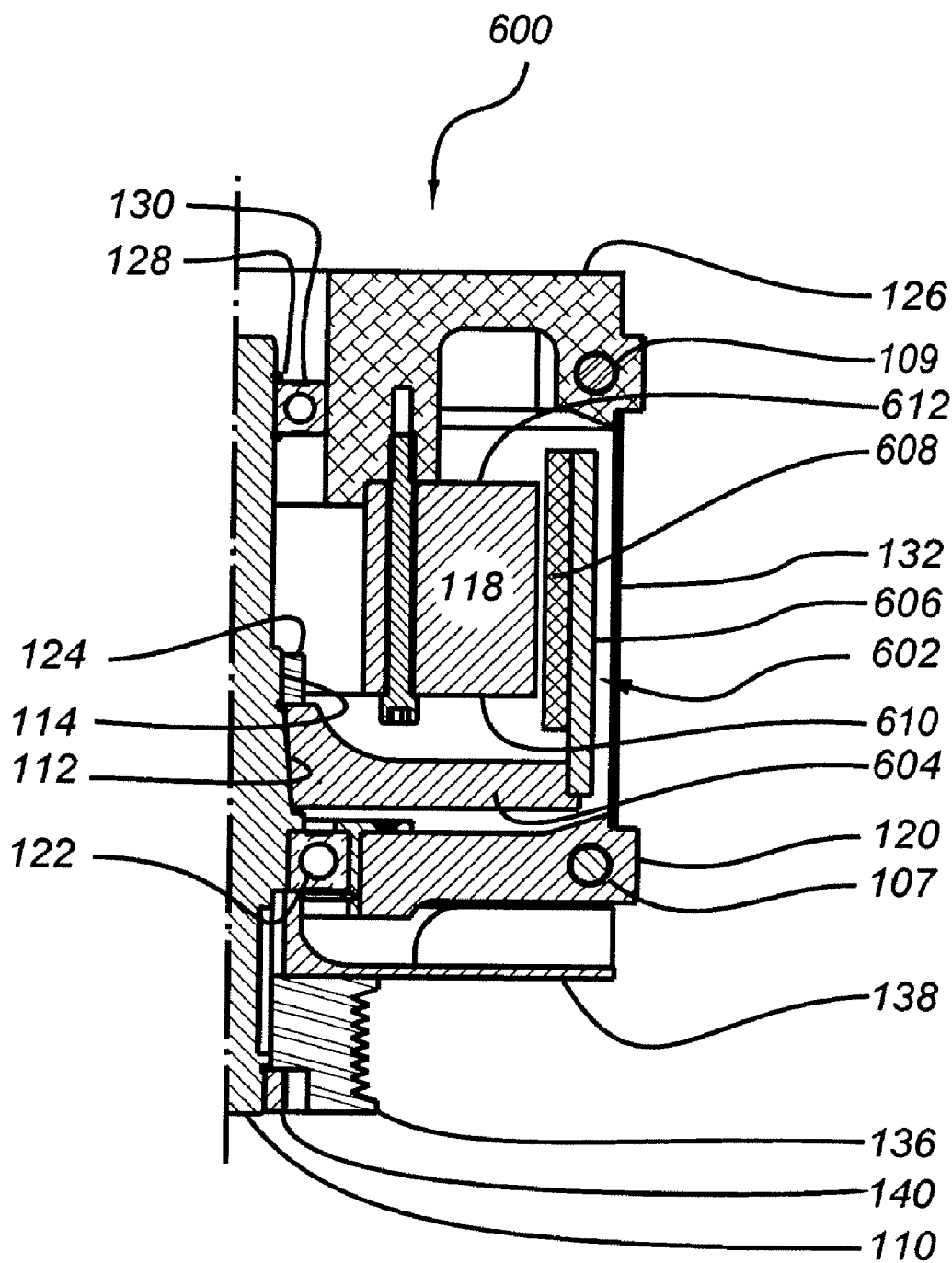
FIG. 6B is a schematic sectional view (taken a long line, X-X in FIG. 6A) illustrating magnet overhang.

Referring now to FIGS. 6A and 6B, Alternator 600, which is very similar to alternator 100 in all regards except that of rotor 602, conforms to SAE proposed pad mount standard version 2-3, and in accordance with various aspects of the present invention comprises: a shaft 110, preferably including a tapered projecting portion 112 and a threaded portion 114 (best seen in FIG. 1E); a stator 118; a front endplate 120; a front bearing 122; a jam nut 124; a rear endplate 126; a rear shaft retaining rings 128; a rear bearing 130; an outer casing 132 and respective tie rods (not shown). Rotor 602 is mounted on shaft 110 for rotation with the shaft 110. Stator 118 is closely received within rotor 602, separated from rotor 602 by a small air gap AG (see, e.g., FIG. 1F). Front endplate 120, bearing sleeve 186, front bearing 122, rear bearing 130, rear endplate 126, outer casing 132 and tie rods (not shown) cooperate as a support assembly to maintain alignment of shaft 110, rotor 602, and stator 118. Shaft 110 is maintained by bearings 122 and 130, which are mounted on front endplate 120 and rear endplate 126, respectively, and rotatably maintain and align shaft 110 concentric and perpendicular with the endplates. Rotor 602 is mounted for rotation on shaft 110, positively positioned by cooperation with tapered shaft portion 112. Rear endplate 126 mounts and locates stator 118 so that it is disposed within rotor 116 properly aligned with shaft 110 and rotor 602. Outer casing 132 has end faces perpendicular to its axis (is preferably cylindrical) and is disposed between front endplate 120 and rear endplate 126. Tie rods (not shown); compress endplates 120 and 126 against outer casing 132, keeping the components squared and in alignment.

As best seen in FIG. 6B, rotor 602 preferably comprises an endcap 604, a cylindrical casing 606 and a predetermined number (e.g. 8 pairs) of alternatively poled permanent magnets 608 disposed in the interior wall of casing 606.

Magnets 608 extend past stator face 610 and 612 of stator 118. Ideally the extension past the stator face 604 and 606 should be of equal length on both sides and in the range of 3/16 to 5/16 of an inch. Increases beyond that are of little benefit magnetically and only add to the overall cost of an alternator. Since rare earth magnets are one of the most expensive components of a permanent magnet alternator, it is beneficial to only use the minimum amount of magnet material needed to produce the desired output.

As described by Lafontaine et al., cogging can present undesirable effects during operation of a permanent magnet machine. When considering dual rotor alternators the effects of cogging are greatly magnified due to the increased overall length of stator, rotor and magnets. Skewing the laminations eliminates the majority of these effects. Due to the nature of rare earth magnets i.e. the magnets must be kept below a certain temperature (curie temperature) to prevent permanent demagnetization, it would be beneficial to develop a method that both allows the skewed stator to be mounted to the rear endplate while minimizing the impact to cooling fluids.

Referring now to FIGS. 7A-7F, stator 700 is suitably comprised of a laminated stack of thin sheets of soft magnetic material, e.g. non-oriented, low loss (lead free) steel, with a core 702 and conductive windings (not shown). Stator 700 is preferably substantially open with a central aperture 704 defined by the cylindrical interior surface 706 of core 704 with suitable crossarms 708 and radial locating features 710 including cylindrical through bores 718 to fasten stator 700 to endplate 720. The lamination sheets are generally cylindrical, with an axially crenellated outer peripheral surface, i.e., including a predetermined number of teeth 714 and slots 716 that are cut or punched to the desired shape, aligned and joined (e.g., welded or epoxied together in a precision jig to maintain the separate laminations in predetermined alignment).

Figure 7A:
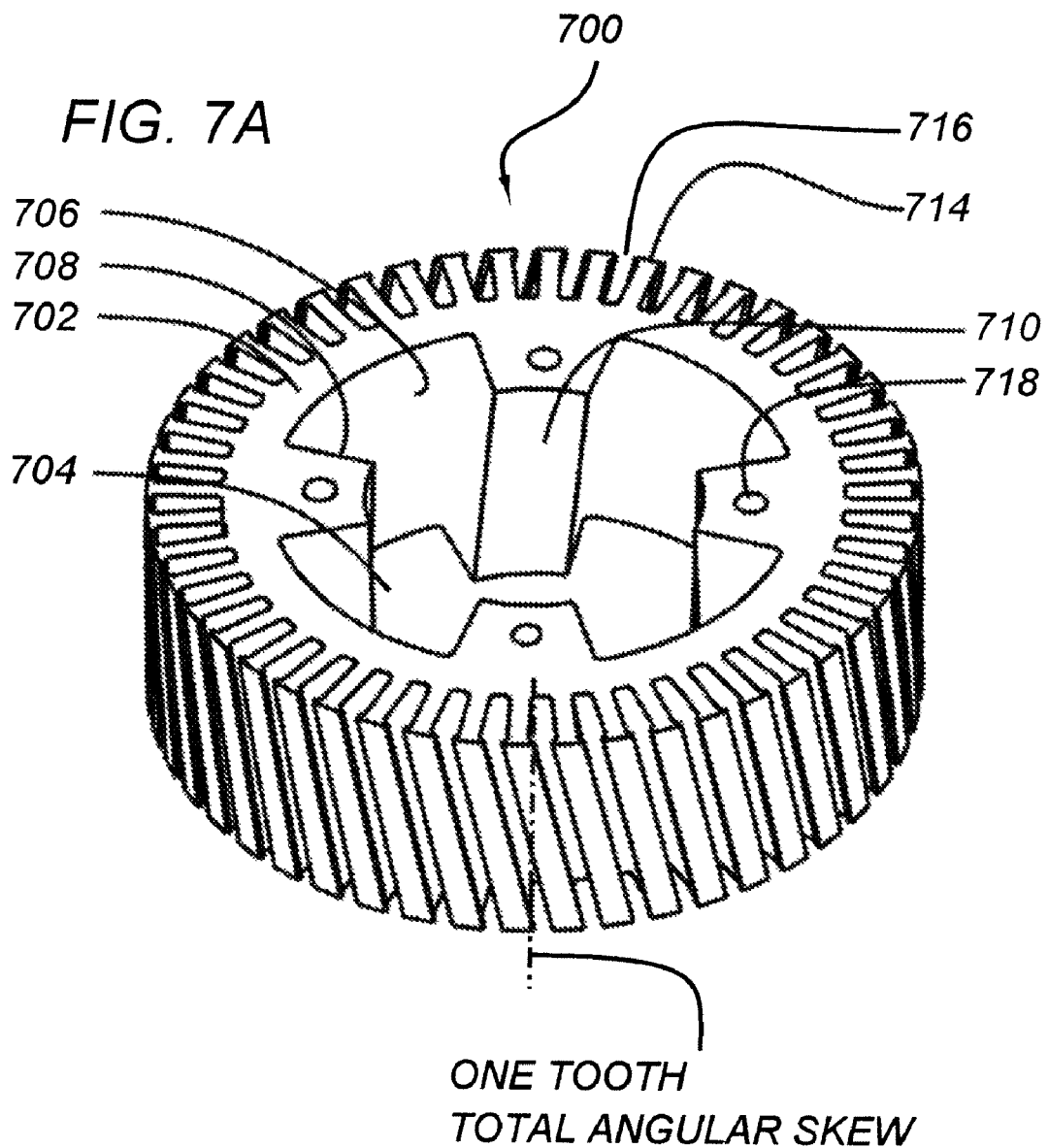
Figure 7B:
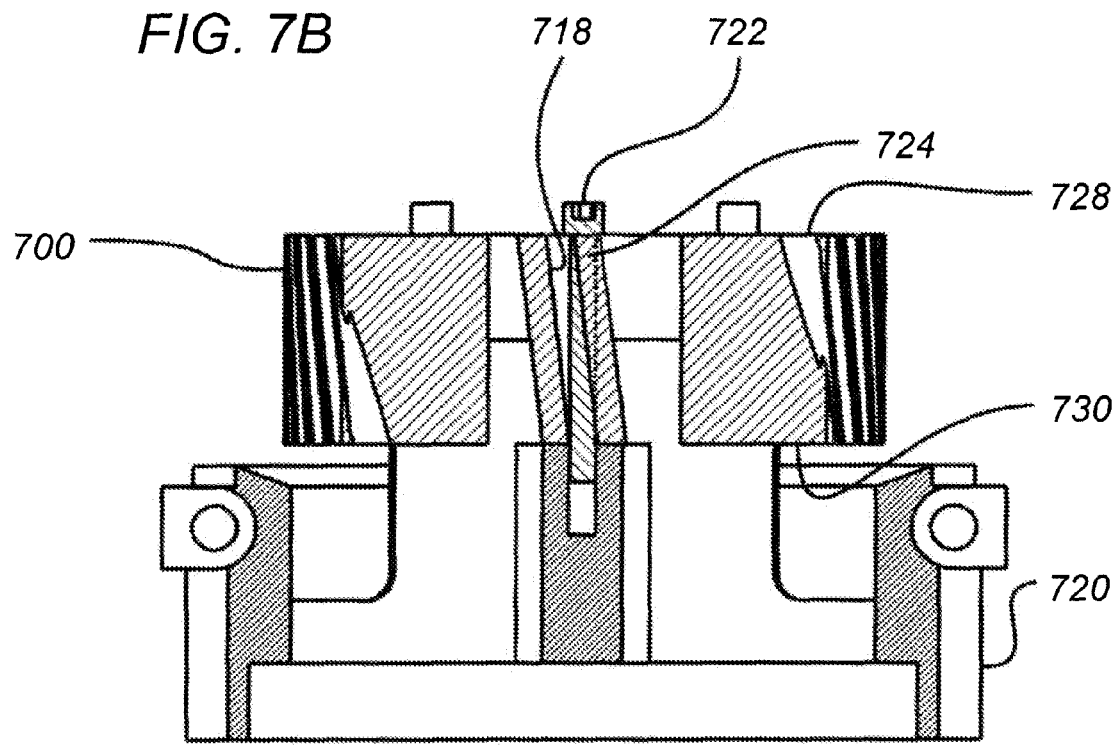
Figure 7C:
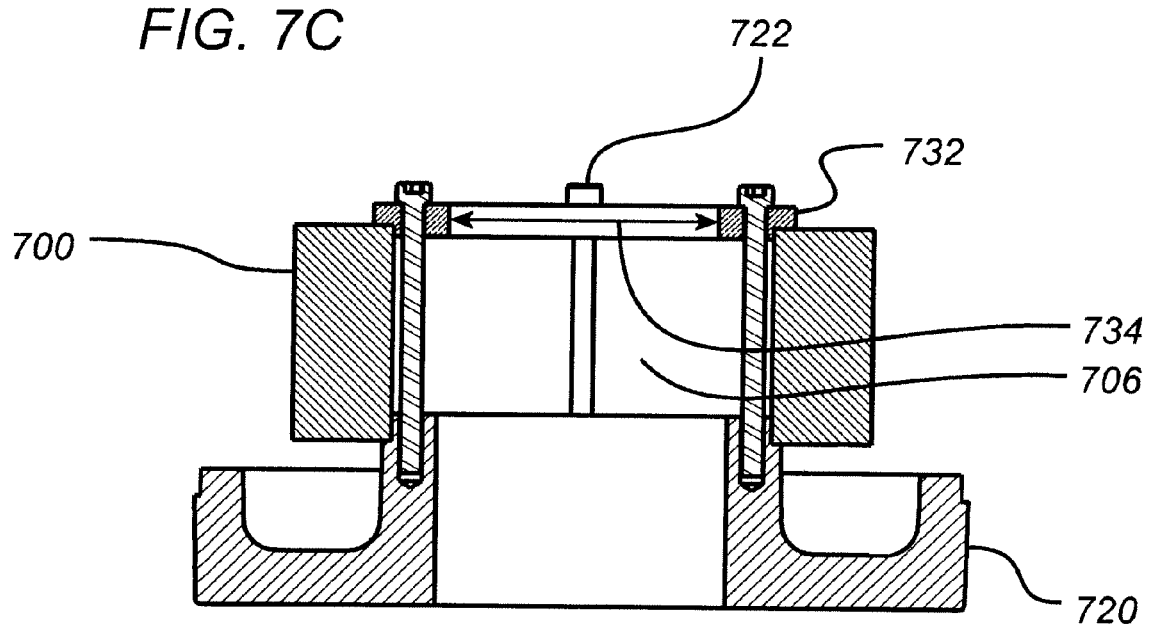
Figure 7D:
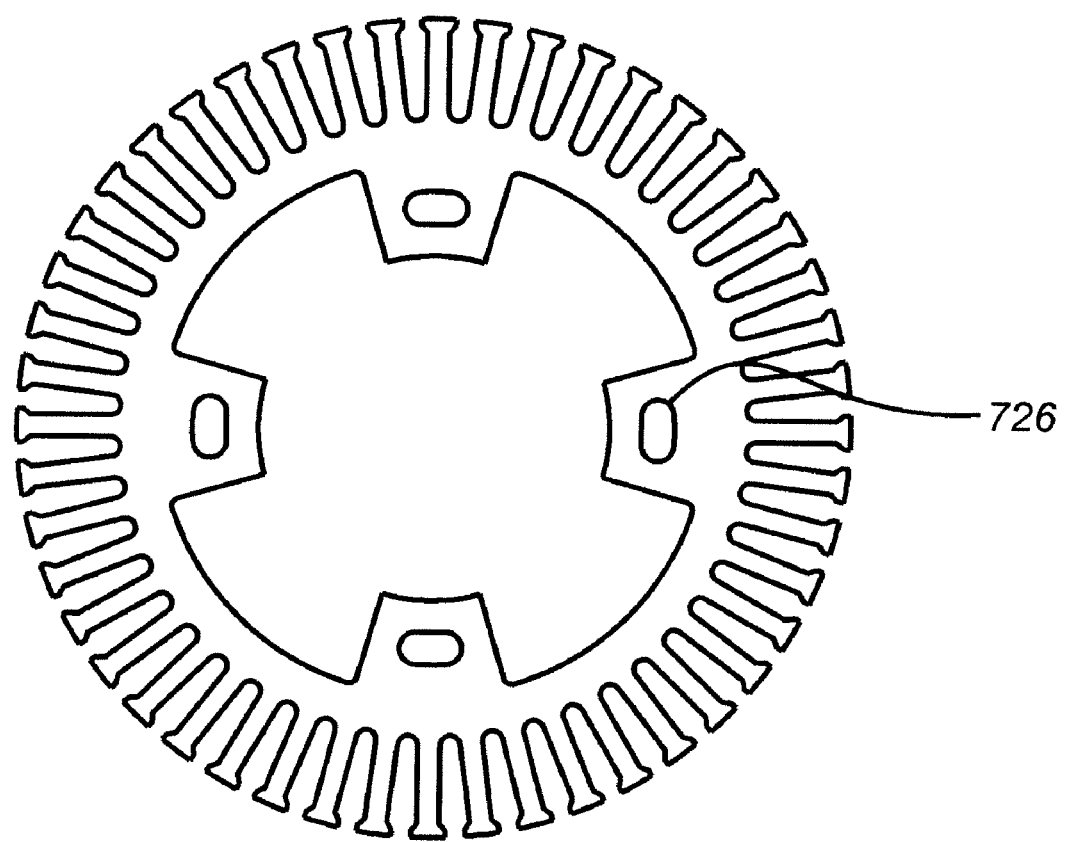
Figure 7E:
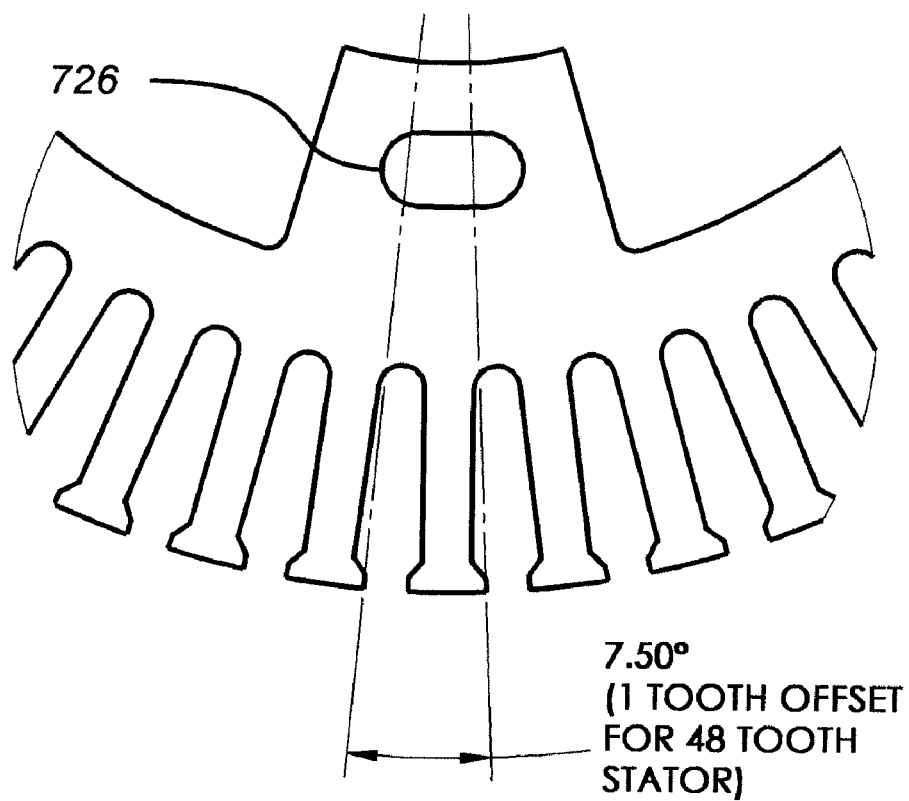
Figure 7F:
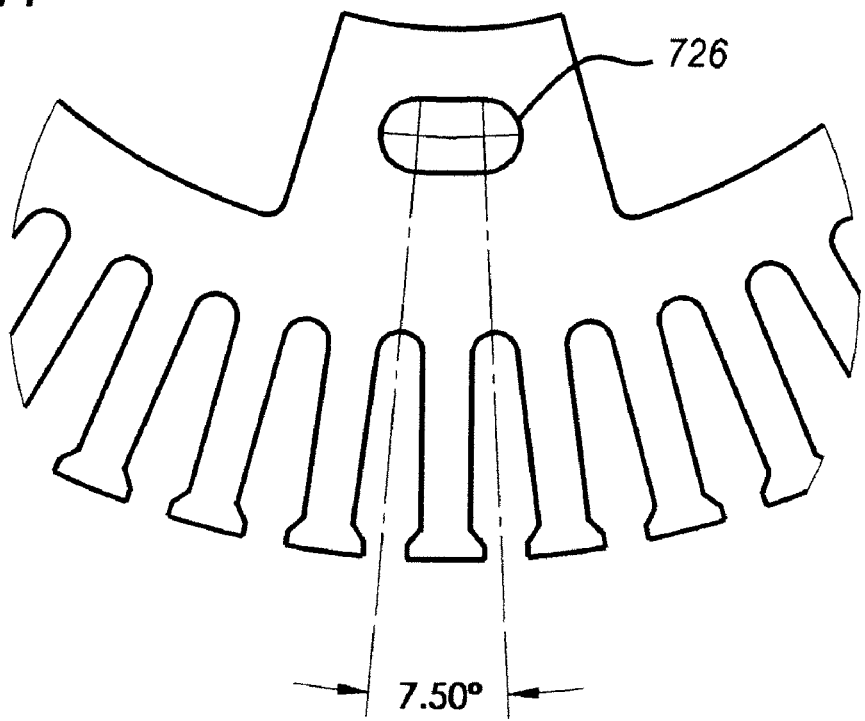

As best seen in FIG. 7B, the use of cylindrical through bores 718 for mounting a skewed stator is ineffective since the overall axial cross-sectional area of the through bore is reduced due to the progressive skewing of adjacent sheets. This progressive reduction in cross-sectional area makes it impossible for mounting bolts 722 to be journaled through bores 718 to endplate 720 and still maintain perpendicularity due to the interference at point 724. The use of a clamping ring as described by Lafontaine et al. to hold stator 700 is also less than optimal in that it reduces the effective diameter of the central aperture of stator central aperture 706 to cooling fluids. As best seen in FIG. 7C, clamp ring 732 is used to hold down stator 700 with cooperation of bolts 722. The result is reduced diameter portion 734 of clamp 732.

To overcome the progressive reduction in cross-sectional area of cylindrical through bores in a skewed stator and maximize air flow, crossarms 710 should suitably include radially slotted holes 726 to facilitate mounting core 700 to endplate 720. Optimally, as described by Lafontaine et al., the total angular skew from stator face 728 to stator face 730 is the angle created between adjacent teeth of a stator lamination (See FIG. 7A). Therefore to calculate angular skew, divide the total number of stator teeth by 360°. In the case of a 48 tooth stator, it is 360/48 or 7.50° of skew. To assure adequate clearance for bolts 722 in through bores 732, the arc circumscribing radial slot 726 must be equal to or slightly greater that the angle created by the desired skew (7.50° in a 48 tooth stator) to assure proper clearance (see FIGS. 7E and 7F). As best seen in FIG. 7G, the radially slotted through-bores 732 allow mounting bolts 722 to thread into holes 738 and remain perpendicular to endplate 720 mounting surface 734. It would be beneficial to include washer 736 to distribute the clamping forces applied to stator 700 since radial slots eliminates some of the clamping surface that would otherwise be available in a cylindrical through bore. This method of mounting stator 700 allows for the greatest possible cross-sectional area of cooling fluid to pass through the central aperture of stator 700.

As described above, skewing the stator laminations one full tooth eliminates cogging. A stator that has been skewed to that degree will experience a loss in flux density due to the interaction of both magnets and skewed coils as the rotor rotates. A unique opportunity to reduce cogging without adversely affecting flux density can be attained in a dual rotor configuration.

Figure 8A:
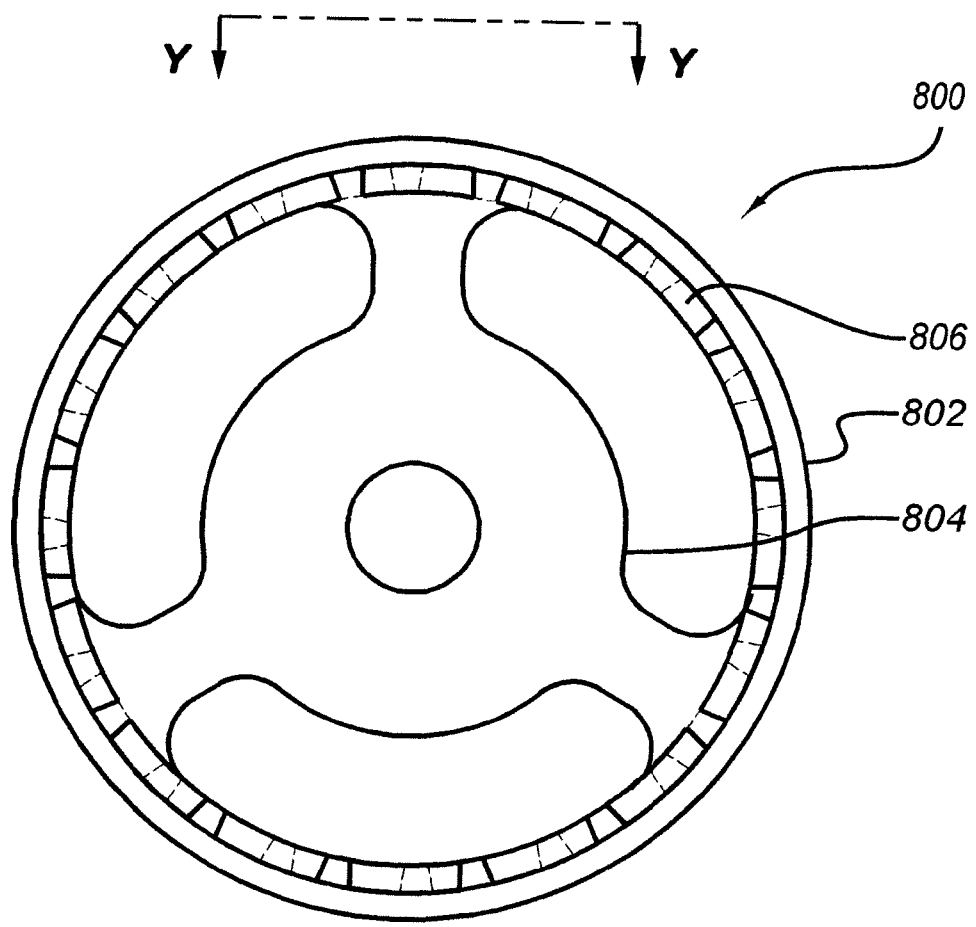
FIG. 8A is a detailed view of a dual rotor with offset magnets.
Figure 8B:
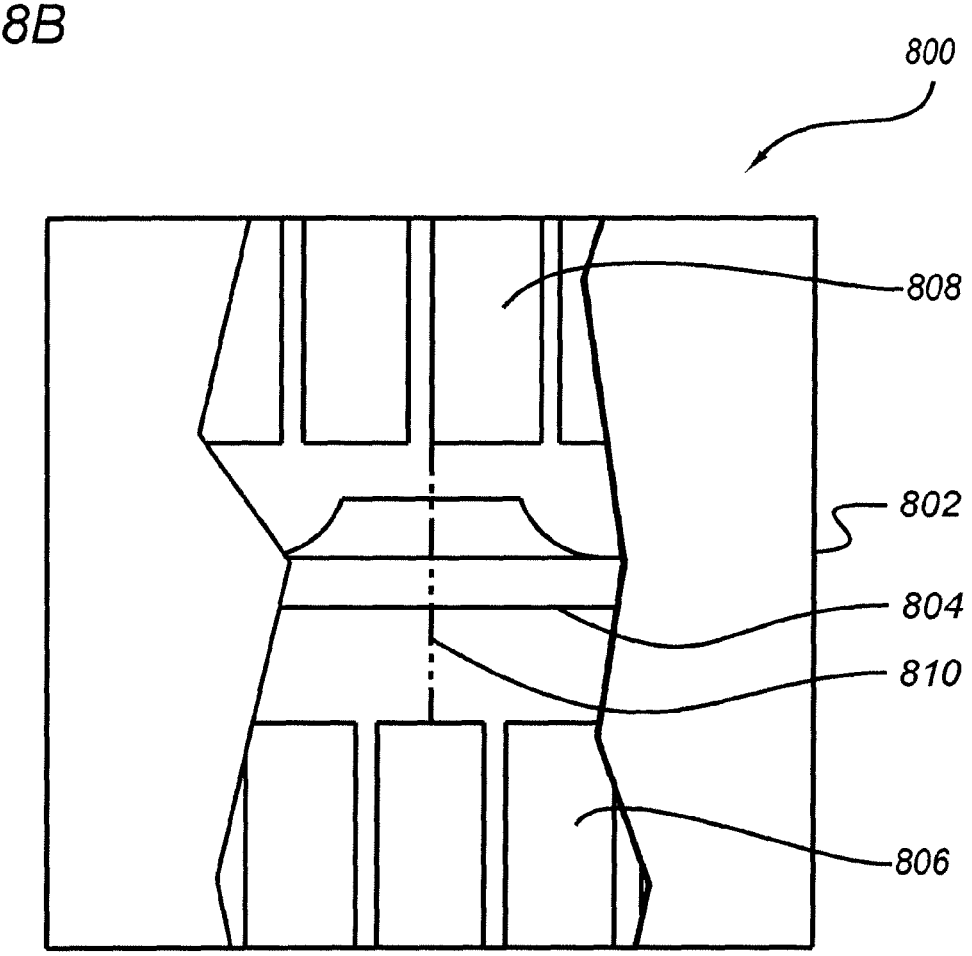
FIG. 8B is a detailed cut away view of the dual rotor in FIG. 8A take along line Y-Y.

Referring now to FIGS. 8A and 8B, rotor 800 comprises a cylindrical rotor case 802; central support plate 804 and magnets 806 and 808. Magnets 806 are evenly disposed radially within cylindrical rotor case 802. Magnets 808 are also evenly disposed radially within cylindrical rotor case 802. The axial edge of magnets 808 is positioned within rotor case 802 such that witness line 810 created by the edge of magnet 808 bisects the central axis of magnet 806.

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A power conversion apparatus comprising:
a shaft, a first stator, a second stator, a first rotor and a diametrically opposed second rotor, the shaft, stators, and rotor casings being coaxially disposed with the rotor casings mounted on the shaft, the first and second stators respectively including at least one winding;
wherein the first rotor further comprises a first plurality of permanent magnets coupled to the first rotor and disposed proximate to the first stator, separated from the first stator by a first predetermined gap distance, such that relative motion of the first stator and first rotor causes magnetic flux from the magnets to magnetically interact with the first stator winding;
wherein the second rotor further comprises a second plurality of permanent magnets coupled to the second rotor and disposed proximate to the second stator, separated from the second stator by a second predetermined gap distance, such that relative motion of the second stator and second rotor causes magnetic flux from the magnets to magnetically interact with the second stator winding; and
the respective first and second plurality of permanent magnets have a respective predetermined length beyond a respective predetermined first and second stator face lengths;
a cooling system for directing coolant flow into thermal contact with at least one of the winding and magnets, the cooling system generating sufficient coolant flow through a predetermined flow path at and above a predetermined speed to dissipate heat generated and maintain a temperature of the magnets below a predetermined destructive level;
a first end plate, wherein: the first rotor is mounted on the first endplate; and the first stator is mounted for rotation relative to the first endplate;
a second endplate, and an outer casing, wherein: the first and second rotor casings, first and second stator cores, and outer casing are concentric with the shaft; the shaft is rotatably coupled to the first and second endplates; the second rotor is mounted on the second end plate; and the first and second stator is coupled to the shaft for rotation therewith between the first and second endplates and within the outer casing;
wherein the cooling system comprises a passageway through the first and second stator core and a passageway through the first and second rotor in fluid communication with the first and second stator core passageway;
wherein the first and second rotor passageway is disposed such that coolant flow is directed through a first end plate passageway, into thermal contact with the first stator first winding end turns, through the first stator core passageway, into thermal contact with the first stator second winding end turns, into thermal contact with the second stator first winding end turns, through the second stator core passageway, into thermal contact with the second stator second winding end turns, through a second end plate passageway; and into thermal contact with the first and second magnets.

2. The apparatus of claim 1 wherein the disposition of at least one of a first and second stator slots and respective permanent magnets is skewed by a predetermined amount relative to the axis of the first and second stator.

3. The apparatus of claim 2 wherein the radial position of the slots at the first core side face is offset from the radial position of the slots at the second core side face.

4. The apparatus of claim 1 wherein the shaft has a predetermined diameter and includes shaft tapered portions disposed between the ends of the shaft at predetermined positions relative to the first and second stators, the diameter of the shaft tapered portions varying in accordance with a predetermined taper from a minimum diameter to a predetermined maximum diameter greater than the shaft predetermined diameter; and
the first and second rotors include a hub and a central through-bore having the predetermined taper corresponding to a taper of at least one shaft tapered portion of the shaft, the diameter of the tapered through-bore varying in accordance with the predetermined taper from a minimum through-bore diameter greater than the shaft predetermined diameter to a predetermined maximum through-bore diameter; and
the first and second rotors hub are disposed with the shaft journaled and extending through the hub through-bore, with the shaft tapered portion received in the through-bore with interior surface of the through bore and exterior surface of the shaft tapered portion in mating contact, wherein cooperation of the tapered first and second rotor bore is in surface contact with the shaft tapered portion positions the first and second rotors both axially and radially with respect to the shaft and first and second stators, coupling the first and second rotors to the shaft for rotation therewith.

5. The apparatus of claim 1 wherein the first and second rotors and shaft comprise an integral unit.

6. The apparatus of claim 1 wherein the shaft is rotatably coupled to the first endplate.

7. The apparatus of claim 6 wherein: the first and second rotors comprise endcaps coupling a cylindrical casing to the shaft; the casing and endcaps comprising an integral unit.

8. The apparatus of claim 1 wherein the cooling system further comprises at least a first passageway through the first end plate in fluid communication with the predetermined flow path.

9. The apparatus of claim 8 wherein the cooling system coolant is air, and the cooling system further includes a forced air supply disposed to move air through the first endplate passageway, and the predetermined flow path.

10. The apparatus of claim 9 wherein the forced air supply comprises a fan asynchronous with respect to rotation of the first stator.

11. The apparatus of claim 1 wherein the cooling system further comprises at least a passageway through a first stator core and a first passageway through the first rotor in fluid communication with the first stator core passageway.

12. The apparatus of claim 11 wherein the cooling system further comprises a fan mounted for rotation with the first rotor disposed to move coolant through the first stator core passageway.

13. The apparatus of claim 11 wherein the stator winding includes end turns bent into the path of coolant flow through the first stator core passageway.

14. The apparatus of claim 11 wherein the cooling system further comprises a deflector surface disposed between the first stator and first rotor to direct coolant flow from the first stator passageway into thermal contact with winding end turns.

15. The apparatus of claim 1 further including a second end plate, wherein: the second rotor is mounted on the second endplate; and the second stator is mounted for rotation relative to the second endplate.

16. The apparatus of claim 15 wherein the shaft is rotatably coupled to the second endplate.

17. The apparatus of claim 15 wherein the cooling system further comprises at least a second passageway through the second end plate in fluid communication with the predetermined flow path.

18. The apparatus of claim 17 wherein the cooling system coolant is air, and the cooling system further includes a forced air supply disposed to move air through the second endplate passageway, and the predetermined flow path.

19. The apparatus of claim 18 wherein the forced air supply comprises a fan asynchronous with respect to rotation of the second stator.

20. The apparatus of claim 1 wherein the cooling system further comprises at least a passageway through a second stator core and a passageway through the second rotor in fluid communication with the second stator core passageway.

21. The apparatus of claim 20 wherein the cooling system further comprises a fan mounted for rotation with the second rotor disposed to move coolant through the second stator core passageway.

22. The apparatus of claim 20 wherein the second stator winding includes end turns bent into the path of coolant flow through the second stator core passageway.

23. The apparatus of claim 20 wherein the cooling system further comprises a deflector surface disposed between the second stator and second rotor to direct coolant flow from the second stator passageway into thermal contact with winding end turns.

24. The apparatus of claim 1 wherein the cooling system further comprises a rotor deflector disposed between the first and second rotors.

25. The apparatus of claim 1 further including respective tie rods cooperating with the first and second end plates, compressing the first and second end plates against the outer casing; the first and second endplates, outer casing, and tie rods cooperating to maintain alignment of the shaft, first and second rotors and first and second stators.

26. The apparatus of claim 1 wherein the coolant is air and the cooling system further includes at least one forced air supply disposed to move air through the first and second endplate passageway, and the first and second stator core passageways.

27. The apparatus of claim 1 wherein the forced air supply comprises at least one electric fan.

28. The apparatus of claim 27 wherein electric fans are mounted on the first and second endplates.

29. The apparatus of claim 1 wherein the forced air supply comprises at least one fan disposed to rotate with the shaft.

30. The apparatus of claim 1 wherein the first rotor and first stator pairing and second rotor and second stator pairings comprise independent electrical outputs.

31. The apparatus of claim 30 wherein the independent outputs are configured to respectively provide a direct current and an alternating current.

32. The apparatus of claim 30 wherein the first rotor and stator pairing and second rotor and stator pairing are configured to provide an output voltage range optimized for 12 VDC and a second independent voltage range optimized for 110 VAC.

33. The apparatus of claim 1 wherein the face length of the magnets are configured to produce magnetic fringing stators.

34. The apparatus of claim 1 wherein the opposing magnets are configured radially offset to reduce cogging.

35. The apparatus of claim 1 wherein laminations of the first and second stators are configured to be skewed to reduce cogging.

36. The apparatus of claim 1 wherein the first and second stators include a plurality of windings, the end turns of such windings extending outwardly beyond the core by varying distances to present a lattice-like structure in the coolant flow path.

37. The apparatus of claim 36 wherein the end turns extend outwardly beyond the core peripheral portion side faces to provide spaces between the end turns and core peripheral portion side faces, whereby dissipation of heat generated in the winding is facilitated.

38. The apparatus of claim 1 wherein the first and second rotors, first and second stators, cooperate as a compact high power alternator for a vehicle.

39. The apparatus of claim 1 wherein the first and second rotors, first and second stators, cooperate as a compact high power alternator to retrofit existing vehicles.

40. The apparatus of claim 1 wherein the design of the first rotor and diametrically opposed second rotor aids in resisting apparatus deformation due to acceleration.

41. The apparatus of claim 1 wherein the design of the first rotor and diametrically opposed second rotor reduces the length of the moment arm of the apparatus wherein deformation of the plurality of rotors is decreased.

* * * * *